United States Patent
Jung et al.

(10) Patent No.: US 7,920,169 B2
(45) Date of Patent: Apr. 5, 2011

(54) PROXIMITY OF SHARED IMAGE DEVICES

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Invention Science Fund I, LLC

( * ) Notice: Subject to any disclaimer, the term of this patent is extended or adjusted under 35 U.S.C. 154(b) by 1188 days.

(21) Appl. No.: 11/115,078

(22) Filed: Apr. 26, 2005

(65) Prior Publication Data

US 2006/0170958 A1    Aug. 3, 2006

(51) Int. Cl.
*H04N 5/232* (2006.01)
*H04N 5/76* (2006.01)

(52) U.S. Cl. .............. 348/211.1; 348/231.99
(58) Field of Classification Search ............... 348/211.1, 348/231.99
See application file for complete search history.

(56) References Cited

U.S. PATENT DOCUMENTS

| | | | |
|---|---|---|---|
| 4,124,871 A | 11/1978 | Morrin, II | |
| 4,249,218 A | 2/1981 | Davis et al. | |
| 4,747,143 A | 5/1988 | Kroeger et al. | |
| 5,164,831 A | 11/1992 | Kuchta et al. | |
| 5,341,192 A | 8/1994 | Wally, Jr. et al. | |
| 5,388,197 A | 2/1995 | Rayner | |
| 5,410,343 A | 4/1995 | Coddington et al. | |
| 5,467,288 A | 11/1995 | Fasciano et al. | |
| 5,546,145 A | 8/1996 | Bernardi et al. | |
| 5,561,883 A | 10/1996 | Landry et al. | |
| 5,588,029 A | 12/1996 | Maturi et al. | |
| 5,612,715 A | 3/1997 | Karaki et al. | |
| 5,629,778 A | 5/1997 | Reuman | |
| 5,633,678 A | 5/1997 | Parulski et al. | |
| 5,655,144 A | 8/1997 | Milne et al. | |
| 5,659,662 A | 8/1997 | Wilcox et al. | |
| 5,675,789 A | 10/1997 | Ishii et al. | |
| 5,689,343 A | 11/1997 | Loce et al. | |
| 5,689,442 A | 11/1997 | Swanson et al. | |
| 5,701,163 A | 12/1997 | Richards et al. | |
| 5,738,522 A | 4/1998 | Sussholz et al. | |
| 5,751,338 A | 5/1998 | Ludwig, Jr. | |
| 5,764,800 A | 6/1998 | Yamagata | |
| 5,796,879 A | 8/1998 | Wong et al. | |
| 5,806,005 A | 9/1998 | Hull et al. | |
| 5,825,506 A | 10/1998 | Bednar et al. | |
| 5,845,166 A | 12/1998 | Fellegara et al. | |
| 5,889,895 A | 3/1999 | Wong et al. | |

(Continued)

FOREIGN PATENT DOCUMENTS

JP    5064225    3/1993

(Continued)

OTHER PUBLICATIONS

U.S. Appl. No. 12/290,538, Jung et al.

(Continued)

*Primary Examiner* — James M Hannett

(57) ABSTRACT

A technique involving either: a) transmitting at least one portion of at least one image representation from, or b) receiving at least one portion of at least one image representation to, a first shared image device in a manner at least partially relying on a proximity of the first shared image device and an at least one other shared image device.

40 Claims, 15 Drawing Sheets

CLIENT/SERVER OR MASTER/SATELLITE CONFIGURATION

U.S. PATENT DOCUMENTS

| | | | |
|---|---|---|---|
| 5,892,509 | A | 4/1999 | Jakobs et al. |
| 5,917,958 | A | 6/1999 | Nunally et al. |
| 5,917,962 | A | 6/1999 | Chen et al. |
| 5,926,605 | A | 7/1999 | Ichimura |
| 5,956,081 | A | 9/1999 | Katz et al. |
| 5,959,622 | A | 9/1999 | Greer et al. |
| 5,995,095 | A | 11/1999 | Ratakonda |
| 6,028,585 | A | 2/2000 | Ishii et al. |
| 6,034,786 | A | 3/2000 | Kwon |
| 6,115,341 | A | 9/2000 | Hirai |
| 6,122,003 | A | 9/2000 | Anderson |
| 6,134,345 | A | 10/2000 | Berman et al. |
| 6,157,406 | A | 12/2000 | Iura et al. |
| 6,157,935 | A | 12/2000 | Tran et al. |
| 6,167,350 | A | 12/2000 | Hiramatsu et al. |
| 6,188,383 | B1 | 2/2001 | Tamura |
| 6,188,431 | B1 | 2/2001 | Oie |
| 6,198,526 | B1 | 3/2001 | Ohtsuka |
| 6,204,877 | B1 | 3/2001 | Kiyokawa |
| 6,226,672 | B1 | 5/2001 | DeMartin et al. |
| 6,229,565 | B1 | 5/2001 | Bobry |
| 6,285,794 | B1 | 9/2001 | Georgiev et al. |
| 6,332,666 | B1 | 12/2001 | Ikeda |
| 6,333,792 | B1 | 12/2001 | Kimura |
| 6,342,887 | B1 | 1/2002 | Munroe |
| 6,359,649 | B1 | 3/2002 | Suzuki |
| 6,366,577 | B1 | 4/2002 | Donovan |
| 6,380,972 | B1 | 4/2002 | Suga et al. |
| 6,384,862 | B1 | 5/2002 | Brusewitz et al. |
| 6,400,848 | B1 | 6/2002 | Gallagher |
| 6,433,818 | B1 | 8/2002 | Steinberg et al. |
| 6,445,822 | B1 | 9/2002 | Crill et al. |
| 6,446,095 | B1 | 9/2002 | Mukai |
| 6,452,974 | B1 | 9/2002 | Menon et al. |
| 6,456,339 | B1 | 9/2002 | Surati et al. |
| 6,459,823 | B2 | 10/2002 | Altunbasak et al. |
| 6,493,028 | B1 | 12/2002 | Anderson et al. |
| 6,509,931 | B1 | 1/2003 | Mizosoe et al. |
| 6,512,541 | B2 | 1/2003 | Dunton et al. |
| 6,515,704 | B1 | 2/2003 | Sato |
| 6,516,154 | B1 | 2/2003 | Parulski et al. |
| 6,519,612 | B1 | 2/2003 | Howard et al. |
| 6,522,418 | B2 | 2/2003 | Yokomizo et al. |
| 6,535,228 | B1 | 3/2003 | Bandaru et al. |
| 6,538,692 | B2 | 3/2003 | Niwa |
| 6,539,169 | B1 | 3/2003 | Tsubaki et al. |
| 6,542,183 | B1 | 4/2003 | DeAngelis et al. |
| 6,546,189 | B1 | 4/2003 | Koda |
| 6,567,122 | B1 | 5/2003 | Anderson et al. |
| 6,573,927 | B2 | 6/2003 | Parulski et al. |
| 6,577,311 | B1 | 6/2003 | Crosby et al. |
| 6,577,336 | B2 | 6/2003 | Safai |
| 6,587,602 | B2 | 7/2003 | Wakisawa et al. |
| 6,650,366 | B2 | 11/2003 | Parulski et al. |
| 6,650,704 | B1 | 11/2003 | Carlson et al. |
| 6,654,543 | B2 | 11/2003 | Ando et al. |
| 6,657,667 | B1 | 12/2003 | Anderson |
| 6,678,413 | B1 | 1/2004 | Liang et al. |
| 6,687,877 | B1 | 2/2004 | Sastry et al. |
| 6,698,021 | B1 | 2/2004 | Amini et al. |
| 6,701,058 | B1 | 3/2004 | Tsubaki |
| 6,701,845 | B2 | 3/2004 | Ohmura |
| 6,710,809 | B1 | 3/2004 | Niikawa |
| 6,728,729 | B1 | 4/2004 | Jawa et al. |
| 6,735,253 | B1 | 5/2004 | Chang et al. |
| 6,738,155 | B1 | 5/2004 | Rosenlund et al. |
| 6,741,271 | B1 | 5/2004 | McConica et al. |
| 6,750,902 | B1 | 6/2004 | Steinberg et al. |
| 6,757,008 | B1 | 6/2004 | Smith |
| 6,757,431 | B2 | 6/2004 | Loce et al. |
| 6,762,791 | B1 | 7/2004 | Schuetzle |
| 6,774,935 | B1 | 8/2004 | Morimoto et al. |
| 6,801,719 | B1 | 10/2004 | Szajewski et al. |
| 6,809,759 | B1 | 10/2004 | Chiang |
| 6,816,071 | B2 | 11/2004 | Conti |
| 6,822,660 | B2 | 11/2004 | Kim |
| 6,823,092 | B1 | 11/2004 | Sato |
| 6,832,009 | B1 | 12/2004 | Shezaf et al. |
| 6,871,010 | B1 | 3/2005 | Taguchi et al. |
| 6,876,393 | B1 | 4/2005 | Yokonuma |
| 6,885,395 | B1 | 4/2005 | Rabbani et al. |
| 6,922,258 | B2 | 7/2005 | Pineau |
| 6,930,707 | B2 | 8/2005 | Bates et al. |
| 6,940,543 | B2 | 9/2005 | Perotti et al. |
| 6,947,075 | B1 | 9/2005 | Niikawa |
| 6,961,083 | B2 | 11/2005 | Obrador et al. |
| 6,967,675 | B1 | 11/2005 | Ito et al. |
| 6,978,311 | B1 | 12/2005 | Netzer et al. |
| 6,992,711 | B2 | 1/2006 | Kubo |
| 6,999,626 | B2 | 2/2006 | Andrew |
| 7,015,954 | B1 | 3/2006 | Foote et al. |
| 7,027,084 | B1 | 4/2006 | Watanabe |
| 7,046,273 | B2 | 5/2006 | Suzuki |
| 7,046,292 | B2 | 5/2006 | Ziemkowski |
| 7,068,316 | B1 | 6/2006 | Pine |
| 7,075,567 | B2 | 7/2006 | Hunter et al. |
| 7,079,176 | B1 | 7/2006 | Freeman et al. |
| 7,084,910 | B2 | 8/2006 | Amerson et al. |
| 7,123,935 | B2 | 10/2006 | Takahashi |
| 7,136,094 | B2 | 11/2006 | Ziemkowski |
| 7,139,018 | B2 | 11/2006 | Grosvenor et al. |
| 7,154,535 | B2 | 12/2006 | Yamasaki et al. |
| 7,158,175 | B2 | 1/2007 | Belz et al. |
| 7,161,619 | B1 | 1/2007 | Niida et al. |
| 7,219,365 | B2 | 5/2007 | Sato et al. |
| 7,221,863 | B2 | 5/2007 | Kondo et al. |
| 7,227,569 | B2 | 6/2007 | Maruya |
| 7,257,317 | B2 | 8/2007 | Ohnishi |
| 7,327,385 | B2 | 2/2008 | Yamaguchi |
| 7,333,134 | B2 | 2/2008 | Miyamoto |
| 7,340,766 | B2 | 3/2008 | Nagao et al. |
| 7,362,968 | B2 | 4/2008 | Kim |
| 7,366,979 | B2 | 4/2008 | Spielberg et al. |
| 7,379,116 | B2 | 5/2008 | Okamura |
| 7,411,623 | B2 | 8/2008 | Shibutani |
| 7,417,667 | B2 | 8/2008 | Shibutani |
| 7,448,063 | B2 | 11/2008 | Freeman et al. |
| 7,460,781 | B2 | 12/2008 | Kanai et al. |
| 7,474,338 | B2 | 1/2009 | Sato |
| 7,477,296 | B2 | 1/2009 | Okumura |
| 7,499,084 | B2 | 3/2009 | Kurakata |
| 7,511,737 | B2 | 3/2009 | Singh |
| 7,535,491 | B1 | 5/2009 | Kumagai et al. |
| 7,542,183 | B2 | 6/2009 | Satoh et al. |
| 7,576,770 | B2 | 8/2009 | Metzger et al. |
| 7,602,419 | B2 | 10/2009 | Kiuchi |
| 2001/0015759 | A1 | 8/2001 | Squibbs |
| 2001/0028398 | A1 | 10/2001 | Takahashi |
| 2001/0029521 | A1 | 10/2001 | Matsuda et al. |
| 2001/0032335 | A1 | 10/2001 | Jones |
| 2001/0033333 | A1 | 10/2001 | Suzuki et al. |
| 2001/0042043 | A1 | 11/2001 | Shear et al. |
| 2001/0044858 | A1 | 11/2001 | Rekimoto |
| 2001/0050875 | A1 | 12/2001 | Kahn et al. |
| 2002/0018137 | A1 | 2/2002 | Tsuda |
| 2002/0028026 | A1 | 3/2002 | Chen et al. |
| 2002/0030749 | A1 | 3/2002 | Nakamura et al. |
| 2002/0054232 | A1 | 5/2002 | Inagaki |
| 2002/0093575 | A1 | 7/2002 | Kusaka |
| 2002/0118958 | A1 | 8/2002 | Ishikawa et al. |
| 2002/0122194 | A1 | 9/2002 | Kuwata et al. |
| 2002/0149677 | A1 | 10/2002 | Wright |
| 2002/0171737 | A1 | 11/2002 | Tullis |
| 2002/0171747 | A1 | 11/2002 | Niikawa et al. |
| 2002/0176016 | A1 | 11/2002 | Misawa et al. |
| 2002/0191079 | A1 | 12/2002 | Kobayashi et al. |
| 2002/0196344 | A1 | 12/2002 | McIntyre et al. |
| 2002/0197067 | A1 | 12/2002 | Ohnishi |
| 2003/0007078 | A1 | 1/2003 | Feldis, III |
| 2003/0016289 | A1 | 1/2003 | Motomura |
| 2003/0018802 | A1 | 1/2003 | Romanik et al. |
| 2003/0020814 | A1 | 1/2003 | Ono |
| 2003/0021455 | A1 | 1/2003 | Dixon et al. |
| 2003/0021591 | A1 | 1/2003 | Grosvenor et al. |
| 2003/0025800 | A1 | 2/2003 | Hunter et al. |
| 2003/0030731 | A1 | 2/2003 | Colby |
| 2003/0037111 | A1 | 2/2003 | Yoshioka |

| | | |
|---|---|---|
| 2003/0063211 A1 | 4/2003 | Watanabe et al. |
| 2003/0069898 A1 | 4/2003 | Christodoulou et al. |
| 2003/0072491 A1 | 4/2003 | Sirivara et al. |
| 2003/0081140 A1 | 5/2003 | Furukawa |
| 2003/0090690 A1 | 5/2003 | Katayama et al. |
| 2003/0095191 A1 | 5/2003 | Saito |
| 2003/0103144 A1 | 6/2003 | Sesek et al. |
| 2003/0112354 A1 | 6/2003 | Ortiz et al. |
| 2003/0113014 A1 | 6/2003 | Katoh |
| 2003/0117642 A1 | 6/2003 | Haraguchi |
| 2003/0122940 A1 | 7/2003 | Myojo |
| 2003/0123078 A1 | 7/2003 | Kazami |
| 2003/0128272 A1 | 7/2003 | Clough et al. |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0160870 A1 | 8/2003 | Ziemkowski |
| 2003/0206232 A1 | 11/2003 | Suzuki et al. |
| 2003/0222998 A1 | 12/2003 | Yamauchi et al. |
| 2003/0234953 A1 | 12/2003 | Dawson et al. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0012686 A1 | 1/2004 | Ono et al. |
| 2004/0017333 A1 | 1/2004 | Cooper et al. |
| 2004/0032517 A1 | 2/2004 | Walmsley et al. |
| 2004/0042679 A1 | 3/2004 | Yamada |
| 2004/0046885 A1 | 3/2004 | Regan et al. |
| 2004/0061782 A1 | 4/2004 | Kinjo |
| 2004/0066968 A1 | 4/2004 | Glickman |
| 2004/0070586 A1 | 4/2004 | Taubin |
| 2004/0070678 A1 | 4/2004 | Toyama et al. |
| 2004/0075750 A1 | 4/2004 | Bateman |
| 2004/0080653 A1 | 4/2004 | Tanaka et al. |
| 2004/0080661 A1 | 4/2004 | Afsenius et al. |
| 2004/0085456 A1 | 5/2004 | Kwag et al. |
| 2004/0095480 A1 | 5/2004 | Battles et al. |
| 2004/0105015 A1 | 6/2004 | Tsukioka |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0145501 A1 | 7/2004 | Hung |
| 2004/0150724 A1 | 8/2004 | Nozaki et al. |
| 2004/0160453 A1 | 8/2004 | Horton et al. |
| 2004/0172440 A1 | 9/2004 | Nakajima et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0183903 A1 | 9/2004 | Pedersen |
| 2004/0187583 A1 | 9/2004 | Ogawa |
| 2004/0201687 A1 | 10/2004 | Perotti et al. |
| 2004/0201690 A1 | 10/2004 | Bryant et al. |
| 2004/0201709 A1 | 10/2004 | McIntyre et al. |
| 2004/0233308 A1 | 11/2004 | Elliott et al. |
| 2004/0239958 A1 | 12/2004 | Nagata et al. |
| 2004/0252193 A1 | 12/2004 | Higgins |
| 2004/0252230 A1 | 12/2004 | Winder |
| 2004/0253990 A1 | 12/2004 | McCoog et al. |
| 2004/0257462 A1 | 12/2004 | Goris et al. |
| 2004/0263634 A1 | 12/2004 | Kiuchi |
| 2004/0263658 A1 | 12/2004 | Cozier et al. |
| 2005/0007471 A1 | 1/2005 | Walmsley et al. |
| 2005/0010407 A1 | 1/2005 | Jaroker |
| 2005/0013602 A1 | 1/2005 | Ogawa |
| 2005/0013604 A1 | 1/2005 | Ogawa |
| 2005/0018053 A1 | 1/2005 | Suga et al. |
| 2005/0028221 A1 | 2/2005 | Liu et al. |
| 2005/0036033 A1 | 2/2005 | Imai |
| 2005/0046707 A1 | 3/2005 | Takane |
| 2005/0052685 A1 | 3/2005 | Herf et al. |
| 2005/0057687 A1 | 3/2005 | Irani et al. |
| 2005/0080894 A1 | 4/2005 | Apostolopoulos et al. |
| 2005/0084113 A1 | 4/2005 | Simpson et al. |
| 2005/0093980 A1 | 5/2005 | Nonaka et al. |
| 2005/0103863 A1 | 5/2005 | Zhu et al. |
| 2005/0113136 A1 | 5/2005 | Gosieski, Jr. |
| 2005/0130717 A1 | 6/2005 | Gosieski et al. |
| 2005/0131905 A1 | 6/2005 | Margolus et al. |
| 2005/0150362 A1 | 7/2005 | Uehara |
| 2005/0152619 A1 | 7/2005 | Motomura et al. |
| 2005/0158015 A1 | 7/2005 | Nakayama et al. |
| 2005/0187901 A1 | 8/2005 | Maritzen et al. |
| 2005/0193421 A1 | 9/2005 | Cragun |
| 2005/0195291 A1 | 9/2005 | Kubo |
| 2005/0203930 A1 | 9/2005 | Bukowski et al. |
| 2005/0212912 A1 | 9/2005 | Huster |
| 2005/0212950 A1 | 9/2005 | Kanai |
| 2005/0231625 A1 | 10/2005 | Parulski et al. |
| 2005/0262097 A1 | 11/2005 | Sim-Tang et al. |
| 2005/0278461 A1 | 12/2005 | Ohta |
| 2006/0023066 A1 | 2/2006 | Li et al. |
| 2006/0028553 A1 | 2/2006 | Mori et al. |
| 2006/0044394 A1 | 3/2006 | Read |
| 2006/0044398 A1 | 3/2006 | Foong et al. |
| 2006/0044416 A1 | 3/2006 | Miyazaki et al. |
| 2006/0061451 A1 | 3/2006 | Chen |
| 2006/0087559 A1 | 4/2006 | Huberman et al. |
| 2006/0087941 A1 | 4/2006 | Obradovich |
| 2006/0092291 A1 | 5/2006 | Bodie |
| 2006/0098112 A1 | 5/2006 | Kelly |
| 2006/0109349 A1 | 5/2006 | Takashima |
| 2006/0112413 A1 | 5/2006 | Ando et al. |
| 2006/0125922 A1 | 6/2006 | Albert et al. |
| 2006/0125928 A1 | 6/2006 | Wolcott et al. |
| 2006/0125937 A1 | 6/2006 | LeGall et al. |
| 2006/0143665 A1 | 6/2006 | Meek et al. |
| 2006/0177132 A1 | 8/2006 | Jackson et al. |
| 2006/0203099 A1 | 9/2006 | Omata |
| 2006/0268117 A1 | 11/2006 | Loui et al. |
| 2007/0195373 A1 | 8/2007 | Singh |
| 2007/0252901 A1 | 11/2007 | Yokonuma et al. |
| 2008/0023232 A1 | 1/2008 | Morag et al. |
| 2008/0192129 A1* | 8/2008 | Walker et al. ............... 348/231.2 |
| 2009/0033752 A1 | 2/2009 | Bodnar et al. |

FOREIGN PATENT DOCUMENTS

| | | |
|---|---|---|
| JP | H09-018762 | 1/1997 |
| JP | 10023303 | 1/1998 |
| JP | 2001045452 A | 2/2001 |
| JP | 2001086383 | 3/2001 |
| JP | 2001-309236 A | 11/2001 |
| JP | 2002-094862 A | 3/2002 |
| JP | 2003-009044 A | 1/2003 |
| JP | 2004274625 A | 9/2004 |

OTHER PUBLICATIONS

U.S. Appl. No. 12/284,202, Jung et al.

U.S. Appl. No. 12/283,420, Jung et al.

2TIFF.COM; "Introduction to 2TIFF"; pp. 1-3; located at http://www.2tiff.com/help/; bearing a date of 2004; printed on Feb. 16, 2005.

ABOUT.COM; "Image Size and Resolution"; pp. 1-3; located at http://graphicssoft.about.com/od/resolution/; bearing a date of 2005; printed on Feb. 16, 2005.

ADOBE.COM, "Share images with Photo Mail (Win only)", pp. 1-4, located at http://www.adobe.com/tips/phsel3photomail/main.html, printed on Jan. 26, 2005.

Bockaert, Vincent; "Interpolation"; pp. 1-4; located at http://www.dpreview.com/learn/?/Glossary/Digital_Imaging/Interpolation_01.htm; bearing a date of 1998-2005; printed on Feb. 16, 2005.

CANON.CA, "Print/Share Button", pp. 1-2, located at http://www.canon.ca/digitalphotography/english/ctech_article.asp?id=174&tid=6, bearing a date of Jan. 26, 2005, printed on Jan. 26, 2005.

CG.ITS.TUDELFT.NL, Delft University of Technology, "Shared cameras", pp. 1, located at http://www.cg.its.tudelft.nl/~spiff/descSC.html, printed on Jan. 27, 2005.

CHAINSTYLE.COM; "Resolution and Image Size"; pp. 1-9; located at http://www.chainstyle.com/photoshop/webhelp/tutorials/basics/resolution_and_image_size.htm; printed on Feb. 16, 2005.

Chastain, Sue; "Q. Is it better to use in-camera digital zoom or crop and resample with software?"; pp. 1-2; located at http://graphicssoft.about.com/cs/digitalimaging/f/digitalzoom.htm; bearing a date of 2005; printed on Feb. 16, 2005.

Dave; "How Many Pixels? A reasoned approach to digicam specifications"; pp. 1-5; located at http://www.imaging-resource.com/ARTS/HOWBIG/HOWBIG.HTM; bearing a date of 1999; printed on Feb. 16, 2005.

DEBIAN.ORG, "GNUstep application for digital still cameras", pp. 1-2, located at http://packages.debian.org/unstable/graphics/camera.app, bearing a date of Jan. 26, 2005, printed on Jan. 27, 2005.

Digital Photography Review, "Kodak EasyShare One", pp. 1-5, located at http://www.dpreview.com/news/0501/05010605kodakeasyshareone.asp, bearing a date of Jan. 6, 2005, printed on Jan. 26, 2005.

Ekdahl, Lars; "Image Size and roslution"; pp. 1-5; located at http://www.ekdahl.org/kurs/resolution/resolution2_eng.htm; bearing a date of 2002; printed on Feb. 16, 2005.

GEOCITIES.COM; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.

Har-Peled, Sariel; Koltun, Vladlen; Song, Dezhen; Goldberg, Ken; CiteSeer.Ist:, "Efficient Algorithms for Shared Camera Control", pp. 1-2, located at http://citeseer.ist.psu.edu/har-peled02efficient.html, bearing a date of 2002, printed on Jan. 26, 2005.

HOME.IPRIMUS.COM.AU; "Digital Cameras and Resampling"; pp. 1-2; located at http://home.iprimus.com.au/painless/resample.htm; printed on Feb. 16, 2005.

HP.COM, "HP Image Zone Express step-by-step: HP Instant Share", pp. 1-4, located at http://www.hp.com/united-states/ize/steps_instant_share.html, printed on Jan. 26, 2005.

Hua, Zhigang; Xie, Xing; Lu, Hanqing; Ma, Wei-Ying; Research.Microsoft.com, "COBO: Building Cooperative Environment for Cross-Device Image Sharing", pp. 1, located at http://research.microsoft.com/research/pubs/view.aspx?type=technical+report&id=823, bearing a date of Nov. 2004, printed on Jan. 25, 2005.

IMAGING RESOURCE.COM; "The Imaging Resource Quick Review"; pp. 1-22; located at http://www.imaging-resource.com/PRODS/1700/170A.HTM; bearing a date of 2001; printed on Feb. 16, 2005.

INTEL.COM, "Intel® PC Cameras", pp. 1-2, located at http://www.intel.com/pccamera/, printed on Jan. 27, 2005.

KODAK.COM, "Frequently Asked Questions", pp. 1, located at http://www.kodak.com/global/en/service/knowledgebase/digital-camera-faqs.jhtml?pq-path=1396/5759, bearing a date of Jan. 6, 2005, printed on Jan. 26, 2005.

Koren, Norman, "Understanding image sharpness: Digital cameras vs. film, part 2", pp. 1-16, located at http://www.normankoren.com/Tutorials/MTF7A.html, bearing a date of 2000-2004, printed on Feb. 4, 2005.

LTLIMAGERY.COM; "About Resolution Understanding Digital Image Resolution"; pp. 1-10; located at http://www.ltlimagery.com/resolution.html; bearing a date of 2000-2004; printed on Feb. 16, 2005.

MOBILEMAN, "Nikon D2H WiFi Digital Camera", pp. 1-2, located at http://www.mobilemag.com/content/100/336/C2502/, bearing a date of Feb. 20, 2004, printed on Jan. 25, 2005.

MONEY.CNN.COM, "Playboy coming to iPod", pp. 1-2, located at http://money.cnn.com/2005/01/05/technology/personaltech/playboy_ipod/index.htm, bearing a date of Jan. 5, 2005, printed on Jan. 26, 2005.

Rains, Nick, "Vietnam Travel Photography The Digital Way", pp. 1-7, located at http://www.luminous-landscape.com/locations/vietnam.shtml, bearing a date of 2003, printed on Feb. 3, 2005.

RITZCAMERA.COM, "Canon—Powershot A85 Digital Camera", pp. 1-8, located at http://www.ritzcamera.com/webapp/wcs/stores/servlet/ProductDisplay?storeId=10001&catalogId=10001&langId=-1&productId=13176854, printed on Jan. 26, 2005.

Ross, Suzanne, Research.Microsoft.com, "The Life of a Digital Photo", pp. 1-5, located at http://research.microsoft.com/displayArticle.aspx?id=605, printed on Jan. 25, 2005.

Sciannamea, Michael, "WiFi-Enabled Digital Cameras About to Tap a Growing Marketplace", pp. 1-5, located at http://wifi.weblogsinc.com/entry/7312187118786387/, bearing a date of Oct. 12, 2004, printed on Jan. 25, 2004.

Sellen, Abigail; Fleck, Rowanne; Kindberg, Tim; Spasojevic, Mirjana; Research.Microsoft.com, "How and Why People Use Camera Phones", pp. 1-16, located at http://research.microsoft.com/research/pubs/view.aspx?type=technical+report&id=823 bearing a date of Nov. 2004, printed on Jan. 25, 2005.

Sutherland, Ed; "CSR Intros Low-Cost, Single-Chip WiFi", pp. 1-3, located at http://www.wi-fiplanet.com/news/article.php/3434131, bearing a date of Nov. 10, 2004, printed on Jan. 25, 2005.

SWGC.MUN.CA; "About image size and resolution"; pp. 1-7; located at http://www.swgc.mun.ca/vart2600/resolution.html; printed on Feb. 16, 2005.

Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.

CO-ARRAY.ORG; "A Brief Overview of Co-Array Fortran"; pp. 1-3; located at http://www.co-array.org/caf_intro.htm; printed on May 3, 2005.

Colbert, Martin; Voglimacci, Catherine; Finkelstein, Anthony; "Live, Audio-Visual Communication Systems for Distance Learning: Experience, Heuristics and ISDN"; pp. 1-40.

Cummins, Fred; "Synchronization Among Speakers Reduces Macroscopic Temporal Variability"; pp. 1-6.

Dodd, George; "Music Performance Venues-keeping them in tune with modern requirements"; pp. 1-11.

El Saddik, Abdulmotaleb DR.; "Multimedia Communications: Multimedia Technologies & Applications"; Multimedia Communications Research Laboratory, School of Information Technology and Engineering, University of Ottawa, Ottawa, Ontario, Canada; 22 slides; pp. 1-8.

GIZMODO.COM; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.

Hernandez, J.R.; Perez-Gonzalez, F.; Rodriguez, J.M.; "Coding and Synchronization: A Boost and a Bottleneck for the Development of Image Watermarking"; pp. 1-7; Dept. Tecnologias de las Comunicaciones, ETSI Telecom., Universidad de Vigo, 36200 Vigo, Spain.

Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.

Jain, Anil K.; "Fundamentals of Digital Image Processing"; 1989; pp. 1-569; Prentice-Hall, Inc.; Englewood Cliffs, NJ U.S.A.

Mahmoud, Qusay H.; "Getting Started with Data Synchronization Using SyncML"; pp. 1-6; located at http://developers.sun.com/techtopics/mobility/midp/articles/syncml/; bearing dates of Sep. 2004 and 1994-2005; printed on May 3, 2005.

National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000_us; bearing a date of 2005; printed on May 3, 2005.

National Instruments Corporation; "Genlocking Multiple JAI CV-M1 Cameras"; pp. 1-5; located at http://zone.ni.com/devzone/conceptd.nsf/webmain/7a6b5853548850e886256c21005b1413; bearing a date of 2005; printed on May 3, 2005.

National Instruments Corporation; "Multi-Camera Acquisition"; pp. 1-3; located at http://zone.ni.com/devzone/conceptd.nsf/webmain/D91BAC1317F9D0A686256C9300769A0D; bearing a date of 2005; printed on May 3, 2005.

ROADCASTING.ORG; "A new type of radio"; "Final Design"; "Process"; "Conclusions"; "Recognition"; "How Roadcasting Works"; "Download"; pp. 1-15; located at www.roadcasting.org; printed on Jun. 2, 2005.

Seifert, Eric; Eligator, Ron; "Acoustical Design Considerations at Universal Studios CityWalk™, Orland, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.

"SOUNDaround: Get cinema quality surround sound through two speakers"; RAM: SOUNDaround by Xitel; pp. 1-7; located at http://www.ramelectronics.net/html/soundaround.html; printed on Jul. 20, 2005.

STARBURSTHOMEPAGE.COM; "Life is all about Sharing"; p. 1; located at http://www.starbursthomepage.com/flashpointx.htm; printed on Jun. 29, 2005.

STARBURSTHOMEPAGE.COM; "Sharing-On-The-Go Technology"; pp. 1-3; located at http://www.starbursthomepage.com/fsotg.htm; printed on Jun. 29, 2005.

STARBURSTHOMEPAGE.COM; "Specifications and Data Transfer Information"; pp. 1-5; located at http://www.starbursthomepage.com/fspec.htm; printed on Jun. 29, 2005.

STARBURSTHOMEPAGE.COM; "What are FlashPoint ShareDrives"; pp. 1-4; located at http://www.starbursthomepage.com/fproducts.htm; printed on Jun. 29, 2005.

"Yamaha Internet 'MidLive vol. 3': An Open Experiment: The First MidLive to Feature Synchronized Streaming of MIDI and Audio Data"; Yamaha News Release: wMid Live vol. 3x; pp. 1-5; located at http://www.yamaha.co.jp/english/news/97121101.html; bearing a date of Dec. 1997; printed on Jul. 19, 2005.

PHYSORG.COM; "World's First Built-In Wi-Fi-Enabled Digital Cameras"; pp. 1-3; located at http://www.physorg.com/news6183.html; bearing a date of Sep. 2, 2005; printed on Sep. 7, 2005.

U.S. Appl. No. 11/213,324, Jung et al.
U.S. Appl. No. 11/210,284, Jung et al.
U.S. Appl. No. 11/190,516, Jung et al.
U.S. Appl. No. 11/173,166, Jung et al.
U.S. Appl. No. 11/153,868, Jung et al.
U.S. Appl. No. 11/143,970, Jung et al.
U.S. Appl. No. 11/129,045, Jung et al.
U.S. Appl. No. 11/122,274, Jung et al.
U.S. Appl. No. 11/089,530, Jung et al.

Grant, Andrew; "Open vs. Closed Source Software"; Science in Africa-Africa's First On-Line Science Magazine; bearing a date of Jan. 2004; Science in Africa, Science magazine for Africa, © 2002; pp. 1-4; located at http://www.scienceinafrica.co.za/2004/january/software.htm.

Palmer, James M.; "Radiometry and Photometry FAQ, Version 1.01"; bearing a date of Jun. 1999; pp. 1-14; located at: http://employeepages.scad.edu/~kwitte/documents/Photometry_FAQ.PDF.

U.S. Appl. No. 12/799,398, filed Sep. 16, 2010, Jung et al.
U.S. Appl. No. 12/799,367, filed Oct. 28, 2010, Jung et al.

"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.

"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

* cited by examiner

CLIENT/SERVER OR MASTER/SATELLITE CONFIGURATION

PEER-TO-PEER CONFIGURATION

CLIENT/SATELLITE SHARED IMAGE DEVICE CONFIGURATION

PROXIMITY OF SHARED IMAGE DEVICES

CROSS-REFERENCE TO RELATED APPLICATIONS

The present application is related to, and claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/048,644, entitled SHARED IMAGE DEVICES, naming Edward K. Y. Jung; Royce A. Levien; Robert W. Lord; Mark A. Malamud and John D. Rinaldo, Jr. as inventors, filed 31 Jan. 2005.
2. U.S. patent application Ser. No. 11/048,629, entitled VIEWFINDER FOR SHARED IMAGE DEVICE, naming Edward K. Y. Jung; Royce A. Levien; Robert W. Lord; Mark A. Malamud and John D. Rinaldo, Jr. as inventors, filed 1 Feb. 2005.
3. U.S. patent application Ser. No. 11/064,787, entitled STORAGE ASPECTS FOR IMAGING DEVICE, naming Edward K. Y. Jung; Royce A. Levien; Robert W. Lord; Mark A. Malamud and John D. Rinaldo, Jr. as inventors, filed 23 Feb. 2005.
4. U.S. patent application Ser. No. 11/069,909, entitled SHARING INCLUDING PERIPHERAL SHARED IMAGE DEVICES, naming Edward K. Y. Jung; Royce A. Levien; Robert W. Lord; Mark A. Malamud and John D. Rinaldo, Jr. as inventors, filed 28 Feb. 2005.
5. U.S. patent application Ser. No. 11/089,530, assigned, entitled PERIPHERAL SHARED IMAGE DEVICE SHARING, naming Edward K. Y. Jung; Royce A. Levien; Robert W. Lord; Mark A. Malamud and John D. Rinaldo, Jr. as inventors, filed 23 Mar. 2005.
6. U.S. patent application Ser. No. 11/095,768, entitled IMAGE TRANSFORMATION ESTIMATOR OF AN IMAGING DEVICE, naming Edward K. Y. Jung; Royce A. Levien; Robert W. Lord; Mark A. Malamud and John D. Rinaldo, Jr. as inventors, filed 30 Mar. 2005.

The present application relates, in general, to sharing mechanisms that allows sharing images between multiple devices at least partially based on proximity of the devices.

One aspect includes but is not limited to: transmitting at least one portion of at least one image representation from a first shared image device in a manner at least partially relying on a proximity of the first shared image device and an at least one other shared image device. In addition to the foregoing, other method aspects are described in the claims, drawings, and text forming a part of the present application.

Another aspect includes but is not limited to: receiving at a first shared image device at least one portion of at least one image representation at least partially in response to a proximity of the first shared image device and at least one other shared image device. In addition to the foregoing, other method aspects are described in the claims, drawings, and text forming a part of the present application.

Yet another aspect includes but is not limited to: a first shared image device configurable to transmit at least a portion of at least one image representation at least partially in response to a proximity of the first shared image device and an at least one other shared image device. In addition to the foregoing, other apparatus aspects are described in the claims, drawings, and text forming a part of the present application.

Yet another aspect includes but is not limited to: a first shared image device configurable to receive at least a portion of at least one image representation at least partially in response to a proximity of the first shared image device and an at least one other shared image device. In addition to the foregoing, other apparatus aspects are described in the claims, drawings, and text forming a part of the present application.

Another aspect includes but is not limited to: means for receiving at least one portion of at least one image representation at a first shared image device at least partially in response to a proximity of the first shared image device and at least one other shared image device. In addition to the foregoing, other apparatus aspects are described in the claims, drawings, and text forming a part of the present application.

Still another aspect includes but is not limited to: a communication link configurable to transfer, at least partially relying on a proximity, an at least one portion of at least one image representation in at least part of an operational coupled distance from a first shared image device to an at least one other shared image device, wherein the at least one other shared image device is configurable to capture at least one image. In addition to the foregoing, other apparatus aspects are described in the claims, drawings, and text forming a part of the present application.

Another aspect includes but is not limited to: a first shared image device configurable to receive a request to share at least a portion of at least one image representation from at least one other shared image device; and the first shared image device configurable to transmit the at least the portion of the at least one image representation to the at least one other shared image device at least partially in response to the request to share, and wherein the transmission is at least partially provided based upon a proximity of the first shared image device and the at least one other shared image device. In addition to the foregoing, other system aspects are described in the claims, drawings, and text forming a part of the present application.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the summary is illustrative only and is not intended to be in any way limiting. Other aspects, features, and advantages of the devices and/or processes and/or other subject matter described herein will become apparent in the text set forth herein.

BRIEF DESCRIPTION OF THE FIGURES

The use of the same symbols in different drawings typically indicates similar or identical items.

DETAILED DESCRIPTION

Figure 1:
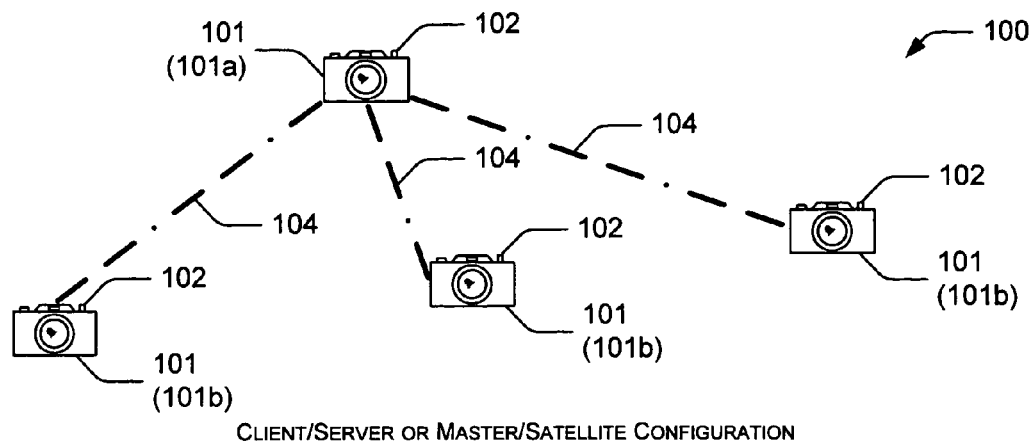
FIG. 1 shows a schematic diagram of one embodiment of a shared image network including a plurality of shared image devices, the plurality of shared image devices include a sharing mechanism.

This disclosure describes a number of embodiments of sharing mechanisms 102 that can each be integrated in, and/or utilized by, at least one shared image device 101, as described for example with respect to FIGS. 1, 2, 3, and 4. Certain embodiments of the shared image devices can capture an image and can be visualized as taking or imaging a photograph in certain embodiments. The present disclosure provides a number of sharing mechanisms 102 by which the shared images can be shared or copied, and can either be transferred from either capturing or non-capturing shared image devices to other capturing shared image devices and/or other non-capturing shared image devices via a one or more communication links 104 and/or devices. In this disclosure, the term "capture" can apply to either imaging, photographing, or otherwise generating or producing shared images or portions thereof. For example, combining multiple images photographed by multiple cameras can represent one embodiment of capturing, as can taking an original photograph.

This disclosure provides a number of embodiments of mechanisms by which one or more shared images can be transferred from a capturing shared image device to a peripheral shared image device, from a peripheral shared image device to a capturing shared image device, between one or more peripheral shared image devices, or between one or more capturing shared image devices. Such transferring of shared images between multiple shared image devices can occur either directly or indirectly to another one or more peripheral shared image devices or capturing shared image devices. Such an indirect communication can occur via either one or more peripheral shared image devices or a capturing shared image device, or alternatively can occur via at least one other device that is not a capturing shared image device or a peripheral shared image device.

This disclosure also describes a variety of the communication links 104 that can rely at least partially upon a proximity between multiple shared image devices. Proximity can relate to the type of communication link being utilized. For example, certain embodiments of communication links may work well when the multiple shared image devices are within the same home, building, campus, or larger area. As such, the proximity of multiple shared image devices (which may include one or more shared image devices that can capture images as well as one or more shared image devices that cannot capture images) provide a mechanism to transfer shared images therebetween.

Different embodiments of the shared image devices 101 can each perform one or more processes including, but not limited to capturing, creating, processing, storing, printing, transferring, obtaining, retaining, displaying, and/or receiving the shared images. Different embodiments of the shared images can be configurable as still images (e.g. photographs) and/or motion images (e.g., moving pictures). Many embodiments of the sharing mechanism 102 can be integrated between one or more shared image devices 101. Within the disclosure, certain embodiments of the shared image devices 101, such as digital cameras, camcorders, etc. that can capture shared image information are referred to as "capturing shared image devices", which can be considered as distinct from those shared image devices 101 that cannot capture shared image information. The capturing shared image devices such as digital cameras, still-picture cameras, motion picture cameras, or camcorders can be utilized within photography. Many shared image devices that cannot capture images can be referred to within this disclosure as "peripheral shared image devices", which can perform such peripheral operations to images and/or other data as storing, saving, store and forwarding, displaying, projecting and/or otherwise processing.

There are a variety of configurations that can be provided by such shared image devices. For example, shared images transferred between shared image devices can be transferred between capturing shared image devices, such as camera, to peripheral shared image devices such as hard disks, printers, computers, etc.), and the converse is also true. In another embodiment, a user of a capturing shared image device such as a camera can, for example, receive images from a peripheral shared image device (which may have been captured by other shared image devices) such as receiving images therefrom using either a user interface and/or automatically. Such sharing mechanisms can include direct downloading of images, walking over a smart doormat to your home as you leave transfers all the images on the camera you are carrying to your home image display frames, and a variety of other techniques.

Within the disclosure, the terms shared image(s), image(s), image representation(s), image(s), or image information each pertain to full images, portions of images, segments of full images, magnified images, reduced resolution images, thumbnails of images, information that describes particular images such as metadata. Metadata can contain such information as the subject of the image, identifying who took the image, image location, the reference number of the image, etc. Within this disclosure, the terms "image representation" or "image" can pertain (among other things) to images, thumbnails of images, icons that pertain to images, portions of images, images having altered resolution, information pertaining to images such as metadata, etc. The term "obtain" applies to obtaining shared images either by capturing or by data transfer from another shared image device. The term "retain" applies to storing shared images for some duration regardless how temporary or permanent the storage.

In this disclosure, the term "broadcast" can apply but is not limited to: transmitting one or more shared images from one shared image device(s) in a manner such that the signal can be received by at least one (and usually multiple) other shared image device(s), transmitting to all other shared image devices, transmitting to all other shared image devices in the enrolled in a sharing session, and/or transmitting to only certain selected shared image devices. Broadcasting can be utilized in general networks, master-satellite networks, server-satellite networks, peer-to-peer or point-to-point (alternatively, P2P) networks, or any of variety of other applicable network configurations, certain ones of which are as described in this disclosure.

A variety of processing techniques may be utilized by different ones of the shared image devices. These processing techniques include, but are not limited to, combining multiple images into single images, and/or transforming a particular image. Examples of transforming include, but not limited to, image transforming, format-sharing of images, and watermark-transforming. Watermark-transforming includes providing additional textual, or other, image information to an image that can be used to identify the source, location, identity, and/or other information about an image. For example, if multiple shared image devices are sharing images, or portions thereof, it may be desirable to indicate using a watermark-transforming and original identity of each particular image. Transforming of an image can include, but is not limited to, such imaging aspects as image compression, resolution changing, addition of one or more audio streams, etc. Ancillary information can be applied as a variety of information that can be integrated in, or associated with, the image at the receiving device. The ancillary information is intended to include, but is not limited to, at least one from a group of format-shared information, associated information, textual information, audio, annotation information, image map information, executable code, data overlay information, transmitted license, etc. Ancillary information can be attached to, or integrated within, images transmitted between shared image devices. In certain embodiments, by utilizing transforming including ancillary information, and/or format-sharing, a shared image that is being received at a receiving shared image device can appear largely as transmitted by the transmitting shared image device, regardless of differences in format, etc. between the transmitting shared image device in the receiving shared image device.

In this disclosure, the terms "shared imaging devices" "cameras", etc. apply to such dissimilar devices as digital cameras, video cameras, and/or camcorders. The shared image device can capture certain embodiments of still images including, but not limited to, photographs or digital images. Certain embodiments of shared image devices such as a camcorder or motion picture video camera can capture motion images such as videos. The imaging devices can integrate a sharing mechanism to either capture, obtain, retain, store, or transfer such shared images. A variety of embodiments of the sharing mechanism can therefore capture or otherwise process, retain, or obtain such exemplary shared images as digital still images or digital motion images that are provided either alone or in combination with video, audio, music, etc.

Examples of shared image devices 101 that are not configurable to capture shared image information can include certain laptop computers, desktop computers, portable image store and display devices, digital video disk (DVD) devices, personal display assistants (PDA), printers, compact disk (CD) drives, IPods (a trademark of Apple Computers), etc. Certain embodiments of portable image store and display devices can be configurable to utilize peer-to-peer communications, and may be capable of transferring shared images there between. Certain embodiments of the shared image devices that cannot capture shared image information operate largely to retain, obtain, store, process, and/or display shared images.

To provide a sharing session utilizing a number of shared image devices, it is important that each device be allowed to establish a permission to join the sharing session, and additionally that each device be provided an ability to join the sharing session. The establishing the permission to share, and the providing the ability to share, by each shared image device may be combined in some manner, or may be maintained as distinct operations.

In different embodiments, sharing mechanisms can provide a largely automated publishing function between multiple shared image devices. Certain shared image(s) that are captured by a shared image device can be distributed or transmitted to, and/or received by, other shared image devices, and thereby be "published" and made public (and therefore can be considered to be no longer private). One embodiment of the sharing mechanism 102 allows the shared image device 101 to toggle on/off publishing of the shared images to switch between the images being public and private. In certain embodiments, such publishing can be automatically set for a prescribed duration such as temporally or more permanently defined by a "sharing session", after which duration the shared image devices each returns to their non-sharing configuration. In other embodiments, the sharing session can be permanent or have a lengthy duration.

Certain embodiments of the shared image device 101 that include at least a portion of the sharing mechanism 102 can be modifiable to provide a variety of functions. Many embodiments of shared image devices, such as cameras or camcorders, that can capture shared images can also function as storage devices to store some data pertaining to shared images. Certain capturing embodiments of shared image devices can also act as a memory acquisition device that obtains or retains pictures from other shared image devices. Other embodiments of the shared image device 101 such as portable image storage and display devices can be configurable as storage devices, in which shared images can be stored, accessed, and/or displayed.

The very structure, nature, or operation of certain embodiments of such imaging devices such as cameras, digital cameras, or camcorders are likely to change as the associated technology improves. For example, it is likely that many digital cameras and/or camcorders will develop greater memory storage capabilities as the associated memory storage technologies improve. In this disclosure, multiple capturing shared image devices and/or multiple peripheral shared image devices could be "networked" in such a manner that a large number of images can be transferred between multiple capturing shared image devices. Certain capturing shared image devices can be optimized for their data storage or processing capabilities, and as such may act somewhat like computer servers. Other capturing shared image devices can be designed for their photographic or zooming abilities, and as such may be considered as true capturing or imaging devices. As the characteristics and abilities of different shared image devices vary more, the benefits of networking the shared image devices increases as well. Certain sharing concepts, as described herein, enhance the networking aspects of the capturing shared image devices.

In this disclosure, "subscribing" pertains to a user joining their shared image device (which, in different embodiments, can be configured either as a capturing shared image device or as a peripheral shared image device) in a session to provide shared images to and/or receive shared images from other shared image devices. In certain embodiments of the shared image device, it can be desired to subscribe to different functions using different mechanisms. While any combination of particular functions may be described with respect to this disclosure, this disclosure is intended to describe other shared image devices that can perform varied or alternative functions.

Certain embodiments of shared image devices 101 provide a mechanism by which certain shared image devices that are enrolled in a sharing session may not share every image that is being captured. For example, certain images captured by a particular shared image device may be considered as private, and therefore are not for general distribution during a sharing session with other member shared image devices. Certain communication links 104 that connect between pairs of shared image devices can be private in one direction while public in another direction, public in both directions, or private in both directions. For example, it may be desired to configure a communication link from a capturing shared image device to a peripheral shared image device to be either public or private; while the communication link from the peripheral shared image device to the capturing shared image device can be the reverse or the same.

Certain embodiments of the shared image devices 101 can provide such operations as, but are not limited to: performing active sharing between multiple shared image devices, temporarily pausing or muting the active sharing, resuming the active sharing after temporarily pausing or muting, connecting with other devices and/or people, or temporarily performing or delaying a variety of operations. Such temporary pausing or muting of sharing operations may be equated to temporarily halting a subscription for a particular shared image device; and in many embodiments the shared images that were shared during this pausing or muting period can be transmitted or collected after the pausing or muting. Other aspects and concerns of sharing the shared images can relate to managing the shared image devices. Examples of these tasks include controlling and selecting image resolution, allowing shared images to exit a particular shared image device but not enter the same shared image device, or vice versa.

It is to be understood that certain embodiments of the shared image device 101 can be configurable in a variety of network configurations, for example as described in this disclosure with respect to FIG. 1, 2, 3, or 4. These network configurations are illustrative in nature, and not limiting scope. Additionally, the multiple shared image devices that are included in a particular network can frequently change their association and operation. For example, the sharing mechanism 102 as described with respect to FIG. 1 can during a particular time period involve the left-most satellite shared image device 101*b* transmitting a shared image to the master shared image device 101*a*. The master shared image device 101*a* can thereupon transmit another shared image to another one of the satellite shared image devices 101*b* during a subsequent period. As such, the communications or networked configurations of multiple embodiments of the shared image devices can be fluid, changeable, and reliable to transfer a variety of shared images (that may be captured by one or more shared image devices) in a substantially controllable fashion.

Certain embodiments of shared image devices 101, as described with respect to FIGS. 1 to 4, can each include a portion of a share mechanism 102, such as a share button, that the owner of the shared image device 101 can actuate by such action as physically pressing. An actuating portion of a sharing mechanism can act to join a number of shared image devices during a particular sharing session, and/or possibly perform some other function(s) relative to the sharing session. Actuating portions of certain embodiments of share mechanisms 102 can be conveniently located on some external casing of a digital camera or camcorder, or some other such location for easy actuation. Certain embodiments of the share mechanisms 102 can include those components and/or processes that allow one shared image device to share and/or copy images with at least one other shared image device during a particular sharing session.

In another embodiment, a share mechanism 102 can be included in a computer/controller based program to control the sharing process between multiple shared image devices. As such, certain embodiments of share mechanisms 102 can integrate a plurality of shared image devices, since more than one shared image device are involved in sharing images. Such a share mechanism can include an actuating portion that can actuate the sharing mechanism between a number of shared image devices, a graphical user interface (GUI) or computer display that can display copies of the shared images to the users across multiple shared image devices, and an authentication or authorization portion that can provide authentication or authorization between multiple shared image devices.

A number of other embodiments of the actuating portion of the sharing mechanism can differ considerably from a manually-actuated shared mechanism (such as a share button or share menu) to more automatic type devices. Certain embodiments of such shared image devices can rely on proximity between shared image devices. Certain embodiments of the sharing mechanism 102 can utilize near-field shared image devices that are within a prescribed range that can be automatically actuated to copy and/or share the shared image information. In certain embodiments, the actuating portion of the share mechanism can even be remotely positioned from the associated shared image device 101, such as in a remote-control of the type that is in common usage for television, etc.

In another embodiment as described with respect to FIGS. 1 to 4, physical contact may actuate a share mechanism 102 within plurality of shared image devices 101. A Java ring (as produced and made commercially available by Dallas Semiconductor) provides an example of a commercially available actuating mechanism that can transmit data between numerous devices resulting from physical contact of those devices. An embodiment of a share mechanism 102 can include a Java ring or other similar device to automate actuation of many aspects of sharing images between multiple shared image devices 101. In certain embodiments, the actuating portion of the share mechanism can be positioned remotely from the associated shared image device 101, such as is well known in a remote control of the type that is in common usage for television, etc.

Examples of Shared Image Devices Relying on Proximity

In certain embodiments, various users can thereby transfer video, images, or some other type of information based on the proximity of shared image devices 101. Any combination of a plurality of capturing shared image device(s) and/or peripheral shared image device(s) can utilize proximity therebetween to establish the sharing mechanism 102. A variety of embodiments of the shared image device 101 can thereby rely on a variety of types of proximity between multiple sharing ones of the shared image devices to allow their sharing. The embodiment of geographic proximity, proximity utilizing a communication link 104, and/or proximity utilizing passwords, pass-phrases, patterns on paper, and the like as described within this disclosure with respect to FIGS. 1 to 4 can vary, and serve as examples of proximity between shared image devices.

In many embodiments, the term "proximity" indicates that shared image devices 101 are sufficiently close to operably couple with each other, such as to establish a communication link 104. In certain embodiments, a wireless link can provide the geographic proximity that allows data transfer of the shared images or portions thereof.

In one embodiment, the multiple shared image devices 101 can operably couple within the shared image network 100 using a series of communication links 104; different embodiments of the communication links are described with respect to FIGS. 1 to 4. A variety of embodiments of optical communication links 104 are within the intended scope of the present disclosure. Different embodiments of the communication link 104 can include, for example: a wireless link, an 802.11-based link, an infra-red data transfer link, a wired-based link, a physical-contact sharing mechanism that can transmit data upon physical contact, or any other type of link that allows for sufficient data to be transmitted between pairs of shared image devices 101.

Certain embodiments of the wireless communication link can utilize a variety of electromagnetic radiation to transmit data. The electromagnetic radiation that provides one embodiment of the wireless communication link 104 can include, but is not limited to, infrared, ultraviolet, near infrared, and/or optical signals. In one embodiment, a devoted optical communication link can cause data corresponding to the images to be transmitted between respective shared image devices. The communication link 104 can be configurable, in one embodiment, to operably couple a transmitting shared image device to a receiving shared image device. The transmitter, receiver, and/or transceiver portions of the communication link are to be configurable to carry sufficient data over the communication link considering the current task and/or network configuration.

In another embodiment, a camera flash can act as a communication link. The intensity of the camera flash can be modulated between different levels (including, but not limited to, turning the flash on and off) to transfer a variety of shared image data. Such directing of the optical flash in a suitable direction should act such that reflected light does not interfere with the modulated incident light produced by the camera flash. One aspect of using certain embodiments of the camera flash or other such wireless link is that multiple receiving shared image devices can simultaneously obtain shared images from a single transmitting shared image device (e.g., by the multiple receiving shared image devices receiving the same camera flash or other optical-link that is configured to transmit data substantially simultaneously).

In many embodiments of the interrelated shared image devices 101 as described with respect to FIGS. 1 to 4, the authentication of multiple shared image devices 101 implies that the shared image devices 101 be sufficiently closely spaced (considering the technology to be utilized) to allow communications therebetween, such as over the particular communication links. The shared image devices can rely on authentication and/or authorization to share images, image information, etc. with other shared image devices. Such authentication and/or authorization can often be inferred by geographic proximity, password proximity, and/or other types of proximity as described within this disclosure between multiple ones of the shared image devices depending upon the particular situation (while in other embodiments, this is not true). As such, in certain embodiments, shared image devices 101 that are associated with a particular wedding, children's birthday party, business meeting, or other event, etc. may establish the implicit/explicit authorization or authentication between multiple shared image devices. Such authorization or authentication may be based at least partially on the geographic (e.g., physical) proximity between shared image devices, and at least partially result from those shared image devices being located at the same event or sharing session. In many instances, the level of authentication or authorization for many shared image device events, such as birthday parties, may be assumed to be relatively low, while in others it may not be. Many of the concepts described herein can expand into other forms of geographic or temporal proximity depending upon the particular technology to be used.

Different embodiments of geographic-based proximity can range to a variety of dimensions including from within inches, to in the same room, to within the same building, to capable of accessing the same wireless LAN, to in the same stadium or part of a city, or beyond depending upon the technologies associated with the particular application or the communication link. In considering the application of certain commercially available transmitter/receiver capabilities, Bluetooth (a trademark of the Bluetooth Special Interest Group, a trade association) has an effective range of approximately 10 meters. Wireless Fidelity (WiFi, refers in this disclosure generically to any type of 802.11 network) can be located in a house or building, and can have an arbitrarily large range (especially by locating replicators or repeaters in each communication link 104 between multiple pairs of shared image devices 101). As such, shared image devices 101 can effectively communicate to each other through relatively extensive communication links 104 of variable dimensions. If a particular shared image device 101 has WiFi capabilities, the shared image device can have access to the Internet.

If the shared image network 100 is established as a close-proximity shared image network, each user can be provided with their individual "shared image device" 101 that can each be somehow proximally located with respect to the sharing image network during its sharing session. Each shared image device can be configurable to join the sharing session, and thereby synch their shared image device 101 to the current shared image devices.

In certain embodiments but not others, one shared image device 101 can continuously have its sharing mechanism actuated as to be in a sharing state. For example, a user can walk into a room with three friends that are currently enrolled in the sharing session, position the new shared image device 101 within the proximity of at least one of their shared image devices, and the shared images can be transferred utilizing such a technique such as being quick-synched to the new shared image device 101 over the communications link.

Certain commercially-available cellular phones include embedded cameras (therefore providing photographic capabilities) that can be configurable such that the images are transferred from that camera cellular phone to at least one other camera cellular phone, at least one land-phone, or at least one other receiving device using either a wireless, or some other suitable, connection. Many of the commercially-available camera cellular phones can thereby be considered to "push" one or more images to another device (such as a cellular phone, a computer, a personal display assistant (PDA), etc.) with a display. Such transfer mechanisms that "push" these pictures utilize the Internet, e-mail, or a similar file-transfer addressing mechanism (e.g., e-mail address or some associated addressing scheme). In certain embodiments, addressing the data associated with photographs can take some time, while in other embodiments such addressing is simplified. Addressing can be challenging in situations where the address of the recipient shared image device 101 is unknown or inaccessible. Certain embodiments of shared image devices can utilize addressing mechanisms.

Many embodiments of shared image devices 101, as described in this disclosure with respect to FIGS. 1 to 4, that include the sharing mechanisms 102 can transfer copies of shared images to at least one other shared image device 101. Such transfer of copies of shared images can thereby allow accessing of certain images, videos, audio, and/or other types of media produced by the other shared image devices 101 during a prescribed sharing session. Many embodiments of shared image devices 101 do not provide an addressing mechanism to transfer the shared images between different ones of the sharing devices (e.g., capturing and/or peripheral devices) during a particular sharing session. As such, a broadcast transfers data between many of the embodiments of the shared image devices. FIGS. 1 to 4 show a number of embodiments of the sharing image networks 100, each of the sharing image networks can include a number of similarly configured shared image devices 101, in which each of the shared image devices includes its respective sharing mechanism 102.

Within this disclosure, many embodiments of capturing shared image devices can be considered as similarly configured while others are not. Similarly, any embodiments of peripheral shared image devices can be considered as similarly configured while others are not. In this disclosure, the terms "similarly configured", "similarly configurable", or alternatively "similar" as applied to many embodiments of the shared image devices 101, can pertain to how each shared image device 101 processes or relates to its respective shared images. For example, certain embodiments of digital cameras, camcorders, video cameras, etc. can be configurable as capturing shared image devices that are capable of capturing, transferring, retaining, or obtaining such shared images as still images or motion images. In the embodiment as described with respect to FIGS. 1 and 2, shared image devices 101 are each configurable to be similar in general structure or operation, such that each shared image device is configurable as a capturing device such as a digital camera or camcorder that can be connected using, for example, point-to-point techniques or master-satellite techniques. Each capturing shared image device can capture, photograph, display, generate, receive, or process similar shared images such as digital images or video.

In many imaging situations, the resolution, imaging quality, and imaging characteristics of shared images are dependent on that particular shared image device that is performing the imaging. As such, even though shared image information may be shared between multiple shared image devices, the imaging quality of that shared image depends on the particular shared image device that images or captures (e.g., photographs) the shared information. As such, it may be desirable to capture many of the images with a high-quality shared image device (e.g., a relatively expensive high resolution) by using a number of shared image devices of the types as described in this disclosure.

Under different circumstances, certain users of the shared image devices may desire to store a relatively large number of captured images within their shared image device. As such, it may be desirable to utilize lower-resolution shared image devices to capture lower-resolution versions of certain images.

In certain instances, an optimal resolution of the images that may be captured by the different shared image device(s) may not be a deciding factor for a potential user selecting to share images with a particular shared image device. Perhaps a particularly good photographer is using a particular shared image device. Alternately, perhaps a shared image device is capturing a particularly desirable subject. Perhaps a particular shared image device can take excellent pictures under certain circumstances, for some known or unknown reason. Certain capturing shared image devices may rely upon an optical or a software-base zooming technique. As such, many participants in the sharing session may be interested in obtaining such shared images based on their inherent quality or value.

The combination of the shared image devices for a particular sharing session, as described in this disclosure, provides a technique by which one or more particular shared image devices can be selected to capture a particular shared image of a type such that shared image device may be the most appropriate.

Many embodiments of digital cameras can capture, process, display, generate, or receive digital images. Certain peripheral shared image devices 101 (e.g., printers, fax machines, PDAs, copiers, etc.) may generally be considered as a peripheral device, and not a similar device to digital cameras since such peripheral shared image devices cannot capture shared images, and can only perform such peripheral functions as printing, retaining, or displaying shared images. A sharing mechanism may be configurable to convey shared image information either alone, or in combination with audio, data, or a variety of other types of information as described herein.

Many of the embodiments of the sharing image network 100 can utilize a proximity between certain shared image devices 101 to provide a transfer of shared image information, shared images, etc. therebetween. The embodiment of the sharing image network 100, described with respect to FIG. 1, can be referred to as a master-satellite configuration since one of the shared image devices 101 is designated as, and acts as, a master shared image device 101*a* for a particular sharing session. The master shared image device can receive the shared images generated either alone and/or with other ones of the satellite shared image devices 101*b* that are designated in FIGS. 1 and 3 as 101b. The satellite shared image devices 101b can be operatively coupled to the master shared image device 101a such that in the certain embodiments. Certain ones of the portions of the shared images, that may have been captured or created by the shared image devices 101, can be shared as desired among the satellite shared image devices 101b. In certain embodiments, the satellite shared image devices 101b can also receive certain ones of the shared images that have been captured by other ones of the shared image devices 101. Certain embodiments of such satellite shared image devices can receive lower resolution versions of the received shared images that have been captured during the sharing session.

Figure 3:
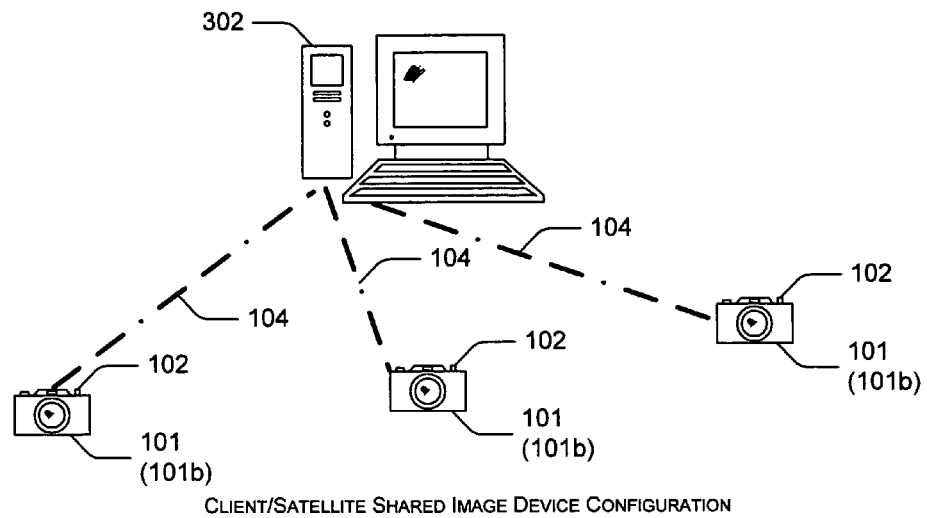
FIG. 3 shows a schematic diagram of yet another embodiment of the shared image network that includes a plurality of shared image devices, the plurality of shared image devices include a sharing mechanism.

In the embodiments of the sharing image network 100 that is described with respect to FIGS. 1 and 3, each similar satellite shared image device 101b can be operably coupled to the respective master shared image device 101a or computer 302 by, for example, a respective signal connection such as a communication link 104. The communication link can be functionally subdivided into a transmitter portion and/or a receiver portion, or alternatively a transceiver portion that is secured to each shared image device. Certain embodiments of the master shared image devices 101a can thereby control, to some degree, the shared images that can be received by each particular satellite shared image devices 101b. In other embodiments of the sharing image network 100 that include a master shared image device 101a; a signal connection such as the communication link 104 can also extend between certain ones of the satellite-shared image devices 101b.

Each communication link 104 should provide sufficient bandwidth to ensure effective transfer of the shared images (e.g., images, portions of the images, metadata, video segments, and/or video stills) between the appropriate shared image devices 101. Providing such effective shared image transfer can ensure satisfactory operation of the sharing image network 100 as described in this disclosure.

Figure 2:
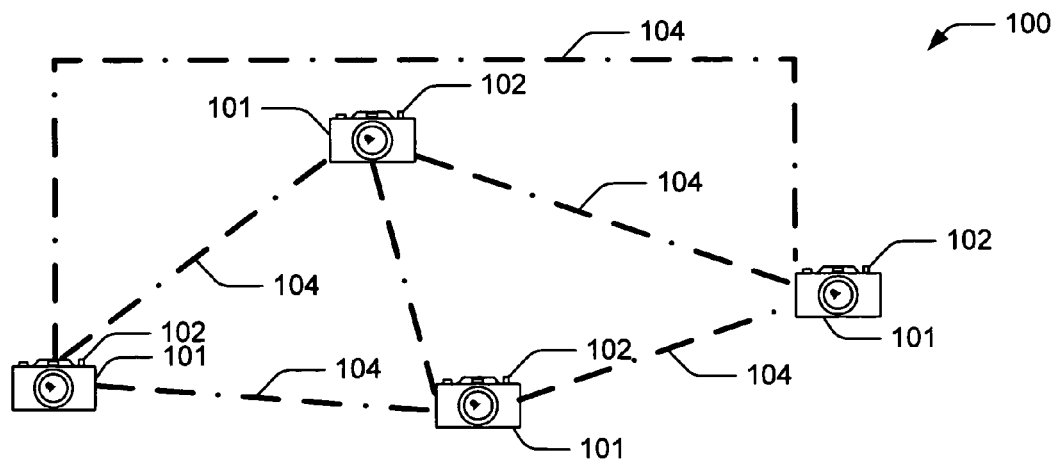
FIG. 2 shows a schematic diagram of another embodiment of the shared image network that includes a plurality of shared image devices, the plurality of shared image devices include a sharing mechanism.

FIG. 2 shows one embodiment of a peer-to-peer shared image network 100, in which each shared image device 101 can connect to at least one other shared image device by at least one communication link 104. In certain embodiments of the peer-to-peer shared image network 100, indirect connections (such as multiple communication links 104) can extend, in series, between multiple pairs of shared image devices. Such communication links 104 can therefore transmit shared images between multiple pairs of serially-extending shared image devices 101 or over multiple serially-extending communication links 104.

The embodiment of the shared image network 100, as described with respect to FIG. 2, includes a number of shared image devices 101 that may act as a peer-to-peer network. Certain embodiments of peer-to-peer shared image networks can be configurable in which each shared image device can perform both those functions that are traditionally associated with a server device and those functions that are traditionally associated with a client device. As such, in many embodiments, shared images can pass between different ones of the peer-to-peer arranged shared image devices relatively freely as to be available to any member shared image device of a particular sharing session.

In certain embodiments of the sharing image network 100, each shared image device 101 can be configurable to be capable of accessing the shared images captured by other ones of shared image devices 101 during the sharing session.

As described with respect to FIG. 2, the peer-to-peer configuration may be desired for relatively simple device configuration, set-up, and use; and may also be desirable since no mechanism can be provided in certain embodiments to reduce the number of shared images that are being transmitted by any one of shared image devices 101. Certain embodiments of the peer-to-peer model may be easier to implement since with the peer-to-peer model, each shared image device 101 (such as a digital camera) can be configurable to operate similarly to the other shared image devices. In many instances with the peer-to-peer model, no single shared image device overviews the entire operation of the shared image network. Instead, all the shared image devices interact to provide the sharing, according to peer-to-peer concepts. For example, the different shared image devices in a peer-to-peer network can be configurable to operate similarly, and can be configurable to act as either a client and/or a server at any suitable particular time during shared image network operations.

FIG. 3 shows another embodiment of the sharing image network 100 that includes a number of shared image devices 101. This embodiment is similar to the embodiment as described with respect to FIG. 1, with the exception that the master shared image device 101a is configurable as a dissimilar device such as a peripheral device, e.g., a computer 302 instead of another type of shared image device 101. In different embodiments, the computer 302 may be configured as any type of recognized computing device including, but not limited to: a desktop, a laptop, a workstation, a personal display assistant (PDA), a microprocessor, a microcomputer, etc. The computer 302, as well as other shared image devices, can provide a store-and-forward operation by controllably storing for some duration (regardless of how temporary or permanent is the duration), optionally processing, and then forwarding the shared images. Under certain circumstances, especially where there are a considerable number of shared image devices generating many shared images, the FIG. 3 embodiment that relies on the computer 302 to provide processing, filtering, etc. may be desired. Such networking concepts relating to computers, clients, servers, and data transfer between computers as are generally well-known, and will not be further detailed in this disclosure. One purpose of the computer 302 with respect to the shared image network 100 is to obtain or retain the shared images generated by the other shared image devices 101, and thereupon provide for the retrieval of the generated shared images.

Certain computers acting as servers might be named based on the data that they can store or produce (e.g., file servers, data servers, web page servers, etc.). As such, certain embodiments of the computer 302 as described with respect to FIG. 3 can act as a shared image server. One aspect of using certain embodiments of the computers 302 instead of certain embodiments of master shared image device 101a (in a master/satellite configuration) is that certain embodiments of the computer 302 is likely to be configurable to allow more varied image processing, data handling, or other operations.

As such, certain ones of the satellite shared image devices 101b can be configurable as the computer 302 to be capable of handling queries relatively quickly and accurately. In certain embodiments, the users of certain shared image devices 101 can therefore include queries directed to the particulars of the sought shared images. Another advantage of certain computers 302 is that the storage capability of certain embodiments of the computers can substantially match a value of the number of captured shared images during a sharing session.

Example of Proximity-Based Sharing Technique

This disclosure described a number of embodiments of proximity-based sharing techniques. One embodiment of a proximity-based sharing technique utilizes a computer or controller of the type described below with respect to FIG. 12. Within the disclosure, flowcharts of the type described in this disclosure apply to method steps as performed by a computer or controller. The flowcharts also apply to apparatus devices, such as a shared image device 101 that includes, e.g., a general-purpose computer or specialized-purpose computer whose structure along with the software, firmware, electromechanical devices, and/or hardware, can perform the process or technique described in the flowchart.

Since multiple shared image devices can share data (at least one that sends the shared image information and at least one that receives the shared image information), each shared image device can form a portion of the sharing mechanism. In certain embodiments, actuating the actuating mechanism of a sharing mechanism can cause a particular shared image device to share or publish to other similar shared image devices. Such sharing or publishing can occur even if there is not another shared image device in sufficiently close geographic proximity, based largely on inclusions of additional shared image devices (each of which includes a store-and-forward mechanism). The additional shared image devices can be configurable to allow serial data transmission through a sequence of such intermediate located shared image devices that operatively couple the terminal shared image devices. The store-and-forward mechanism can temporarily store data in one of these shared image devices, and can generate copies of stored shared images in the form of data from that shared image device following a desired prescribed duration.

Under certain circumstances, only one shared image device may be a member of a session. For example, if a user of a particular shared image device 101 is the first one to join a sharing session (e.g., get to an event), then that first user may capture pertinent images, and the sharing mechanism allows others to access the pictures captured by the first user of a shared image device 101 at that sharing session. As such, at one particular time, only a single shared image device may join the sharing session, and effect sharing or copying of the shared images. Prior to a wedding or child's birthday, for example, a professional photographer may capture a number of images that pertain to preliminary events of that sharing session, and which would perhaps be desirable to other session members who would join that sharing session. In another instance, a leader of a business meeting may prepare a set of shared images prior to the meeting that relate to the meeting, and which would subsequently be accessible by other members of the meeting.

In other embodiments, at least two shared image devices 101 might establish a particular sharing session. For example, assume in certain embodiments that multiple shared image devices can be configurable as disposable cameras whose session shared images can be shared, processed, and/or made accessible. In certain embodiments, but not others, multiple shared image devices (such as those of the disposable variety) can be sold together to be associated with a prescribed sharing session, such as a birthday, wedding, business event, etc.

Other embodiments of shared image devices are likely to be associated with a single owner for a longer duration, and can be provided with a controllable sharing mechanism to allow multiple shared image devices to be controllably configurable to interface with each other for a distinct duration of, e.g., a distinct sharing session. Many embodiments of the shared image devices can be controllably adjustably configurable to allow the shared image device to join another session. In certain embodiments a single shared image device can perhaps even join multiple simultaneous sharing sessions.

In considering certain embodiments of the master-satellite configuration as described with respect to FIG. 1, the master shared image device (and perhaps not the satellite shared image device) can originally access the full resolution versions of the shared images as captured by each shared image device. In certain embodiments, satellite shared image devices can be provided with lower-resolution shared image versions such as, but not limited to: thumbnails of the shared images, portions of the shared images, miniaturized portions of the shared images, low-resolution versions of the shared images, metadata pertaining to the shared images, etc. The users at the satellite shared image devices (that can be configured either as capturing and/or peripheral shared image devices) can then select those shared images that they desire to obtain or retain.

The particular configuration of shared image devices and the shared images can largely represent a design choice based on intended usage, and networking or device configurations and operating characteristics. These particular configurations can be selected depending upon the particular sharing session, event type, shared image device 101 type or other operational characteristic, and can be selected by the "owner" or other participants of each particular sharing session. In some embodiments where a satellite shared image device has insufficient memory storage to store the full versions of the shared images that have been captured for a particular sharing session, the master shared image device can be provided with sufficient data storage to contain the full versions of the shared images that are being captured during the sharing session.

In certain embodiments but not others, at least some of the shared images that are being stored at the master shared image device will have the highest resolution available so that when the full images are requested from the at least certain other ones of the shared image devices, the full images can be provided.

In certain embodiments of the shared image networks of shared image devices 101 (while not with other embodiments), one purpose is to ensure those shared images captured by each one of shared image devices have been accessed, captured, stored, printed out, or has undergone some desired action. As such, in certain embodiments, each shared image device 101 may not obtain all the copies of each shared image generated by every shared image device for that sharing session. As such, in certain embodiments, it may be useful for a user of at least one shared image device 101 to provide a peripheral device (such as a printer or portable image storage device such as a CD drive) at a sharing session. The peripheral device may thereupon print and/or obtain and/or retain the desired shared images for each user of the member shared image devices 101 that are associated with the sharing session who wish to have the images in printed or stored form.

In one embodiment, a shared image device 101 can include a timeout mechanism. As such, if a user of a shared image device 101 leaves the sharing session, and they forget to deactivate the sharing mechanism, then the timeout mechanism can deactivate the shared image device with respect to the sharing session after a prescribed amount of time. Certain embodiments of the sharing session can include multiple shared image devices 101 that each includes a timeout mechanism such that the sharing session terminates soon after the last member of the sharing session (and their shared image device) leaves the proximity of the session.

Figure 4:
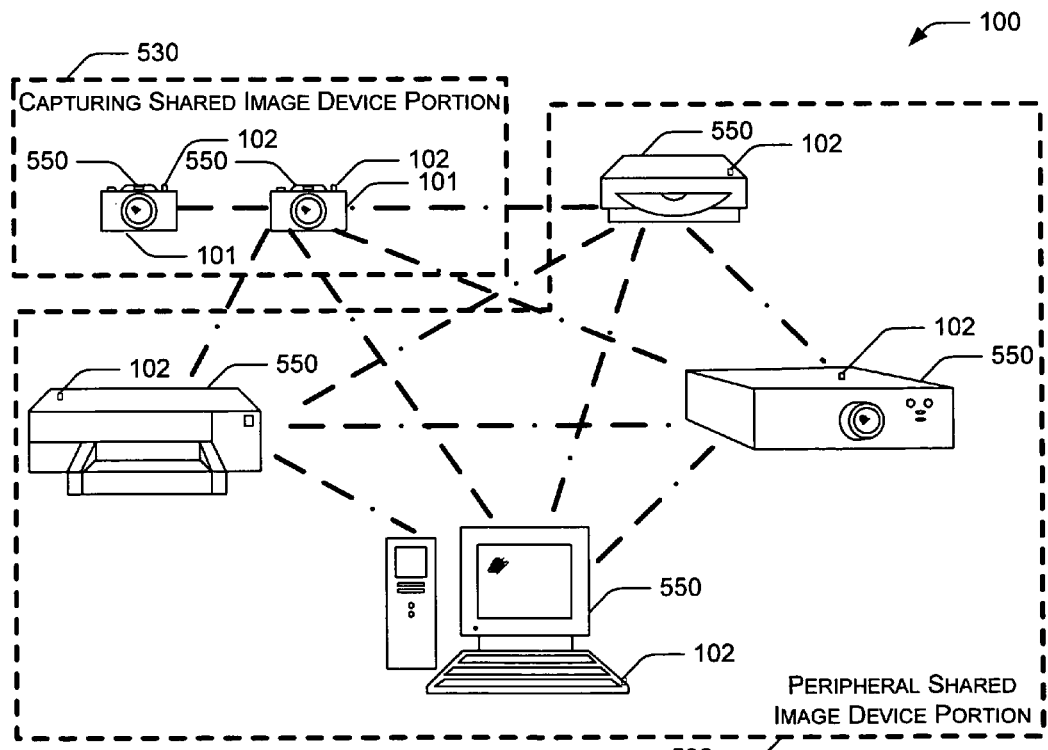
FIG. 4 shows a schematic diagram of yet another embodiment of the shared image network that includes a plurality of shared image devices, the shared image devices include a sharing mechanism.

FIG. 4 shows another embodiment of the shared image network 100 that can include a number of shared image devices 550, in which many of shared image devices 550 are incapable of capturing images and are thereby are in many ways dissimilar from those embodiments of the capturing shared image devices. As described with respect to FIG. 4, one or more shared image devices 550 that are configurable as a peripheral shared image device can be contained within a peripheral shared image device region 532. The number of shared image devices 550 that are included within the peripheral shared image device portion 532 as described with respect to FIG. 4 provides a number of examples of peripheral shared image devices. Additionally, one or more shared image device 550 that is configurable as a capturing shared image device can be contained within a capturing shared image device region 530. The number of shared image devices 550 that are included within the capturing shared image device portion 530 as described with respect to FIG. 4 provides multiple examples of capturing shared image devices. Those shared image devices that are contained within the capturing shared image device region 530 can be configurable as capturing shared image devices, to primarily capture images (e.g., take images, image information, or photographs). Those shared image devices that are contained within the peripheral shared image device region 532 can be configurable as peripheral shared image devices, which are primarily configurable to perform some other function to the shared images from capturing including, but not limited to, obtaining, retaining, storing, displaying, transferring, printing, segmenting, and otherwise processing. Certain shared image devices 101, such as a peripheral shared image device 550 (for example a memory drive device or computer) as contained within the peripheral shared image device portion 532, or alternately, certain capturing shared image devices 550 as contained within the capturing shared image device portion 530, are configurable to store and/or store and forward the shared images.

FIG. 4 provides an example of a network configuration including a plurality of shared image devices 101 in which at least one device operation of a capturing shared image device (e.g., which are contained in the capturing shared image device portion 530) can be controlled by one or more peripheral shared image devices. Such control can be contained in the peripheral shared image device portion 532. Examples of the device operation that can be controlled include, but are not limited to, altering an operation, altering a shutter control operation, altering resolution control, altering zoom control, altering an imaging-location-control operation (which can control where a remote camera and/or the user thereof is taking an image), etc. In effect, this disclosure provides a mechanism by which control device operations such as are performed in capturing imaging devices can be allowed in certain embodiments of remote shared image devices, such as certain peripheral shared image devices.

For example, it may be desired to couple a capturing shared image device such as a digital camera or camcorder with one or more peripheral shared image devices such as a printer, a projector, a computer, and/or a CD burner. Such a combination of dissimilar shared image devices might, or might not, be associated with a similar combination of shared image devices. For example, one or more shared image devices such as a digital camera can be associated with a dissimilar shared image device such as a printer, computer, or projector either for a particular sharing session or permanently.

Alternatively, one or more capturing shared image devices such as a digital camera or camcorder can be associated with a dissimilar shared image device such as a printer, computer, or projector. Each of these dissimilar shared image devices may be capable of utilizing the shared images in a distinct manner. However, each of the shared image devices 550 could also share similar shared images relating to a single group sharing session (such as digital images) in its own distinct manner.

In certain embodiments, the printer, or other peripheral shared image device, can be configured as a peer in a peer-to-peer configuration, or alternately as a master or satellite in a master-satellite configuration, during the sharing session. For example, one shared image device can be configurable as a capturing shared image device such as a digital camera or camcorder at the session to capture shared images from other capturing shared image devices as described with respect to FIGS. 1 to 4. In certain embodiments, but not others, the users can access other pictures based on the thumbnails or other reduced-resolution versions of the shared images that are provided. As such, a printer peripheral device can be used to print out, or a memory device can store, a certain number of the thumbnails, portion of images, or full shared images that can be selected by the user at one or more of the shared image devices 550. A projector can be configurable as a peripheral device that can project a variety of images relating to that session, as well as other images in certain embodiments. Peripheral shared image devices that can be configurable as a printer can print selected shared images from that same group sharing session. Yet other peripheral shared image devices that can be configurable as a CD burner or storage can more permanently store image information for a particular session.

From a high-level aspect and embodiment, a variety of distinct types of shared image devices can therefore utilize the sharing mechanism. As such, a single user might actuate a single sharing mechanism to cause a sharing of images between the printer and the digital camera (or other examples of commonly-controlled peripheral or capturing shared image devices). In certain embodiments, peripheral shared image device(s) can be networked with one or more capturing shared image devices that are owned by multiple users at a given sharing session. Consider that in some embodiments but not others, both the peripheral shared image device (e.g., printer) and at least some of the capturing shared image devices (e.g., digital cameras) rely upon the same sharing mechanism for the sharing session. In certain embodiments but not others, a peripheral shared image device that can be configurable as a shared image-server, that could function to transfer stored image data back to another computer, could include a sharing mechanism with the other computer.

A variety of peripheral shared image device(s) 101 can store or display shared images that are produced by the capturing shared image device. In certain embodiments, a peripheral device such as a projector or television shared image device 101 can be associated with a digital camera or camcorder capturing shared image device to provide a slide show or movie including the shared images provided by the latter. In other embodiments, a digital video disk (DVD) recorder can burn a CD containing shared images provided by a digital camera or camcorder shared image device. These different embodiments of shared image devices that can be configurable as capturing and/or peripheral shared image devices can still be considered as dissimilar in certain aspects but perhaps not in other aspects.

Examples of the Computer/Controller

Figure 12:
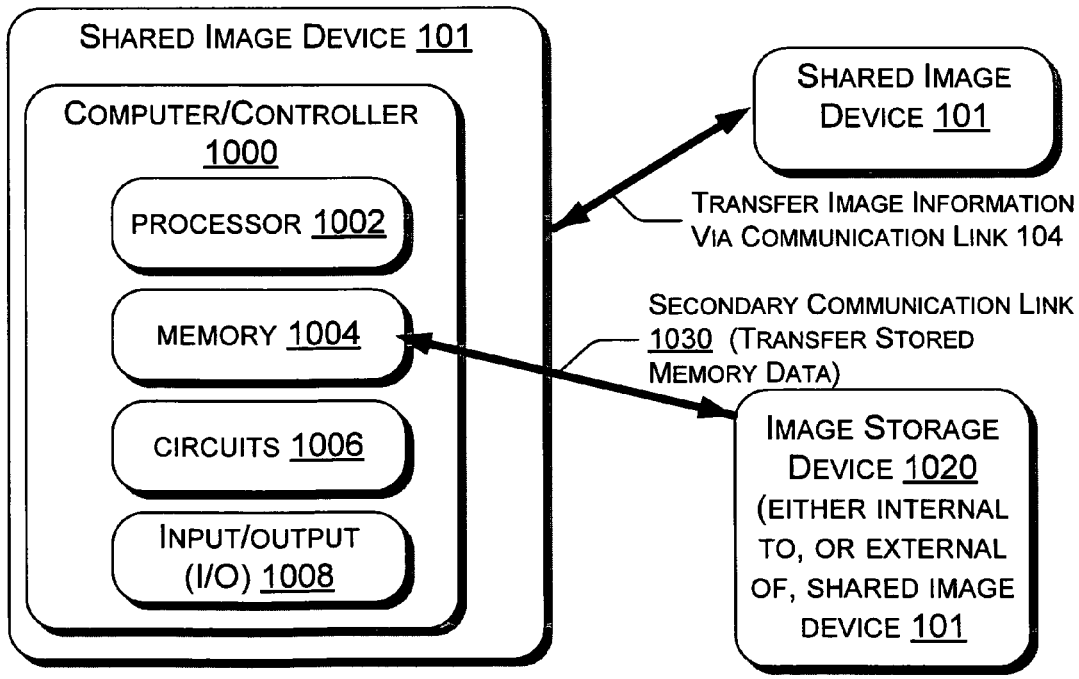
FIG. 12 shows a schematic diagram of one embodiment of a computer/controller that may be used as a portion of a sharing mechanism.
Figure 13:
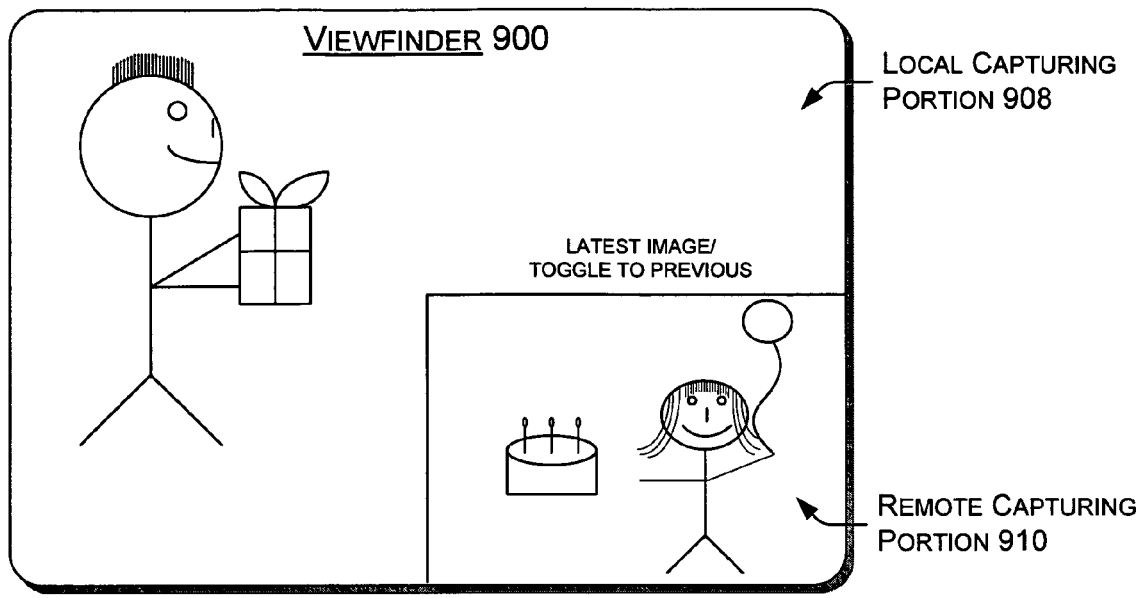
FIG. 13 shows a front view of one embodiment of the viewfinder as described with respect to FIG. 11.
Figure 14:
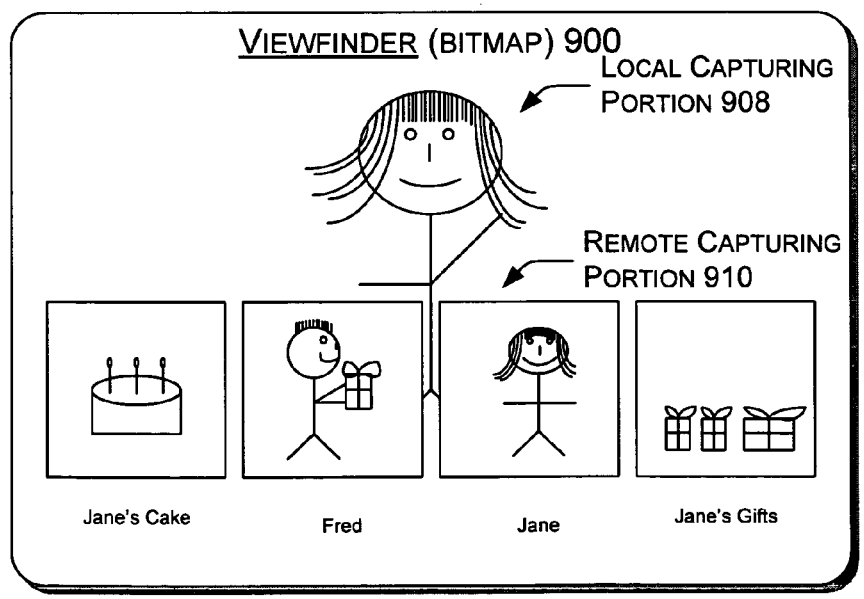
FIG. 14 shows a front view of another embodiment of the viewfinder as described with respect to FIG. 11.
Figure 15:
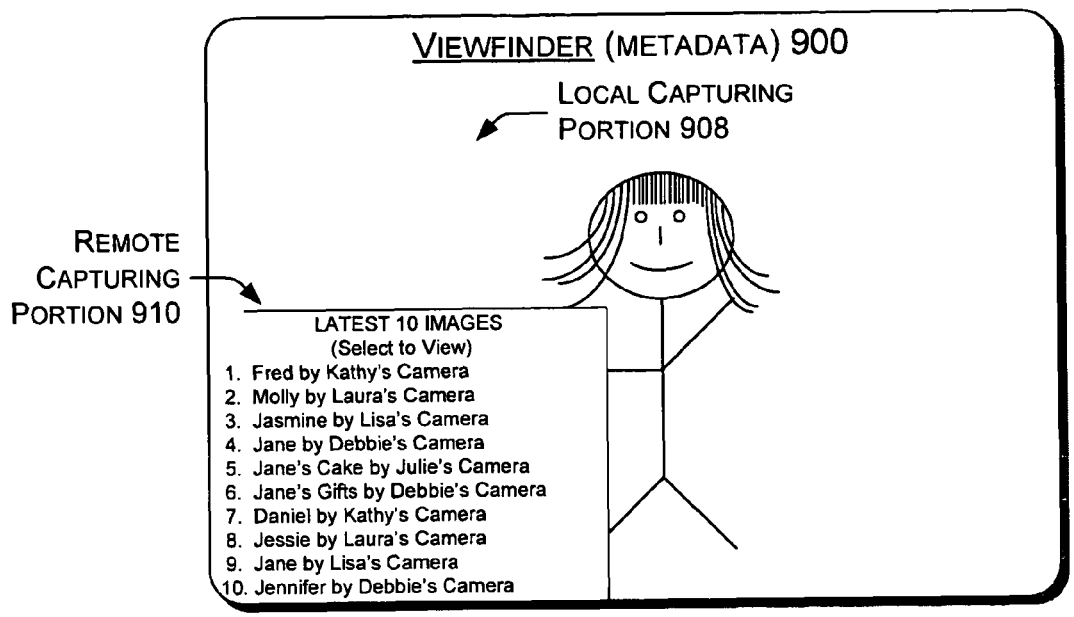
FIG. 15 shows a front view of yet another embodiment of the viewfinder as described with respect to FIG. 11.

FIG. 12 shows one embodiment of computer/controller 1000 that can be included in certain embodiments of the shared image device 101 to assist in providing the sharing of at least portions of shared images between multiple shared image devices. For example, each one of the two shared image devices 101 as described with respect to FIG. 12, provides an example of either a peripheral shared image device and/or a capturing shared image device that can communicate with each other based at least partially on a proximity between certain ones of the shared image devices. As such, in different embodiments, two capturing shared image devices can be operably coupled to each other, two peripheral shared image devices can be operably coupled to each other;

or one peripheral shared image device can be operably coupled to a capturing shared image device in a manner that allows transmitting image information at, or receiving image information at each or both of the shared image devices 101.

As described within this disclosure, multiple ones of the different embodiments of the shared image devices 101 are able to transfer image information, one or more portions of images, etc. to each other via the communication link 104. One embodiment of the computer/controller 1000 includes a processor 1002, a memory 1004, a circuit portion 1006, and an input output interface (I/O) 1008 that may include a bus (not shown). Different embodiments of the computer/controller 1000 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the computer/controller 1000 can be physically or operably configurable in each shared image device as described with respect to FIGS. 1 to 4. In one embodiment, the processor 1002 as described with respect to FIG. 12 performs the processing and arithmetic operations for the computer/controller 1000. The computer/controller 1000 controls the signal processing, database querying and response, computational, timing, data transfer, and other processes associated with the shared image device.

Certain embodiments of the memory 1004 include random access memory (RAM) and read only memory (ROM) that together store the computer programs, operands, and other parameters that control the operation of the shared image device. The memory 1004 can be configurable to contain the shared image information obtained, retained, or captured by that particular shared image device 101 (that may be configurable in different embodiments as the peripheral shared image device of the capturing shared image device).

The bus is configurable to provide for digital information transmissions between processor 1002, circuit portion 1006, memory 1004, I/O 1008, and/or the image storage device 1020. While each of the portions 1002, 1004, 1006, 1008, or 1020 are described as distinct elements, it is to be understood that by using network concepts, as well understood by those skilled in the art, multiple computers, networked-devices, processing devices, control devices, or portions thereof may be combined to provide a functionality similar to a single device while utilizing multiple devices. In this disclosure, the memory 1004 can be configurable as RAM, flash memory, semiconductor-based memory, of any other type of memory that is configurable to store data pertaining to images. The bus also connects I/O 1008 to the portions of the shared image devices that either receive digital information from, or transmit digital information to other portions of the communication system 100.

The computer/controller 1000 can perform a variety of processing tasks that are described within this disclosure. These processing tasks include, but are not limited to, combining multiple images, transforming images, watermark-transforming images, format-sharing, etc. Examples of format-sharing include, but are not limited to, sharing of ancillary information, associated information, textual information, audio, annotated information, image map information, executable code, data overlay information, or transmitted license information between different shared image devices. As such, format-sharing, and other image transformation in image combining techniques can be used to largely determine how an image will appear at a receiving shared image device that has been transmitted by transmitting shared image device.

Certain embodiments of the shared image device 101 as described with respect to FIG. 12 includes a transmitter portion (not shown) that can be either included as a portion of the computer/controller 1000, or alternately can be provided as a separate unit (e.g., microprocessor-based). In certain embodiments, the transmitter portion can transmit image information between different shared image devices over wired and/or wireless communication links.

Certain embodiments of the shared image device 101 as described with respect to FIG. 12 includes an operation altering portion (not shown) that can be either included as a portion of the computer/controller 1000, or alternately can be provided as a separate unit (e.g., microprocessor-based). Examples of operation altering portions include, but are not limited to, altering a resolution, altering a contextual library, altering an aspect ratio, altering a color intensity and/or brightness at a second shared image device (such as a capturing shared image device) by transmitting appropriate image information from a first shared image device (such as a peripheral shared image device).

The memory 1004 can provide one example of a memory storage portion. In certain embodiments, the monitored value includes, but is not limited to: a percentage of the memory 1004, a number of images that are stored in the memory 1004, or for motion images a recording interval (audio or video recording intervals).

To provide for overflow ability for the memory 1004 of certain embodiments of the shared image device 101, an image storage device 1020 can operably couple to the memory 1004 to allow a controllable transmitting of memory data from the shared image device 101 to the image storage device when the monitored value of data within the memory 1004 (e.g., the memory storage portion) exceeds a prescribed value. The prescribed value can include, e.g., some percentage amount or some actual amount of the value. In different embodiments, the image storage device 1020 can be included as a portion of the shared image device 101, as external to the shared image device, or as electrically connected (such as by an electrical coupling) to the shared image device. Different embodiments of the image storage device 1020 can be configurable as a mobile random access memory (RAM) device, a flash memory device, a semiconductor memory device, or any other memory device (that may or may not be distinct from the memory 1004) that can store images, image information, and/or any other data that can be stored within the memory 1004.

In certain embodiments, a secondary communication link 1030 can be established between the shared image device 101 (for example, the memory 1004) and the image storage device 1020. The secondary communication link 1030 can be structured similar to as the communication link 104, as described with respect to FIGS. 1-4, or alternatively can utilize network-based computer connections, Internet connections, etc. to provide data transfer between the shared image device 101 that includes the computer/controller 1000, and the image storage device 1020. The secondary communication link 1030 can be established prior to, during, and/or following the existence of the shared session.

In certain embodiments of the shared image device 101, the particular elements of the computer/controller 1000 (e.g., the processor 1002, the memory 1004, the circuits 1006, and/or the I/O 1008) can provide a monitoring function to monitor the amount of images and/or image information contained therewithin. Such a monitoring function by the shared image device can be compared to a prescribed limit, such as whether the number of images contained in the memory 1004, the amount of data contained within the memory 1004, or some other measure relating to the memory is approaching some value. The limits to the value can, in different embodiments, be controlled by the user or the manufacturer. In certain embodiments, the memory 1004 stores motion images, video images, and/or audio images relating to, e.g., a motion picture, camcorder, video, or audio embodiment of the shared image device. In certain embodiments the measure relating to the memory approaching some value may pertain to some recording duration, such as video recording duration or audio recording duration. Using the recoding duration, certain embodiments of motion picture shared image devices can thereby quantify how many shared images, or other images, have been captured.

In certain embodiments, the I/O 1008 provides an interface to control the transmissions of digital information between each of the components in the computer/controller 1000. The I/O 1008 also provides an interface between the components of the computer/controller 1000 and different portions of the shared image device. The circuit portion 1006 can include such other user interface devices as a display and/or a keyboard.

In other embodiments, the computer/controller 1000 can be constructed as a specific-purpose computer such as an application-specific integrated circuit (ASIC), a microprocessor, a microcomputer, or other similar devices. A distinct computer/controller 1000 can be integrated into certain embodiments of the shared image device 101, the share mechanism 102, and/or the communication link 104, as described with respect to FIG. 1 or 3.

In certain embodiments, the shared image device 101 including the computer/controller 1000 can be configured as a peripheral shared image device. Such peripheral shared image devices can be configured to include sufficient image storage in the memory 1004 to allow storage of the images for a session. Additionally, in certain embodiments the peripheral shared image device can transmit operational instructions (either computer based or manual) to instruct either a user at the capturing shared image device how to operate the capturing shared image device; or ultimately can automatically operate the capturing shared image device(s) according to the operating information or instructions. The operating information or instructions can include, but is not limited to, how many images to capture, where to capture (take a picture toward a specified direction), the subject of the desired image, zoom level, etc. In this manner, certain embodiments of peripheral shared image devices can effectively control the operation of an associated capturing shared image device by effective use of operating information.

Examples of Device Capacity

The different embodiments of the shared image devices 101, operating as described with respect to FIGS. 1 to 4 that can be configurable as either capturing shared image devices and/or peripheral shared image devices, could reasonably be expected to either capture, photograph, project, display, obtain, retain, process, download, and/or perform a variety of other operations with respect to a number of shared images. In certain embodiments, a relatively large memory storage area can be provided to, and utilized by, each shared image device to deal with the large amounts of data associated with images, and the associated processing.

This section includes a description of certain embodiments of indicators that allow the shared image device to operate within their memory capacity, battery capacity, or processor capacity. When the particular capacity for a particular shared image device is reached, a particular shared image device typically does not operate as intended or designed. Different embodiments of the device capacity include, but are not limited to, memory storage capacity, processor capacity, and/or battery life capacity. One example of a device capacity indicator is described in this disclosure relative to FIG. 17, with respect to a status insert 1504.

In many embodiments, the users of each shared image device can be provided with the option of obtaining or retaining particular shared images obtained from a particular shared image device, associated with a particular user, or relating to a particular subject. In one embodiment, such filtering techniques can filter based upon the metadata that is associated with each shared image.

In certain embodiments, the shared image device 101 can include a record that indicates the shared image device that actually captured the shared images. The record can also include the identities of other shared image devices with which the user has agreed, by joining the sharing session, to be willing to share images. The user of the shared image device with such a record can select those other shared image devices with which they wish to access certain, or at least some of their, shared images for the particular sharing session. In one embodiment, this can be considered as a back-end synchronization to provide sharing of shared images, and the synchronized data can be returned to the capturing shared image device.

This can be because there is an association between the different shared image devices (e.g., a user's camera and the user's computer or printer). In one embodiment, there can be a sharing session identifier that is available to the members of the sharing session by which the shared images, portions thereof, associated information, metadata, etc. that in certain instances allows transferring the shared images through the network or the Internet.

The synchronization for a session of multiple shared image devices can allow a member shared image device that has left a session to return to the session. In addition, a member that has entered a session later than other members can receive the prior images relating to the session by synchronizing with other members of the session that have the prior shared images. In certain embodiments, it is envisioned that different members of the same session can have different sessions, so to provide a complete synchronization for a member joining (or rejoining) an existing session, the joining shared image device may obtain a number of images from multiple shared image device sources. In the master-satellite embodiments as described with respect to FIGS. 1 and 3, it may be possible for a member shared image device joining the session to synchronize therewith to obtain the images (or portions thereof) from that master shared image device which contains all images pertaining to that session.

Synchronization may be more complex in certain embodiments than certain shared image devices providing the images to other shared image devices. For example, certain shared image devices may have limited resources compared with other shared image devices due to different memory dimensions, different battery lives, different imaging resolutions, etc. As such, to transmit image data between different shared image devices, it may be important that the sending shared image device configure the image data in a format as desired by the receiving shared image device. For example, the shared images could be selected to be thumbnail images, full images, portion of images, metadata relating to images, etc.

In many embodiments of shared image devices, a mechanism can be provided such that a receiving shared image device that has obtained one version of a shared image can obtain another. For example, if a receiving shared image device that has already received a thumbnail shared image from a transmitting shared image device, and the receiving shared image device thereupon provides a request to obtain a full-resolution image version or a reduced-resolution image version of certain shared images, then the transmitting shared image device could provide such full-resolution images. In certain embodiments, such synchronization (to provide certain versions of many images, or alternate versions of certain images) could be allowed even after the session is complete such as by using such a transfer mechanism such as email, or even a reestablished communication link.

In certain embodiments, a memory capacity warning such as the status indicator 1504 exists on capturing shared image devices such as a camera or camcorder. This memory capacity warning can function in a similar manner to a battery indicator, to indicate an amount of time remaining considering past-flows for the particular sharing session. As such, if the past image storage has taken up a prescribed percentage of the memory storage, the indicator will indicate the number of images used compared to those remaining, the percentage of image storage space used, or the amount of time remaining. The users of the shared image devices can use such indicators based on past-flows to judiciously apply further image capturing, obtaining, retaining, or other activities.

Certain ones of the device capacities may be related. For example, one capturing shared image device may be configurable to be able to only store a certain number of shared full-sized images. The status monitor insert 1504 therefore may indicate the number of remaining full-sized images, reduced-resolution images, as well as the number of thumbnail images or metadata (as desired by the user of the shared imaging device, or as designed by the designer of the shared imaging device). To obtain or retain more full-sized images or even reduced-resolution images may require a considerable amount of battery life that represents another embodiment of device capacity. As such, a particular user considering obtaining or retaining more shared images may depend partially on the battery life state as well as the amount of energy necessary to obtain the current state of stored full-sized images, thumbnail images, or metadata.

In one embodiment, the data associated with the captured shared images can be initially stored in an image storage location within the shared image device. The percentage of data (or number of images) that is stored in the image storage location can be monitored, and when the percentage of data (or number of images) exceeds a predetermined amount, some data that is to be stored and/or data that has been stored can be obtained or retained to a remote storage location.

In one embodiment, the remote storage location can be remotely located from the device image storage location such that the image, or portions thereof, can be obtained or retained over a wireless communication link and/or other link such as over the Internet or another shared image network or network. In another embodiment, the remote storage location can include, for example, an image storage device that is operably coupled, such as by a short connection link, to the shared image device. The physical memory dimensions of the image storage location, and as well as the remote storage location, can be selected based on the volumes and type of images, portions of images, or other image information that is likely to be obtained with a particular shared image device for a particular sharing session. As such, this allows the sharing by shared image devices 101 to be accomplished in a substantially real-time basis.

A data storage capacity situation can occur when a user overuses the storage capability of the shared image device, such as by capturing too many images using a digital camera or camcorder. This may be connected to the shared-percentage concept described presenting, wherein if a certain percentage of the image capacity in a camera has been captured, either the images relating to that sharing session, or the images from a particular user, can be rejected (or selectively considered by using, e.g., a browsing mechanism).

Certain embodiments of the sharing mechanism can also operate as a subscription mechanism. For example, if a user of a first shared image device captures an image, it may be sent to the other shared image devices that are participating in the sharing session. Such a subscription to a sharing session may be equated with subscribing with another service. Each subscribing shared image device may thereupon elect to join a particular session. In certain embodiments of a session, each user of a shared image device can select which images are to be obtained or retained, and can reject certain images. There are a variety of embodiments that can be provided between sessions and subscriptions thereto.

In certain embodiments, if a user of a first shared image device agrees to publish a particular image for a number of other shared image devices including, in particular, a second shared image device, then the user at the second shared image device can, in certain embodiments but not others, agree to accept the pictures. It is also possible to envision relatively simple or complex cases. For example, shared image devices configurable as digital cameras can have the capability of browsing through their shared images. Such a browser could be applied to incoming subscribed-to images. Consider an instance that provides for "stop subscribing" to any particular user, from any particular sharing session, and/or the like. As such, the images can be either permanently blocked, temporarily blocked, allowed access to add further time, selectively cultured, or a wide variety of other permutations. At a live event, a user may for example be more concerned with capturing the images than managing them.

Examples of Proximity Shared Image Device Concepts

Figure 5:
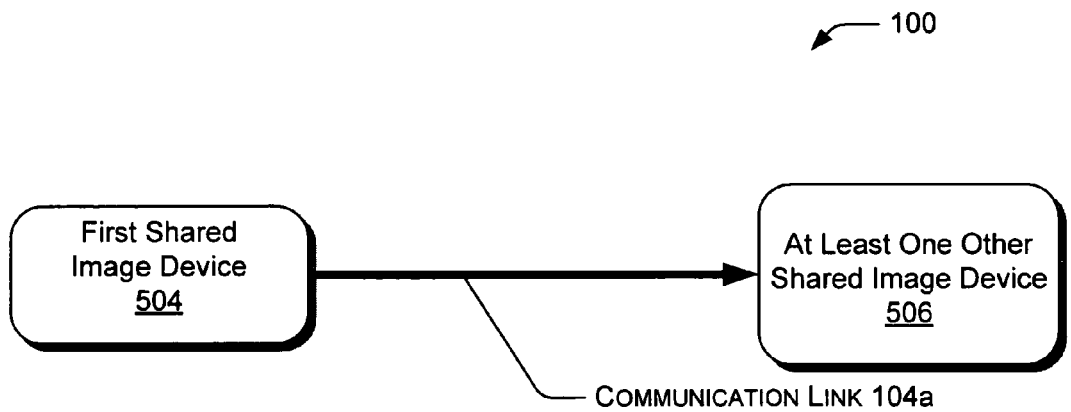
FIG. 5 shows a block diagram of an embodiment of the shared image network that includes a plurality of shared image devices.
Figure 9:
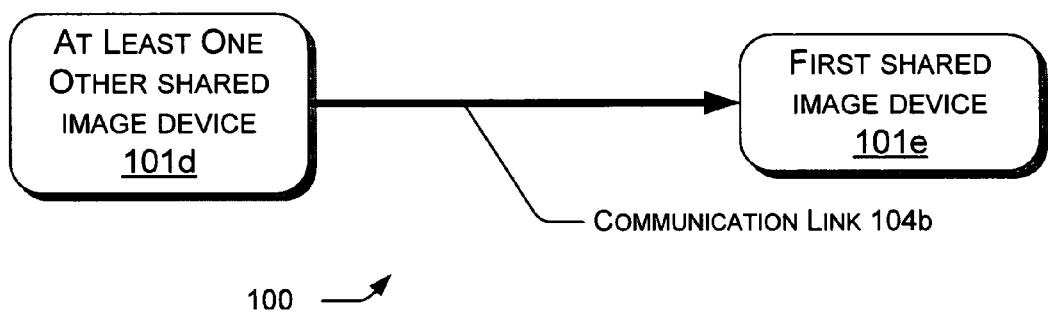
FIG. 9 shows a block diagram of one embodiment of a number of shared image devices included within the shared image network.
Figure 10:
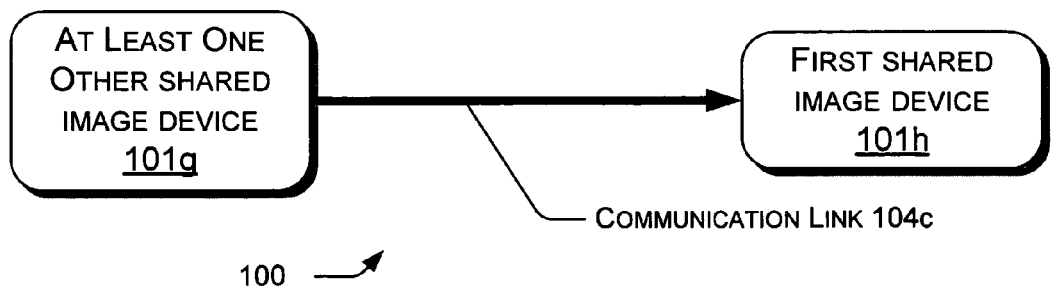
FIG. 10 shows a block diagram of one embodiment of a number of shared image devices included within the shared image network.
Figure 6A:
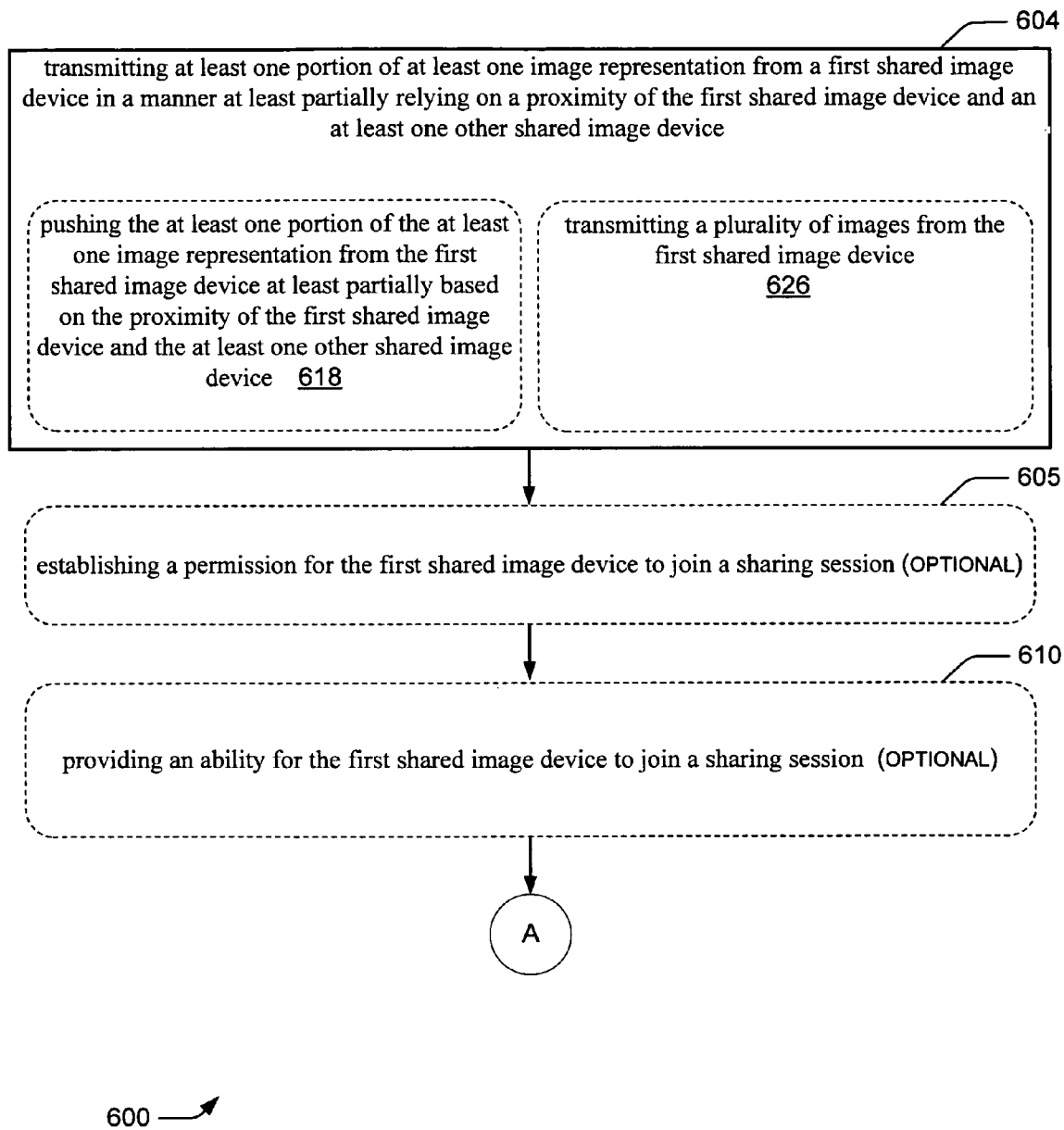
FIGS. 6a to 6d show a high-level flowchart of another embodiment of a proximity shared image device concept.
Figure 6B:
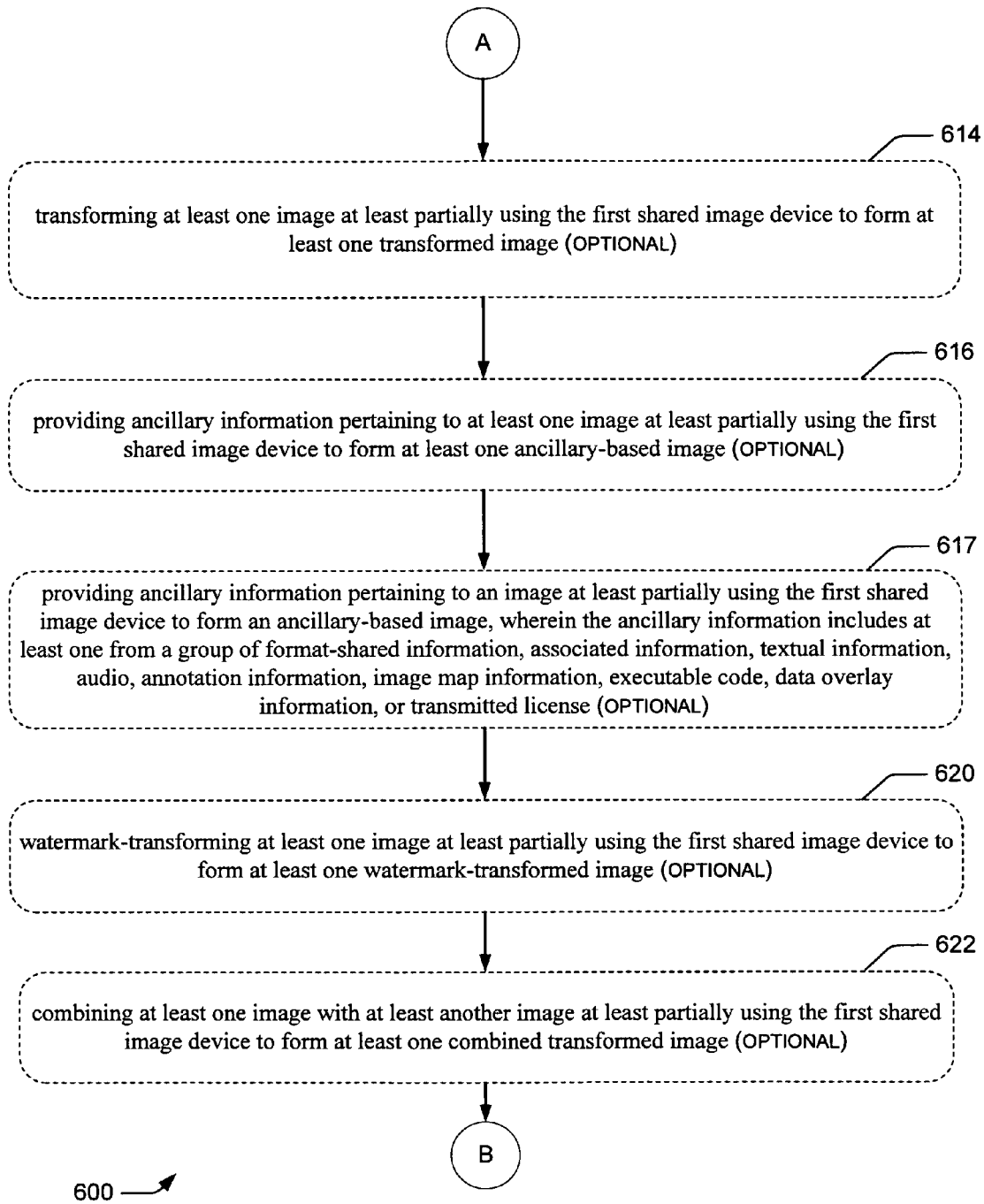
Figure 6C:
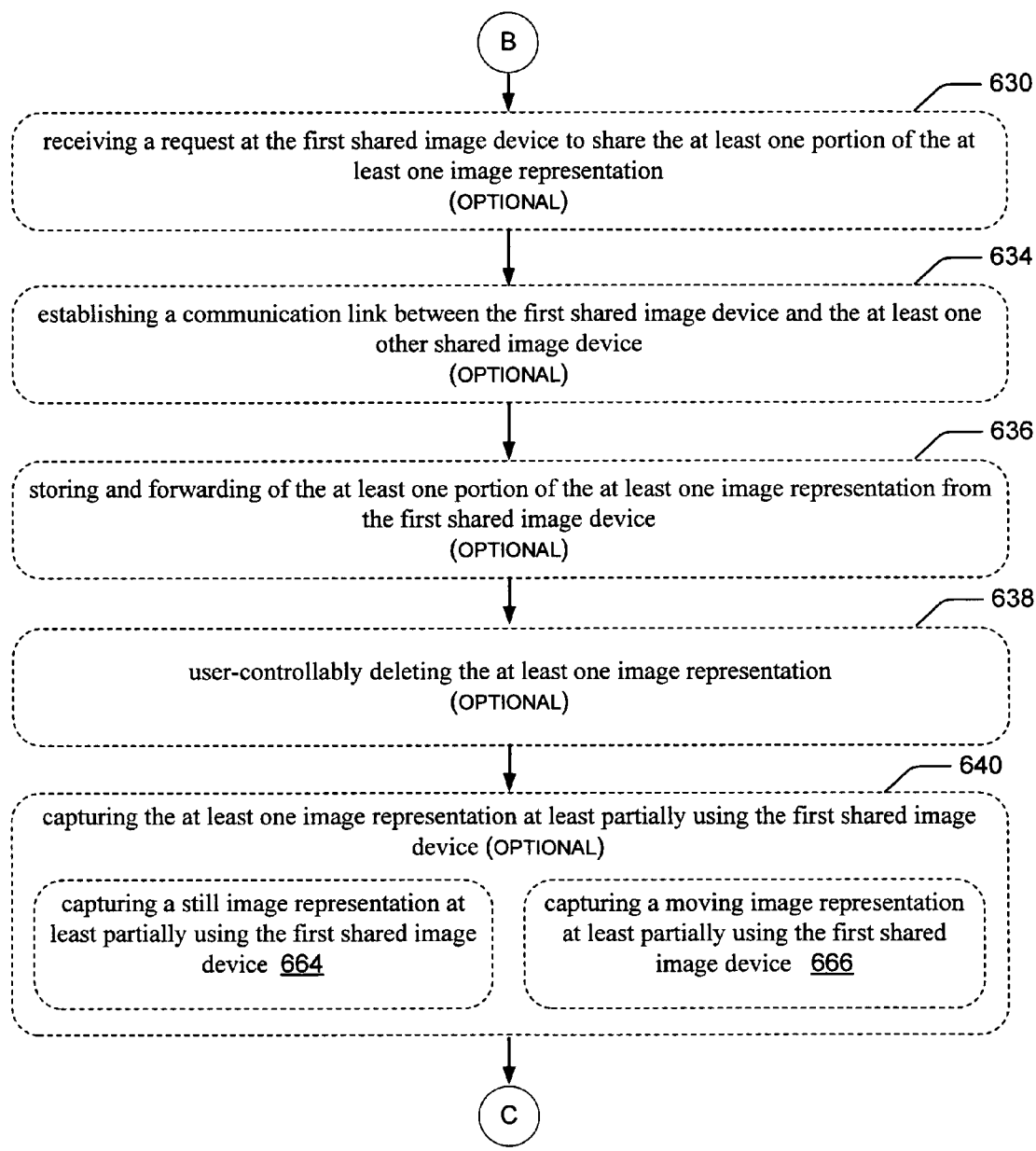
Figure 6D:
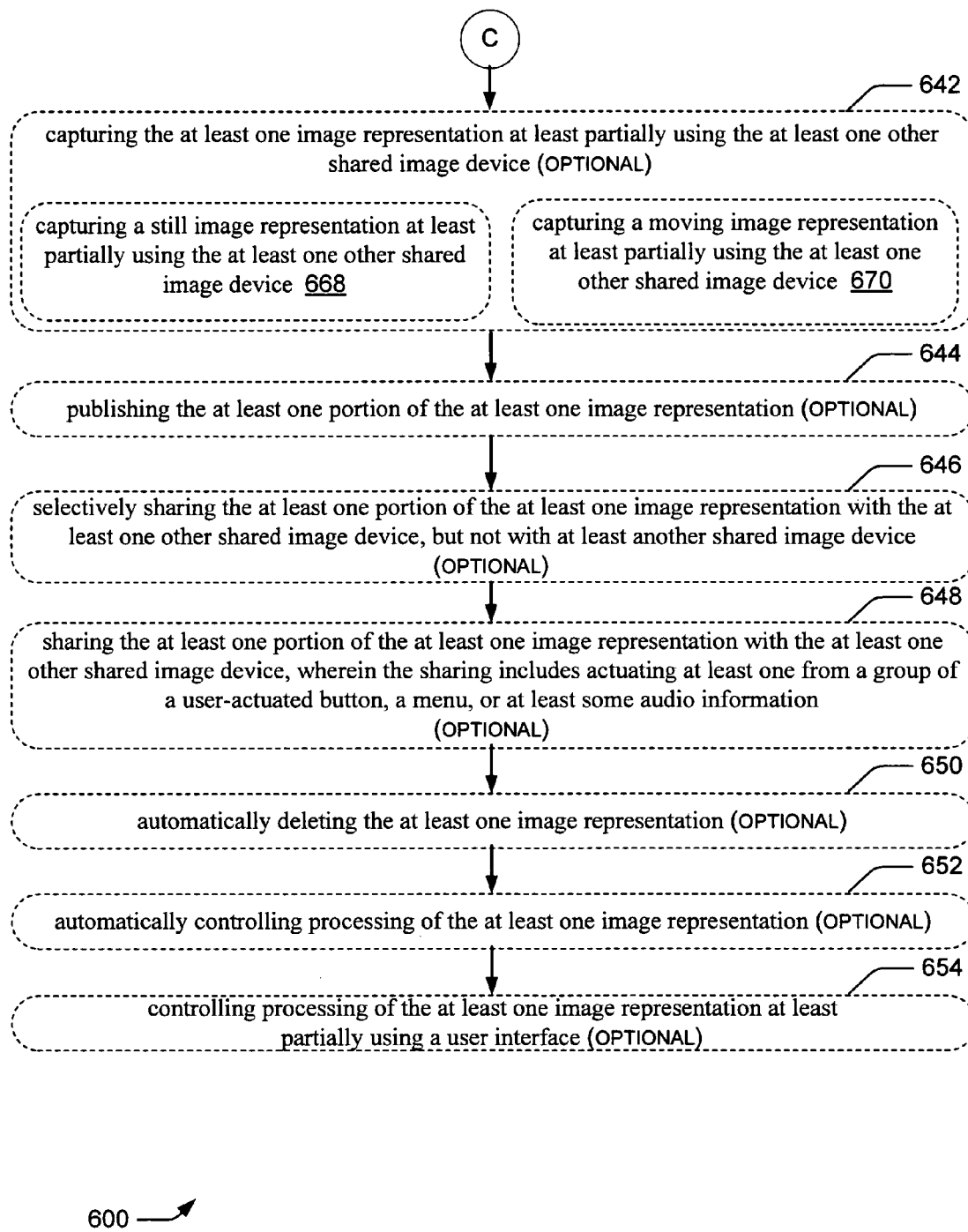

A number of different embodiments of proximity shared image device concepts are described with respect to FIGS. 6*a* to 6*d*, and 7*a* to 7*c*, and 8, which can describe sharing between one or more shared image devices based at least partially on a proximity. FIGS. 6*a* to 6*d*, and 7*a* to 7*c*, and 8 take the form of high-level flowcharts that can represent a series of portions or process steps that are representative of a method that can be considered in combination with FIG. 5, 9, or 10. FIGS. 5, 9, and 10 are intended to describe illustrative embodiments of shared image networks 100, and are not intended to be limiting in scope. Any arrangement of shared image devices, capturing shared image devices, and/or peripheral shared image devices that are arranged within proximity of each other depending upon the type or configuration of communication links 104, as described with respect to FIG. 5, 9, or 10 are within the intended scope of the present disclosure regardless of the inclusion of additional shared image devices 101 or additional communication links 104.

In FIG. 9, shared image devices 101*d* and 101*e* represent examples of the shared image devices 101, and are configurable to capture shared images of the type described with respect to the capturing shared image device portion 530 of FIG. 4, or the shared image devices 101 of FIGS. 1 to 3. The at least one other shared image device 101*d* is an example of the type included in the peripheral shared image device portion 532 of FIG. 4, and may include, for example, printers, memory devices, memory drives, facsimile machines, projectors, displays, television, computer systems, phones, camera phones, display phones, personal display assistants (PDAs), and any other known type of device having a display. The communication link 104*b* is of the type as designated as 104 with respect to FIGS. 1-4, and is configured to transmit shared image(s), image information, portions of image representations, etc between their respective shared image devices. The communication link 104a operatively couples the at least one other shared image device 101d and the first shared image device 101e.

In FIG. 10, shared image devices 101g and 101h represent examples of the shared image devices 101, and are configurable to capture shared images of the type included in the capturing shared image device portion 530 of FIG. 4, or described as the shared image devices 101 of FIGS. 1 to 3. The at least one other shared image device 101g is an example of the type included in the peripheral shared image device portion 532 of FIG. 4. The communication link 104c is of the type as described as 104 with respect to FIGS. 1-4, and is configured to transmit shared image(s), image information, portions of image representations, etc between their respective shared image devices. The communication link 104c operatively couples the at least one other shared image device 101g and the first shared image device 101h.

Each high-level flowchart can also represent structural aspects of an apparatus or a system, such as can be performed by a general-purpose computer, a specific-purpose computer, hardware, software, firmware, or some electromechanical controlling of computing device performing those portions or process steps. Both apparatus, method, system, and other claim types as attached herein find support using the high-level flowcharts such as included in FIGS. 6a to 6d, and 7a to 7c, and 8, when considered in combination with the other figures (e.g., FIGS. 1-4, 9, 10, 11, and 12) to provide a variety of sharing operations between shared image devices.

One embodiment of a shared image network 100 that can be utilized to perform a variety of proximity shared image device concepts is described with respect to FIG. 5. The example of the shared image network 100 as described with respect to FIG. 5 includes a first shared image device 504, an at least one other shared image device 506, and at least one communication link 104a connecting therebetween. The first shared image device 504 may be configured, for example, to transmit at least a portion of one image representation via the communication link 104a to the at least one other shared image device 506 as described with respect to FIG. 5. In certain embodiments, the first shared image device 504 or the at least one other shared image device 506 may each be operable to capture an image. In addition, those skilled in the art may find analogous support in one or more of FIGS. 9-18.

A high-level flowchart of one embodiment of the proximity shared image device concept 600 is described with respect to FIGS. 6a, 6b, 6c, and 6d that include a variety of operations, such as described herein. The proximity shared image device concept 600 as described with respect to FIGS. 6a, 6b, 6c, and 6d may be described, in this disclosure, with respect to FIG. 5. Certain embodiments of the proximity shared image device concept 600 are described with respect to the shared image network 100, as shown in FIG. 5. The embodiment of the shared image networks 100 of FIG. 5 can include, but is not limited to, a first shared image device 504 configured to transmit at least one portion of at least one image representation over a communication link to at least one other shared image device 506. The first shared image device 504 and the at least one other shared image device 506 can both be configured as the shared image device 101, as described within this disclosure. Operation 604 can include, but is not limited to, transmitting at least one portion of at least one image representation from a first shared image device in a manner at least partially relying on a proximity of the first shared image device and an at least one other shared image device. For example, in FIG. 5, the first shared image device 504 transmits at least one portion of at least one image representation.

One embodiment of the transmitting at least one portion of at least one image representation from a first shared image device, of operation 604 can include, but is not limited to, operation 618 that can include, but is not limited to, pushing the at least one portion of the at least one image representation from the first shared image device at least partially based on the proximity of the first shared image device and the at least one other shared image device. For example, in FIG. 5, the first shared image device 504 pushes the at least one portion of the at least one image representation to another shared image device such as 506. One embodiment of the transmitting at least one portion of at least one image representation from a first shared image device of operation 604 can include, but is not limited to, operation 626, that can include, but is not limited to, transmitting a plurality of images from the first shared image device. For example, in FIG. 5, the first shared image device 504 transmits a plurality of images. Operation 605 can include, but is not limited to, establishing a permission for the first shared image device to join a sharing session. For example, certain devices within the shared image network 100 as described with respect to FIG. 5 establish a permission for the first shared image device 504 to join a sharing session. A variety of techniques can be provided including, but not limited to, sharing images included in a camera with friends by transferring to their remote camera and/or hard disk, and the converse is true (sharing between proximity and capturing shared image devices). Operation 610 can include, but is not limited to, providing an ability for the first shared image device to join a sharing session. For example, one or more devices within the shared image network 100 provide an ability for the first shared image device 504 to join a sharing session, as described with respect to FIG. 5. Operation 614 can include, but is not limited to, transforming at least one image at least partially using the first shared image device to form at least one transformed image. For example, the first shared image device 504 of FIG. 5 can at least partially transform the at least one other image representation to form at least one other transformed image representation. Operation 616 can include, but is not limited to, providing ancillary information pertaining to at least one image at least partially using the first shared image device to form at least one ancillary-based image. For example, the first shared image device 504 of FIG. 5 at least partially provides ancillary information to at least one other image representation to form at least one other ancillary-based image representation. Certain versions of ancillary information and/or ancillary-based image representations can include that information that is attached or appended to the original information, and/or information that modifies the original information. Operation 617 can include, but is not limited to, providing ancillary information pertaining to an image at least partially using the first shared image device to form an ancillary-based image, wherein the ancillary information includes at least one from a group of format-shared information, associated information, textual information, audio, annotation information, image map information, executable code, data overlay information, or transmitted license. For example, the first shared image device 504 of FIG. 5 at least partially provides ancillary information to at least one other image representation to form at least one other ancillary-based image, wherein the ancillary information includes at least one from a group of format-shared information, associated information, textual information, audio, annotation information, image map information, executable code, data overlay information, or transmitted license. Operation 620 can include, but is not limited to, watermark-transforming at least one image at least partially using the first shared image device to form at least one watermark-transformed image. For example, the first shared image device 504 of FIG. 5 can at least partially watermark-transform the at least one other image representation to form at least one other watermark-transformed image representation. Operation 622 can include, but is not limited to, combining at least one image with at least another image at least partially using the first shared image device to form at least one combined transformed image. For example, the first shared image device 504 of FIG. 5 at least partially combines at least one other images to form at least one combined image. Operation 630 can include, but is not limited to, receiving a request at the first shared image device to share the at least one portion of the at least one image representation. For example, the first shared image device 504 receives a request to share the at least one portion of the at least one image representation (e.g., with the at least one other shared image device 506). Operation 634 can include, but is not limited to, establishing a communication link between the first shared image device and the at least one other shared image device. For example, the first shared image device 504 establishes a communication link (e.g., with the at least one other shared image device 506). Operation 636 can include, but is not limited to, storing and forwarding of the at least one portion of the at least one image representation from the first shared image device. For example, the first shared image device 504 stores and forwards the at least one image representation to the at least one other shared image device 506. Operation 638 can include, but is not limited to, user-controllably deleting the at least one image representation. For example, input at least partially from a user of the first shared image device 504 deletes at least one image representation using, for example, a menu option using, for example, a user interface. Operation 640 can include, but is not limited to, capturing the at least one image representation at least partially using the first shared image device. For example, the first shared image device 504 captures at least one image representation. In operation 640, capturing the at least one image representation at least partially using the first shared image device can include, but is not limited to, operation 664, that can include, but is not limited to, capturing a still image representation at least partially using the first shared image device. For example, the first shared image device 504 captures at least a still image representation. In operation 640, the capturing the at least one image representation at least partially using the first shared image device can include, but is not limited to operation 666, that can include, but is not limited to, capturing a moving image representation at least partially using the first shared image device. For example, the first shared image device 504 captures at least a moving image representation. Operation 642 can include, but is not limited to, capturing the at least one image representation at least partially using the at least one other shared image device. For example, the at least one other shared image device 506 captures an image representation by, for example, taking a picture. The capturing the at least one image representation at least partially using the at least one other shared image device of operation 642 can include, but is not limited to, operation 668 that can include, but is not limited to, capturing a still image representation at least partially using the at least one other shared image device. For example, the at least one other shared image device 506 captures a still image representation. The capturing the at least one image representation at least partially using the at least one other shared image device of operation 642 can include, but is not limited to, operation 670 that includes, but is not limited to, capturing a moving image representation at least partially using the at least one other shared image device. For example, the at least one other shared image device 506 captures a moving image representation. Operation 644 can include, but is not limited to, publishing the at least one portion of the at least one image representation. For example, the first shared image device 504 publishes the at least one portion of the at least one image representation. Operation 646 can include, but is not limited to, selectively sharing the at least one portion of the at least one image representation with the at least one other shared image device, but not with at least another shared image device. For example, the first shared image device 504 selectively shares the at least one portion of the at least one image representation with the at least one other shared image device 506, but not with other shared image device(s). Operation 648 can include, but is not limited to, sharing the at least one portion of the at least one image representation with the at least one other shared image device, wherein the sharing includes actuating at least one from a group of a user-actuated button, a menu, or at least some audio information. For example, the first shared image device 504 shares the at least one portion of the at least one image representation, wherein the sharing includes actuating at least one from a group of a user-actuated button, a menu, or at least some audio information. Operation 650 can include, but is not limited to, automatically deleting the at least one image representation. For example, the first shared image device 504 automatically deletes at least one image. Operation 652 can include, but is not limited to, automatically controlling processing of the at least one image representation. For example, the first shared image device 504 automatically controls processing of at least one image. Operation 654 can include, but is not limited to, controlling processing of the at least one image representation at least partially using a user interface. For example, the first shared image device 504 at least partially controls processing of at least one image using a user interface.

Figure 7A:
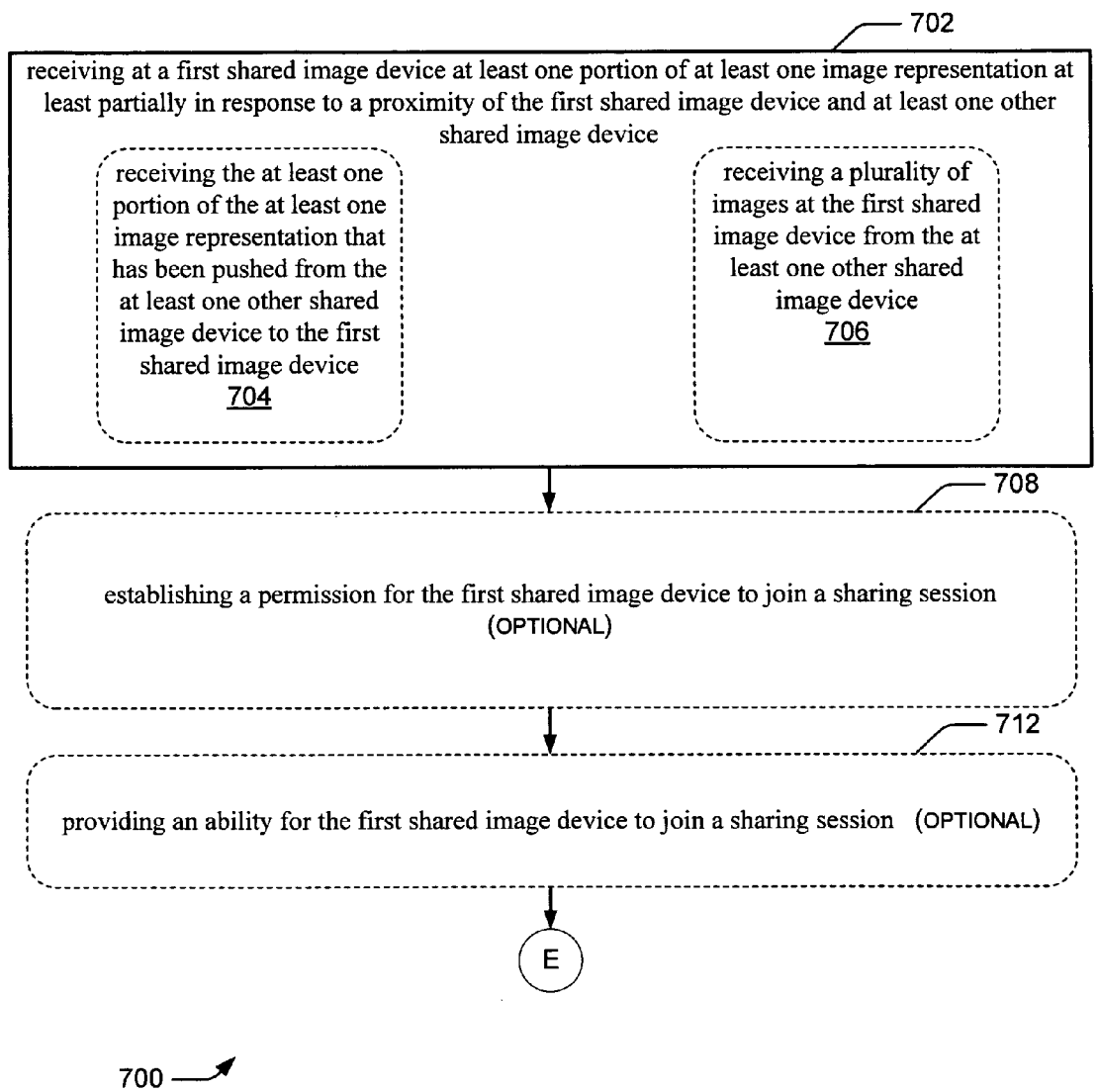
FIG. 7a to 7c shows a high-level flowchart of another embodiment of the proximity shared image device concept.
Figure 7B:
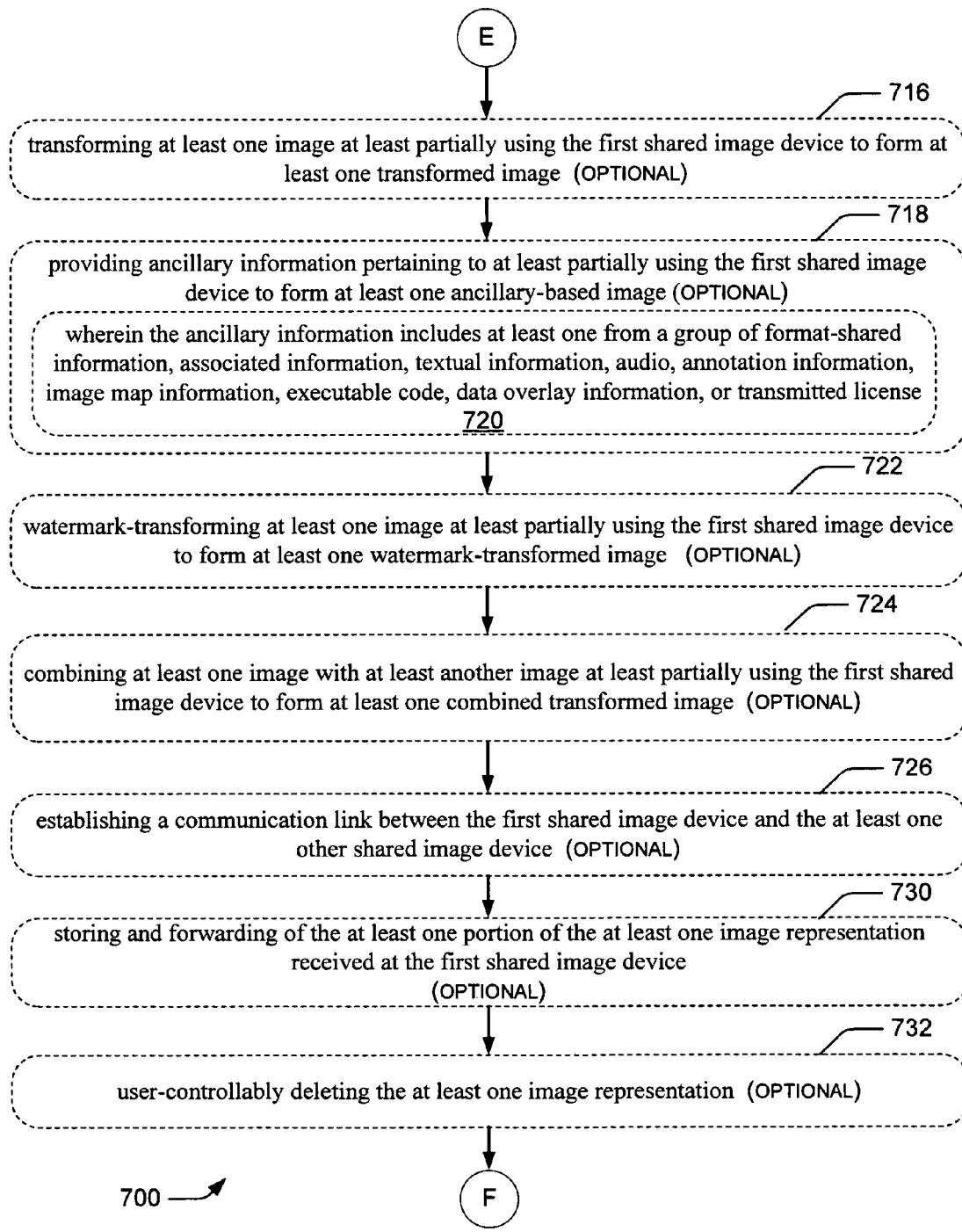
Figure 7C:
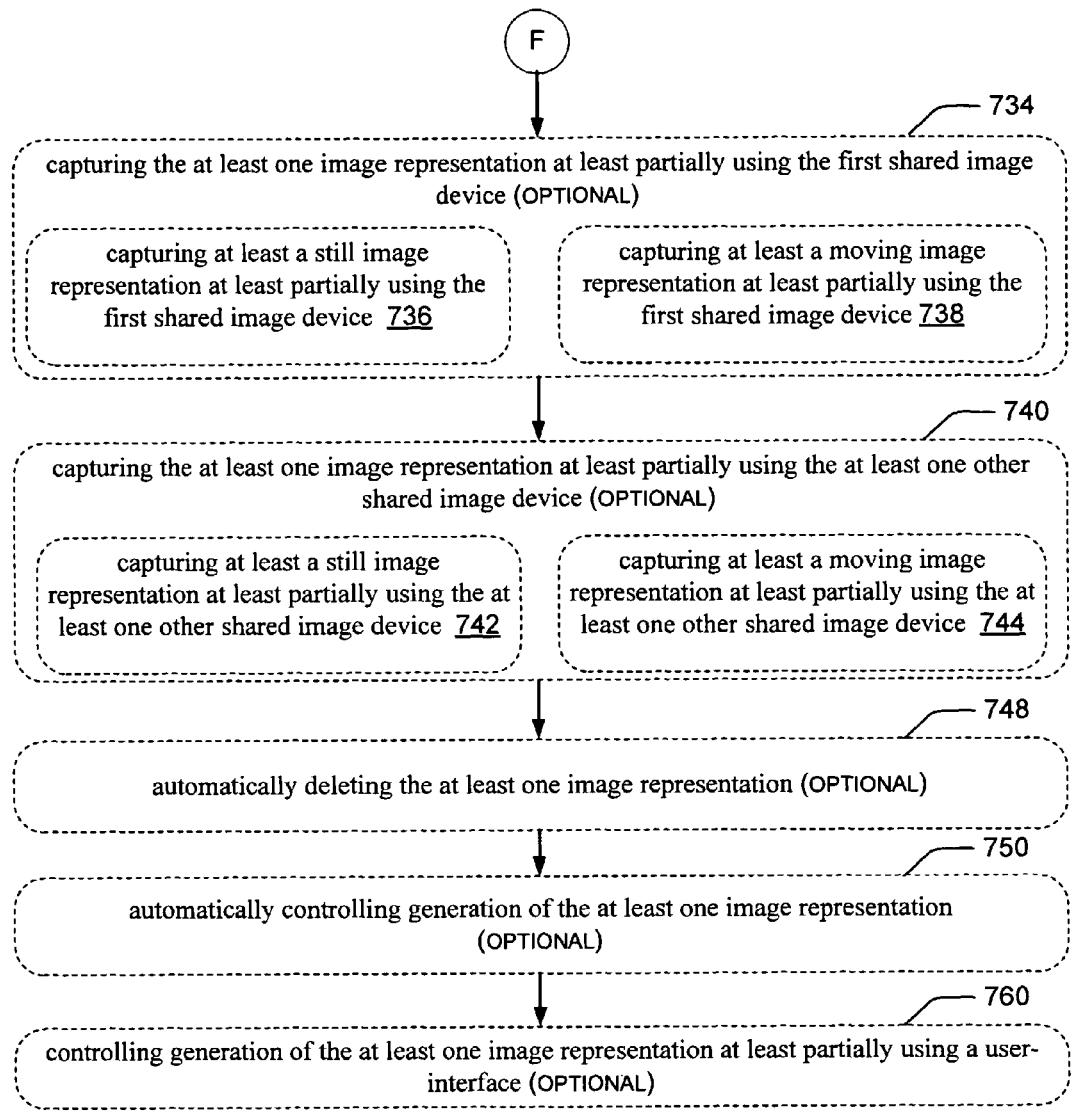

A high-level flowchart of another embodiment of the proximity shared image device concept 700 is described with respect to FIGS. 7*a*, 7*b*, and 7*c* that include a variety of operations, such as described herein. Certain embodiments of the proximity shared image device concept 700 are described with respect to the shared image network 100, as shown in FIG. 9. The embodiment of the shared image network 100 of FIG. 9 can include, but is not limited to, a first shared image device 101*e* configured to receive at least one portion of at least one image representation over a communication link 104*b* from the at least one other shared image device 101*d*. The first shared image device 101*e* and the at least one other shared image device 101*d* can both be configured as the shared image device 101, as described within this disclosure. Operation 702 can include, but is not limited to, receiving at a first shared image device at least one portion of at least one image representation at least partially in response to a proximity of the first shared image device and at least one other shared image device. For example, the first shared image device 101*e* receives at least one portion of at least one image representation, e.g., over the communication link 104*b*. In certain embodiments of 702, the receiving at a first shared image device at least one portion of at least one image representation at least partially in response to a proximity of the first shared image device and at least one other shared image device can include but is not limited to operation 704, that can include but is not limited to, receiving the at least one portion of the at least one image representation that has been pushed from the at least one other shared image device to the first shared image device. For example, the first shared image device 101*e* of FIG. 9 receives at least one portion of the at least one image representation that has been pushed from the at least one other shared image device 101*d* to the first shared image device 101e over the communication link 104b. In certain embodiments of 702, the receiving at a first shared image device at least one portion of at least one image representation at least partially in response to a proximity of the first shared image device and at least one other shared image device can include but is not limited to operation 706, that can include, but is not limited to receiving a plurality of images at the first shared image device from the at least one other shared image device. For example, receiving a plurality of images at the first a shared image device 101e. Operation 708 can include, but is not limited to, establishing a permission for the first shared image device to join a sharing session. For example, establishing a permission for the first shared image device 101e to join a sharing session. Operation 712 can include, but is not limited to, providing an ability for the first shared image device to join a sharing session. For example, providing an ability for the first shared image device 101e to join the sharing session. Operation 716 can include, but is not limited to, transforming at least one image at least partially using the first shared image device to form at least one transformed image. For example, transforming the at least one other image representation using the first shared image device 101e to form at least one other transformed image representation. Operation 718 can include, but not limited to, providing ancillary information pertaining to an image at least partially using the first shared image device to form at least one ancillary-based image. For example, providing ancillary information pertaining to at least one other image representation using the first shared image device 101e to form at least one ancillary-based image. One embodiment of the providing ancillary information pertaining to an image at least partially using the first shared image device to form at least one ancillary-based image of operation 718 can include operation 720, wherein the ancillary information includes at least one from a group of format-shared information, associated information, textual information, audio, annotation information, image map information, executable code, data overlay information, or transmitted license. For example, having anciallary information as provided by the first shared image device 101e including forming an ancillary-based image including at least one from a group of format-shared information, associated information, textual information, audio, annotation information, image map information, executable code, data overlay information, or transmitted license. Operation 722 can include, but is not limited to, watermark-transforming at least one image at least partially using the first shared image device to form at least one watermark-transformed image. For example, the first shared image device 101e watermark-transforms the at least one other image representation to form at least one other watermark-transformed image representation. Operation 724 can include, but is not limited to, combining at least one image with at least another image at least partially using the first shared image device to form at least one combined transformed image. For example, combining at least two images at the first shared image device, or at some intermediate device within the communication link 104b. Operation 726 can include, but is not limited to, establishing a communication link between the first shared image device and the at least one other shared image device. For example, the communication link 104b is established between the first shared image device 101e and the at least one other shared image device 101d. Certain embodiments of operation 730 can include, but are not limited to, storing and forwarding of the at least one portion of the at least one image representation received at the first shared image device. For example, storing and forwarding the at least one portion of the at least one image representation to be received at the first shared image device 101e. Operation 732 can include, but is not limited to, user-controllably deleting the at least one image representation. For example, user-controllably deleting the at least one image representation, in one embodiment at the first shared image device 101e. Operation 734 can include but is not limited to capturing the at least one image representation at least partially using the first shared image device. For instance, the first shared image device 101e captures at least one portion of the at least one image representation. In operation 734, the capturing the at least one image representation at least partially using the first shared image device can include, but is not limited to, operation 736, that can include, but is not limited to, capturing at least a still image representation at least partially using the first shared image device. For example, capturing at least a still image representation using the first shared image device 101e. In operation 734, the capturing the at least one image representation at least partially using the first shared image device can include, but is not limited to, operation 738, that can include, but is not limited to, capturing at least a moving image representation at least partially using the first shared image device. For example, capturing at least a moving image representation at least partially using the first shared image device 101e. Operation 740 can include, but is not limited to, capturing the at least one image representation at least partially using the at least one other shared image device. For example, the at least one other shared image device 101d captures the at least one image representation. The capturing the at least one image representation at least partially using the at least one other shared image device of operation 740 can include, but is not limited to, operation 742 that can include, but is not limited to, capturing at least a still image representation at least partially using the at least one other shared image device. For example, capturing a still image representation using the at least one other shared image device 101d. The capturing the at least one image representation at least partially using the at least one other shared image device of operation 740 can include, but is not limited to, operation 744 that includes, but is not limited to, capturing at least a moving image representation at least partially using the at least one other shared image device. For example, capturing a moving image representation using the at least one other shared image device 101d. Operation 748 can include, but is not limited to, automatically deleting the at least one image representation. For example, the first shared image device 101e deletes at least one image representation. Operation 750 can include, but is not limited to, automatically controlling generation of the at least one image representation. For example, the first shared image device 101e automatically controls at least one image representation, such as by using a computer, controller, or other device. Operation 760 can include, but is not limited to, controlling generation of the at least one image representation at least partially using a user-interface. For example, the first shared image device 101e controls at least one image representation with a user interface.

Figure 8:
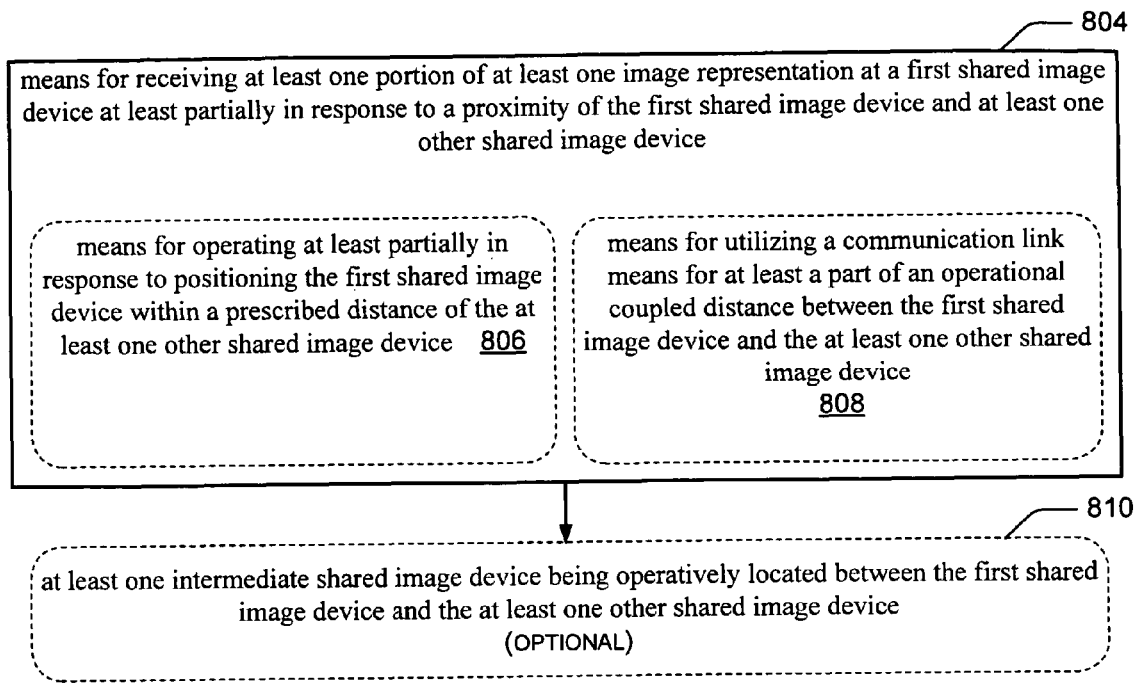
FIG. 8 shows a flowchart of one embodiment of yet another embodiment of the proximity shared image device concept.

A high-level flowchart of one embodiment of the proximity shared image device concept 800 is described with respect to FIG. 8 that includes a variety of operations, such as described herein. The proximity shared image device concept 800 as described with respect to FIG. 8 may be described, in this disclosure, with respect to FIG. 10. Certain embodiments of the proximity shared image device concept 800 are described with respect to the shared image network 100, as shown in FIG. 10. The embodiment of the shared image networks 100 of FIG. 10 can include, but is not limited to, a first shared image device 101h configured to receive at least one portion of at least one image representation over a communication link 104c from at least one other shared image device 101g. The first shared image device 101h and the at least one other shared image device 101g can both be configured as the shared image device 101, as described within this disclosure. Operation 804 of FIG. 8 can include, but is not limited to, means for receiving at least one portion of at least one image representation at a first shared image device at least partially in response to a proximity of the first shared image device and at least one other shared image device. For example, in FIG. 10, the communication link 104c, the first shared image device 101h, or some other device can provide a means for receiving at least one portion of at least one image representation from the at least one other shared image device 101g. The means for receiving at least one portion of at least one image representation at a first shared image device at least partially in response to a proximity of the first shared image device and at least one other shared image device of operation 804 can include operation 806, which can include, but is not limited to, means for operating at least partially in response to positioning the first shared image device within a prescribed distance of the at least one other shared image device. For instance, the first shared image device 101h is positioned within a prescribed distance of the at least one other shared image device 101g. The means for receiving at least one portion of at least one image representation at a first shared image device at least partially in response to a proximity of the first shared image device and at least one other shared image device of operation 804 can include operation 808, which can include but is not limited to, means for at least partially utilizing a communication link for at least a part of an operational coupled distance between the first shared image device and the at least one other shared image device. For example, the communication link 104c is positioned between the at least one other shared image device 101g and the first shared image device 101h. Operation 810 can include, but is not limited to, at least one intermediate shared image device being operatively located between the first shared image device and the at least one other shared image device. For example, applying an intermediate device.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

Examples of Sharing Mechanisms

To provide improved consumer electronics, it may be desirable to provide a simplified sharing mechanism to accomplish the desired task for the shared image device 101. The image-based products produced by such large-scale electronics/computer manufacturers such as Hewlett-Packard, IBM, Xerox, Sony, and a variety of other companies (all registered trademarks of their respective companies) determine those consumer-electronic devices that could have sharing capacity. To appreciate the large variety of shared image devices 101 that could benefit from sharing capability and thereby become either a capturing or peripheral shared image device of, one can walk-through a large consumer-electronics store, or alternatively consider the variety of consumer device patents in the USPTO.

Certain shared image devices 101 might have a prescribed design behavior when associated with a group of shared image devices. Consider that each shared image device has a traditional function such as photography, printing, computing, etc. It is also possible that some shared image devices can perform a function that differs from their traditional function for a particular sharing session.

Theoretically, the share mechanism can be configurable to operate relatively simply to cause sharing between multiple shared image devices; similar to the ease that has become generally accepted by, e.g., depressing a shutter button that triggers a camera to capture an image. Additional complexity may be provided, as desired, in certain embodiments of shared mechanisms to provide additional functionality such as to select those shared image devices that may join a particular sharing session. One embodiment of such additional complexity to select member shared image devices may relate to establishing a "buddy list" between multiple shared image devices, as described later in this disclosure. Certain embodiments of shared image devices, but not others, are configured as a packaged item that allows sharing functionality to other shared image devices in the package. Such member selection may be afforded to peripheral shared image devices such as device printers, DVD burners, etc.

In certain embodiments, shared image devices select certain shared images that may have been captured by at least one other shared image device, and can obtain other versions of the selected shared images. In one embodiment, it may be desired to provide a near-real-time data-transfer between certain shared image devices 101 (but perhaps not others) that are participating in certain sharing sessions. In other embodiments, the rate of data transfer may not be critical based on the particular application, and the rate of data transfer can be reduced. The particular share mechanism should be adaptable to the uses, designs, operations, and other considerations of the shared image devices.

Examples of Shared Image Devices Having Password Proximity

It has been described above how to integrate a number of shared image devices 101 into the shared image network 100 based upon the proximity of the shared image devices 101 (either geographic or based on the communication link 104), and also based on the actuations of, and the operations of, the respective shared mechanisms. In the geographic proximity-based embodiments, the shared image devices can be located relatively closely to each other depending upon the particular technology utilized.

In other embodiments, shared image devices can be operably connected to each other (e.g., operably coupled) to allow authentication for operation such as by a password such as a spoken word or phrase, a captured picture, etc. Certain embodiments can use password-proximity in combination with, or in addition to, geographic proximity. The different types of proximity are therefore not necessarily mutually exclusive. As such, an authorizing password, a pass image, or a variety of similar pass mechanisms can replace the above-described physical proximity requirements.

This portion of the disclosure thereby describes how a number of shared image devices 101 can join the sharing session based on passwords or a similar mechanism, instead of based upon the physical proximity. Certain embodiments of the shared image network 100 can create group passwords to protect against use of shared image devices by non-participants. The shared image devices 101 within that particular sharing session can be configurable to respond or operate pursuant to the password, pass image, etc. using suitable image recognition, speech recognition, pattern recognition, or other recognition programs. Consider, for example, one of the participants at a birthday party or other event creates a temporary community password for the session group.

Participants can enter the appropriate password, and thereby actuate the shared image device 101 using the sharing mechanism. In one embodiment, only those shared image devices 101 with the correct password may be provided access to a community of shared images for that sharing session.

A variety of password mechanisms thereby can provide password functionality to shared image devices 101. Password mechanisms represent one relatively easy technique to provide password functionality. In one embodiment, the users of shared image devices 101 can follow instructions to type in a specific password, pass phrase, something the user says, something the user types, or some picture that can be possessed by the users in the sharing session (e.g., handed out at the door for a sharing event). Such password, etc. that passes the appropriate recognition program can thereupon be used for authentication, etc.

One embodiment of a recognizable password for a recognition program includes a photographic-password. For example, a user who wants to join a certain session can do so by submitting a captured image of an arm, a captured image of a thumb, a captured image of a shoe, a captured image of a prescribed number of fingers or some letter or number (or group thereof), or a captured image of some other physical characteristic whose shape or appearance would be recognizable using computer-based image recognition programs, etc. In another embodiment, at least some of the cameras are provided (e.g., by a leader of a session or a producer of a shared image device) with a similar appearing card or piece of paper having some shape or pattern printed on them that represents a picture that can thereupon act as a password.

In another embodiment, the printed pattern could even include, e.g., a page or portion of a newspaper, or magazine, or a portion thereof. The pattern of text, or a photograph, or a physical shape can represent a pattern that is recognizable by a hardware, firmware, or software-based pattern recognition mechanism such as may be used in certain embodiments of shared image devices 101. In yet another embodiment, the pattern recognition software can even be applied to remote shared image devices, such that the members of the sharing session hold up some predetermined number of fingers (e.g., 5, 4, etc.), or a printed number, to join the sharing session. These examples of pattern recognition, speech recognition, etc. are illustrative in nature and not limiting in scope. In certain embodiments, the users of the shared image devices 101 can even be remotely located as in different cities or countries while allowing suitable operation of the shared image network 100.

The patterns discussed in this disclosure are recognizable by an optical, audio, or video pattern recognition system or device (such as a pattern or shape recognition program that runs on at least one general-purpose computer or at least one specialized-purpose or specific-purpose computer, or a networked combination thereof, as described herein). It is also to be understood that many shared image devices, such as digital cameras or camcorders, could include voice input that could thereupon be compared against a speech pattern, an audio pattern, and/or a password or pass-phrase pattern using vocal recognition patterns. As such, a vocal or audio pattern search of a particular individual using a vocal or audio recognition program, or using a particular spoken password, is within the intended scope of the present disclosure. Additionally, a spoken password can be compared to a voice recognition program for that password.

There are a wide variety of graphic, photographic, image-based, local, or audio type passwords, and/or pass-phrases that are within the intended scope of the present disclosure. As such, those described herein are not intended to be limiting in scope. The variety of recognition programs for speech, voice, image, audio, video, etc. provide an indication of the large variety of recognition programs that are within the intended scope of the applicable pattern recognition programs of the present disclosure. The general operation of recognition programs as run on captures and/or controllers are generally well known by those skilled in the art and will not be further detailed within this disclosure.

The sophistication, quality, expense, and functionality of shared image devices 101 included in different embodiments of the shared image network can therefore vary widely. In one embodiment, the satellite shared image devices 101*b* that are associated with the master shared image device 101*a* can be a relatively inexpensive device, such as cameras or camcorders that can each hold a prescribed amount of data at any given time. As such, the satellite shared image devices 101*b* can thereupon obtain or retain the data to the imaging computer-camera associated with that sharing session. In other embodiments, some of shared image devices 101 in the shared image network 100 can be relatively expensive and sophisticated, such that each shared image devices 101 can be configurable to perform a specific function and/or specific operability.

A certain master shared image device 101*a* can alternatively be configurable as a satellite shared image device 101*b* in a different sharing session or time. In one embodiment, the person giving the party, moderating an event, etc. can logically configure their digital image device to be the master. As such, certain digital image devices (e.g., digital cameras or camcorders) can be configurable as the master or satellite depending upon the particular sharing session, and who is establishing or running the sharing session.

If a particular shared image is deleted, the deletion of the shared image can propagate through other shared image devices and/or users in certain embodiments. Although in certain relatively simplified embodiments, the deletion will not propagate through to other shared image devices. It may, also be desirable to apply an undo function to certain embodiments of shared image devices to remove bad pictures (images) so that they may not be shared.

In the peer-configuration, it may be desired to provide some "remembering" function such that the shared image network 100 remembers the contents of those particular shared images that were not shared before shared image devices lost proximity. An option may be to allow those shared images to be shared between shared image devices.

Examples of Sharing Sessions

As described in this disclosure, it may be useful in certain embodiments (while not in other embodiments) to incorporate some type of a sharing session that extends for the duration of a session to associate, on a sharing basis, those member shared image devices to the sharing session. As such, the sharing session can be the duration over which certain embodiments of shared image devices 101 may share their shareable resources, such as still pictures or motion pictures.

There can be many embodiments of types of sharing sessions, as described within this disclosure. For example, in some sessions, the shared images that have been captured can be shared or copied between some of the other shared image devices 101. As such, if a number of shared image devices each captured an image (or portions thereof) for a particular sharing session, then some of the shared image devices can be expected to have a large number of shared images to capture, process, manage, consider, store, and/or view. In other embodiments of the sharing sessions, only a certain number of the images are shared or copied with certain shared image devices.

One embodiment of the sharing session may involve a group of users for a session (e.g., parents for a particular child's birthday party or sporting event), each of which have a shared image device that may be configurable (authenticated or authorized) to gain access to the shared images at that event. In one embodiment, certain shared image devices 101 could obtain or retain shared images (e.g., pictures) even after they had left, but before the event has ended. It is likely that the shared image network 100 would utilize one or more wireless links to provide the flexibility between the shared image devices such as is provided with certain local area networks. Alternatively, the images could be accessed later over e.g., wide area networks to obtain or retain large volumes of the data associated with a number of pictures.

For certain embodiments, it may be desired to allow a certain shared image device 101 to join a plurality of concurrent sharing sessions. A user would then be able to determine which one of multiple sharing sessions they wished to be a member. As such, such a shared image device 101 could obtain or retain information from at least certain other shared image devices from both/all of the concurrent sharing sessions. Access to the multiple sharing sessions can be covered by providing multiple passwords or pass-phrases that each relate to the different concurrent sharing sessions. In certain embodiments, it is therefore possible for certain shared image devices 101 to subscribe to multiple sharing sessions simultaneously. Logically, this sharing of one shared image device into multiple sharing sessions can be envisioned as, e.g., a Venn diagram in which each shape represents one of multiple potentially-overlapping concurrent sharing sessions. In these embodiments, the sharing sessions that each shared image relates to can be identified; or in certain embodiments, a particular shared image device pertains to both/all of the concurrent sharing sessions.

With many embodiments of sharing sessions that are established on peer-to-peer shared image networks similar to as described above with respect to FIG. 2; the networks can have the capability of replicating data that has been lost (or not obtained) by a particular shared image device 101. As such, when a particular shared image device 101 joins the sharing session, it may be able to query at least some of the devices to obtain the shared images that have been captured through the beginning of that sharing session. As such, when a member of the sharing session or event arrives halfway through the event, they will be able to access the previously captured images, etc. that pertain to the sharing session.

Replication of lost, or never obtained, data may be successfully performed in many peer-to-peer shared image networks as well as other networks. Such data replication represents an advantage of certain peer-to-peer shared image networks. This replication may not apply to sharing sessions that have already both started and ended, even for peer-to-peer shared image networks. As such, in many embodiments, users of shared image devices 101 that might have joined the sharing session after the sharing session has ended may not be able to obtain those shared images substantially directly (but perhaps can obtain the sharing session pictures from a friend or a family member). Certain embodiments of the shared image network 100 may include a concept of a synchronized master shared image device from which a latecomer can obtain the shared images.

Though dissimilarities exist between different types of sharing sessions between shared image devices 101, there can also be a great deal of commonality. For example, many embodiments of the sharing sessions can be identified by a unique session identifier. With certain embodiments of the sharing sessions, those who are attending should be able to access the shared images captured by some of the shared image devices 101 associated with that sharing session (while this may not be true in other embodiments of the sharing session). Many embodiments of sharing sessions rely on a broadcast by which images (or portions thereof or information relating thereto) are transmitted to other members of the session, in many instances without an addressing mechanism.

A user can get access to sharing sessions in certain embodiments after they have left that sharing session, such as a party. For example, the sharing session may be configurable such that the members can access images relating to any portion of the shared session following the shared session from one of the session members (perhaps after providing a suitable password to rejoin and/or access images from the session). In certain embodiments, such sharing session members may be able to access the shared images after they leave the sharing session using a different mechanism, such as the Internet or another embodiment of network (e.g., or other shared image network). The particular configuration of the shared image network largely determines how current members, as well as past members, of the sharing session may access shared images from the shared image network.

Consider that for certain embodiments, when a user actuates a sharing mechanism 102 to join a particular sharing session, that they establish a sharing session identity (ID). For certain embodiments of shared image devices 101, they should be able to use the sharing session ID to later retrieve pictures even after they have left the event. For example, the password can be used as a host-name or sharing session ID for the event. Sharing session names can also default to easily remembered things such as date, name of the sharing session, etc. Shared image devices can be associated with one or more from a set of shared default keywords such as "party", "anniversary", "Christmas", "sports event", "business meeting", etc. For a number of embodiments, the information associated with each particular sharing session should be retrievable later from a central computer, a server, etc.

For a particular sharing session member who shows up late to the sharing session or meeting, it may be important that different session attendees have the capability of "pulling in" new members, and providing them the shared images going back to the beginning of the sharing session. For example, assume that there are four currently-joined shared image devices 101 in a session, and a new shared image device is being joined using the first shared image device to establish a new grouping of five shared image devices. Such joining techniques may, for example, rely on point-to-point communication, master-satellite communication, client-server communication, or other shared communication techniques. In one embodiment, for example, the user of the first shared image device 101 actuates the sharing mechanism that publishes the shared images to allow the joining shared image device to become part of the sharing session, and thereby gain access to the images already taken by other session devices. A number of different sharing session configurations for the sharing mechanisms can thereby be provided depending on the application or as a design choice. One embodiment involves a first person actuating the sharing mechanism 102, at which point other shared image devices within range may be able to access those. This embodiment could be considered as simply opening up some of the session information contained in one shared image device 101 to other shared image devices.

Another embodiment can be considered as a "published with synchronized timestamp", such that each user actuates the sharing mechanism at the same time to get synchronized, and therefore is able to somewhat control the dispersal of the shared images. Another embodiment can be referred to as a "shared plus password."

Examples of Ancillary Aspects for Sharing Mechanisms

Certain shared image device 101 concepts can also be applicable to business meetings, telephone calls, etc. As such, some participants in a meeting can copy, share, and/or distribute all, or selected shared images, or shared camcorder output, etc. relating to the meeting, event, etc. This even applies to those members who arrived late.

Some embodiments of the sharing mechanism can also include a stop-publishing aspect of the sharing mechanism. In certain session embodiments, a stop-sharing mechanism or temporary halt publishing mechanism performs an inverse operation to the sharing mechanism as described herein. Suppose, for example, that a user in a shared image device 101 wishes to capture at least one private picture, and thereby temporarily disconnects from the shared image network to keep from sharing that image from the other members of the sharing session.

This can be the same or a different feature as a temporary-private mechanism such as a mute-image device. In this manner, a person in the party can temporarily disconnect their device from the shared image network 100 and/or certain shared images or portions thereof for a portion of the sharing session.

In one embodiment, a unique time-stamp can be provided to synchronize at least some of the digital devices in the sharing session, and the time can be measured with respect to the beginning of the sharing session. Each shared image device such as a digital camera or camcorder can thereupon utilize a universal sharing time. In one embodiment, at least some of the clocks for the different shared image devices 101 slave to a time corresponding to one of the devices for that sharing session. In another embodiment, at least certain shared image devices 101 slave to a sharing session time for that session. The selected sharing session time can rely on a distinct time-keeping mechanism.

In another embodiment, a "buddy list" can be integrated into a number of shared image devices that form a subset from within a larger group of shared image devices (e.g., the smaller group is identified to share or copy their shared images using the buddy list). Those shared image devices may elect to share or copy their images with other shared image devices sharing the same buddy list, but not share their "buddy-list" images with the group of shared image devices at large.

In one practical example, assume that one user of the shared image device 101 goes to a sports event with a group of friends. When that user actuates the sharing mechanism using their buddy list, the shared image device synchronizes with other shared image devices on that buddy list, but not necessarily with the shared image devices at large. In one embodiment, the "buddy-list" group can be associated with a prescribed password, for example. There can be a variety of such embodiments of shared image devices that range from relatively simple to more complex. The use of the buddy list to actuate the share mechanism in certain embodiments of shared image devices can utilize certain passwords, such that those shared image devices that produce the passwords can join the buddy-list session.

A number of rules can be applied to the shared image devices that pertain to general concepts of time, space, and/or locations for capturing the shared images. Such aspects as buddy lists, the numbers of pictures that can be shared, stop-halt, temporary-halt, percentage of storage that can be shared, and the types of pictures that can be shared (e.g., private or public shared images) are exemplary aspects with respect to shared image devices.

Additionally, in one embodiment, photographers could prioritize their shared images. For example, certain shared images can vary in quality based on, e.g., content, interest, or quality of the shared image in a manner that can be either objectively or subjectively rated, or other such factors. Other users may select a shared image device to access only those shared images that are above a certain quality level (e.g. good, excellent, fair, etc.). Filtering of the lower quality images, measured by some objective and/or subjective standard, provides a technique to reduce the amount of data that has to be obtained or retained for each sharing session.

Certain embodiments of shared image devices can be configurable to handle multiple sharing sessions. For example, suppose a user has a printer that can handle both a first sharing session and a second sharing session for a particular digital camera or camcorder. Different applications for the shared image devices could thereupon be useful in business, educational, sporting, governmental, police, or applications in which an individual obtains shared images for several concurrent events (or only one event that an individual is not attending). It might be desirable to allow a user to subscribe to the multiple sharing sessions substantially simultaneously. The personal computer (PC) can be configurable as a peer (of a peer-to-peer shared image network configuration) that monitors the shared images that are being captured as to select a variety of shared images from multiple shared image devices.

In certain embodiments, a status indicator can be provided, either on the shared image device or separately, and which indicates to others that a particular shared image device is in its share mode. One example of a status indicator may be an indicator light, or an "active" indicator on the display of the shared image device. Other status indicators may display some information pertaining to the particular sharing session.

Examples of Viewfinders for Shared Image Devices

In certain embodiments, but not others, a sharing mechanism might be considered to function as a virtual picture frame or viewfinder that allows remotely-located shared image devices such as digital cameras or camcorders to capture shared images. Viewfinders therefore provide a mechanism for one shared image device (which may be configurable as either a peripheral shared image device, a capturing shared image device, and/or another shared image device) to observe an image that has been, or is being, captured by another shared image device (which may be configurable as either a peripheral shared image device, a capturing shared image device, and/or another shared image device). As such, certain embodiments of viewfinders may be considered as operating to "share another shared image device's viewfinder". In one embodiment, a viewfinder at a first shared image device can display at least one image, or a portion thereof, that is being imaged at a second shared image device. The second shared image device acts by displaying at least a portion of the at least one image that is displayed by the first shared image device as it could appear at the first shared image device. Those embodiments of shared image devices 101 that are provided with viewfinders can be used by users to perform a variety of processing related to the shared images including, but not limited to, viewing the shared images, selecting those shared images to keep and those to discard, determine those shared images that will undergo further processing, and determine those shared images to select an increased resolution version of (e.g., when provided with thumbnails, image information or portions thereof, or metadata describing the image). For example, certain embodiments of viewfinders may display thumbnails of shared images. From the thumbnails, the user determines those shared images that are to be accessed in more detail (e.g., having a greater resolution).

Certain embodiments of a sharing menu (not shown) that is integrated within a shared image device 101. The sharing menu can be integrated as a portion of the viewfinder of certain embodiments of the shared image device 101 (e.g., such as being located on the display of the shared image device). The shared image device can allow a user to join a particular session, for which they are proximately located using one of the above-described mechanisms such as geographic proximity, proximity by communications link, and/or proximity by password. Certain components of a sharing menu may be selected using, for example, touch from a finger or stylus, clicking using inputs from a mouse, keyboard, trackball, or other device, etc.

The sharing menu can include a variety of questions, such as including input for the name and/or identity of the user, the user password, indicating whether this shared image device is the master device for a particular session, and indicating whether the particular session has a prescribed duration, and if so, when is the timeout. The embodiment of the sharing menu as described is illustrative in nature, and not limiting in scope. In actuality, the sharing menu can have a variety of appearances, shapes, and/or questions.

Figure 11:
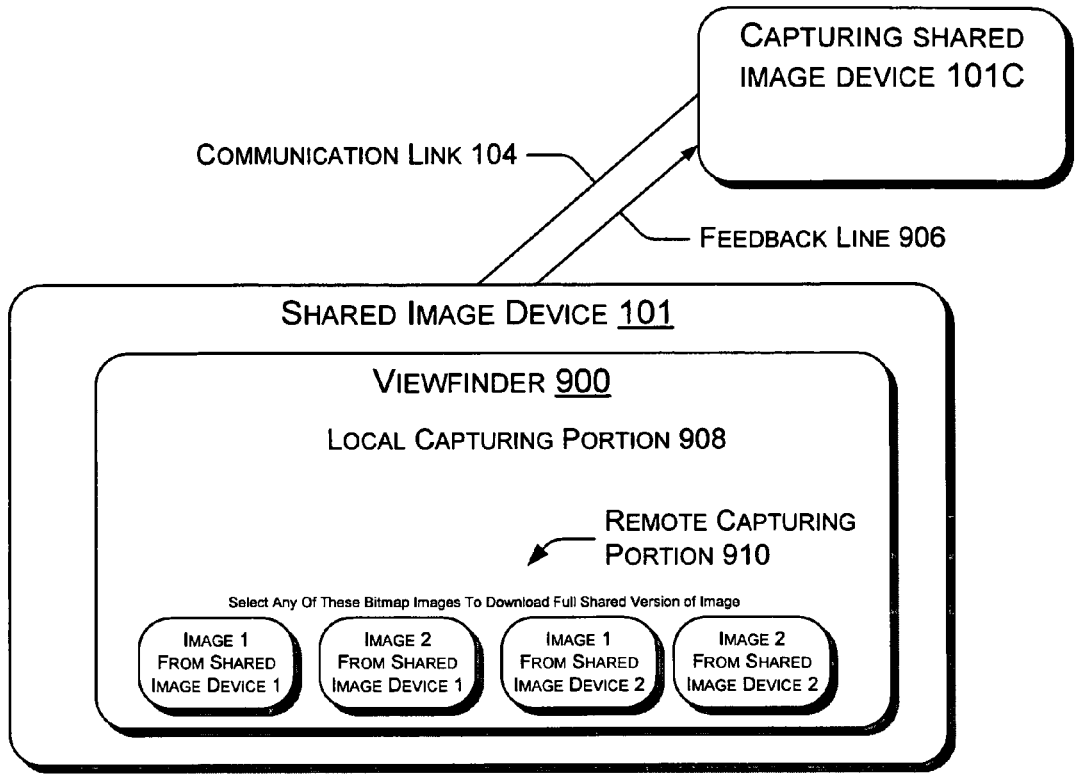
FIG. 11 shows a generalized front view of one embodiment of a viewfinder or display that can be integrated in a shared image device.

FIG. 11 shows one embodiment of a viewfinder 900 that is integrated within a shared image device 101. As described with respect to FIG. 11, the shared image device 101, such as a digital camera or camcorder, may be configurable to capture and/or retain shared images. Alternatively, the shared image device 101 can be a portable image storage and/or display device, or a computer to obtain and/or retain shared images. Certain embodiments of shared image devices do not include the viewfinder 900, and as such would not be used to display shared images. In this disclosure, the viewfinder 900 refers not only to traditional optical viewfinders, but also to liquid crystal display (LCD) or other displays such as might be located on the back of the digital camera or camcorder.

As described with respect to FIG. 11, the shared image device 101 is in communication via a communication link of 104 with the capturing shared image device 101c. For example, the capturing shared image device 101c is configurable for capturing images, certain ones of which can be shared images. The viewfinder 900 can thereby display certain images captured by the instant shared image device 101 over a local capturing portion 908 of the viewfinder 900, and also display images captured by the remote capturing shared image device 101c over a remote capturing portion 910 of the viewfinder. For example, shown in FIG. 11 are images 1 and 2 from a shared image device 1, and images 1 and 2 from a separate shared image device 2; these images may serve as examples of shared images. In addition, different embodiments of the shared image device 101 as described with respect to FIG. 11 are configured as a capturing shared image device (that can capture an image), or alternately as a peripheral shared image device. As an aside, note that although a certain configuration of the local capturing portion 908 and the remote capturing portion 910 are shown, in certain embodiments of the viewfinder 900 other configurations/locations of the remote capturing portion 910 in addition to the local capturing portion 908 are possible.

The selection of a relative display of the remote capturing portion 910 relative to the local capturing portion 908 over the viewfinder 900 is a design choice, and the present description is not intended to be limiting in scope. For example, the remote capturing portion 910 of the viewfinder 900 can be provided relative to the local capturing portion 908 as an overlying window, an underlying window, a top or bottom window, an additional box, overlying text that is physically typed above the local capturing portion 908, or a variety of other configurations that are known to those skilled in graphical user interfaces (GUIs) such as Windows (as designed and made commercially available by Microsoft) and Mac (as designed and made commercially available by Apple Computer).

Also described with respect to FIG. 11 is a feedback line 906 that provides a user interface between a shared image device 101 and another remote shared image device 101c. The embodiment of the feedback line 906 as described with respect to FIG. 11 allows a user at a local shared image device 101 to provide imaging input to a remote shared image device 101c. Certain embodiments of the feedback line 906 can be configurable as a wireless link, similar in configuration to the communication link 104. In certain embodiments, the feedback line 906 can be integral with the communication link 104. Utilizing certain embodiments of the feedback line 906, the user at the shared image device 101 thereby provides feedback to the remote capturing shared image device 100 as to what they want to see, or to particulars of capturing current or future images.

In one embodiment, the feedback line 906 includes an audio transmission line, by which one user can indicate to another user at the capturing shared image device 101c to, perhaps, move the particular remote capturing shared image device 101 to another location, detect a different field of view, zoomed in or out, otherwise adjust the settings of the capturing shared image device, provide a shared image, do not provide a shared image, capture another shared image, to not capture another shared image, or perform a variety of other task(s) with the remote capturing shared image device 101c.

Non-verbal instructions, similar in nature to those described as being transmitted over the audio version of the feedback line 906, can also be transmitted over a text-based or other graphical version of the feedback line. For example, a user in one shared image device can indicate to a user and another shared image device to scan in another direction by using a series of the arrows or other recognizable indicators that are transmitted utilizing GUI nomenclature via the feedback line 906. One user can also type to a remote user to zoom in or out.

The different embodiments of the feedback line 906 can be added, in addition to those feedback lines that are integral with each communication link 104, as described in this disclosure. Increasing the types and amount of communications that can be transmitted utilizing the feedback line 906 can thereby provide more interaction between the users and remotely-located shared image devices, thereby potentially improving an overall image sharing experience.

As described in this disclosure, certain embodiments of the viewfinder 900 thereby can be configurable in a variety of configurations to display the images in a variety of formats depending upon the type of the shared image device, the volume of data that is available to store therein, the amount of shared images that actually are stored therein, and the user input.

The viewfinder 900 may be utilized in a variety of shared image devices 101 to display certain shared images. As such, a first shared image device can capture or copy a shared image, or a portion thereof, from a second shared image device at a remote location from the first shared image device. Under these circumstances, the first shared image device can actually utilize the imaging aspects or equipment of the second shared image device. Instead of photographing a vision or scene with multiple shared image devices, the scene can be photographed by only one device, and the distributed images can be combined to be copied or shared with other shared image devices.

It is thereby possible in certain embodiments to utilize another shared image devices' viewfinder 900 including the local capturing portion 908 and the remote capturing portion 910; such that one user can see what's on somebody else's shared image device. Suppose, for example, one shared image device that is at a child's birthday party is positioned at a swing while a second is at a swimming pool. It may be desirable to switch between the images that appear in the viewfinder 900 of the multiple shared image devices. Such viewfinders can exist in many embodiments of the at least one other shared image device 101d that is providing some operation information over the communication link 104b to the first shared image device 101e (see e.g. FIG. 9) to control an operation of the capturing shared image device.

This use of switching viewfinders 900 for the shared image devices can also be applied to business, educational, personal, or other applications. For example, there might be multiple blackboards or whiteboards in a classroom that can be captured by multiple shared image devices. Alternatively, a user may wish to view what is going on in one class while attending another. Certain embodiments of the shared image device as described in this disclosure can thereby, essentially, bookmark activities at another shared image device.

In certain applications, it may therefore be worthwhile to view somebody else's viewfinder 900 as opposed to just obtaining or retaining shared images that might have been captured. This also provides a technique to view the viewfinder 900 of another shared image device. For example, one shared image device can be used to indicate to a second shared image device that the subject of the first shared image device; as such, please capture an image at the second shared image device for the first shared image device.

Sharing or copying images between multiple shared image devices can thereby be considered as copying a captured image from the capturing shared image device to the other shared image devices (such other shared image devices can be configurable either as a capturing and/or peripheral shared image device). The quality, resolution, and other characteristics of each shared image are initially determined by the image in properties of the capturing shared image device that captured that shared image.

Consider that, in one embodiment, a first shared image device has a higher resolution compared to other shared image device(s), such that relatively high quality shared images can be copied and distributed with other shared image devices (that are only capable of capturing lower resolution shared images). In certain sharing sessions, the best, or highest resolution, shared image device, or those used by the best photographer, can be used to capture shared images or portions thereof for other sharing devices in the sharing session. Each image or photograph can be captured by the particular desired capturing shared image device (highest resolution, least memory used, flash capability, demonstrated ability to take good shared images, etc.). The shared images captured by multiple shared image devices can then be copied or shared into each desired shared image device.

As such, a particular user may have a number of capturing shared image devices, each shared image device is considered optimal to capture a particular type of image. The sharing mechanism as described in this disclosure thereby allows the shared image that is being captured by each of these capturing shared image devices to be transferred between these multiple shared image devices to one or more selected shared image devices. Those images received by the selected shared image device from each of these "optimized" shared image devices are thereby identical to those images captured by the capturing shared image device.

Certain embodiments of the viewfinder 900 provide a mechanism by which the shared image device displays those images which, in time, can be copied to at least one other shared image device.

In one embodiment, the viewfinder 900 is used to subscribe to data from other shared image devices. New functionality might be provided to one shared image device based on the images, data, and/or information being shared or copied from other shared image devices. For example, the viewfinder 900 might annotate its display to show which geographic areas have been sufficiently captured or covered by previous shared images. In the case where the shared image device 101 is a digital camera or camcorder, that new functionality may include an enhanced resolution, an occlusion removal, etc.

The viewfinder 900 can be utilized to publish the presence of its information to users. For example, the viewfinder might annotate its display to show those areas of a shared image that are most desired by other users. The user looking through the viewfinder 900 might alter the subject of the current shared image (such as by changing direction or zooming) based on what it detects as the most valuable people, places, or other subjects to photograph. Within this disclosure, the term "valuable" is highly subjective, and can refer to, e.g., an area that has not already been captured by other cameras (for example a particular child at a birthday party who has not been frequently imaged, a remote corner of a park at a particular time of day, a publicly-known individual, a group of individuals, or a person involved in an activity specifically requested by someone). Such determination of a particularly valuable individual or image can be input manually, or somewhat automatically using a recognition program or positioning program.

In certain embodiments, the viewfinder 900 can also indicate what has already been shared. Using image processing techniques, prior shared images can be considered. For example, children at a birthday party whose images have been captured (photographed) frequently might, in certain embodiments, appear differently within the viewfinder 900 compared to those having few captured images. In one embodiment, a user of a shared image device such as a digital camera or camcorder visually scans around a room during a sharing session such as a birthday party, and those kids who have been photographed often might get some indication on the viewfinder 900. As an example, less captured subjects may "sparkle" compared with more captured subjects. In one embodiment, such functionality can be provided depending largely on the real-time recognizers that can analyze or store the identity of particular individuals. Areas in the viewfinder 900 that are more valuable to photograph might sparkle or display an outline or be color-coded in certain embodiments of the viewfinders for the shared image devices. An explicit monetary value indicator might also be associated with these valuable areas.

In certain embodiments, positional information such as those from global positioning system (GPS), metadata, or those including reference to some geographic location, particular individual, or setting can be used to indicate where certain pictures have been captured. For example, if outdoors, then GPS derived positional information can be used to indicate the physical location, and therefore information about the subject, of a particular photograph.

Consider that the viewfinder 900 display indicates that a large number of pictures have been captured of the same birthday cake, etc. In certain embodiments, this similar-composition shared image can be applied to devices lacking a sharing mechanism, as well as a shared image device 101. For example, if a particular user has captured a large number of images of one particular object, they would likely want to have an indication of it so that they can change the subject of further images. In another embodiment, perhaps a birds-eye view can be provided on at least some of the shared image devices to indicate where prior shared images in the sharing session have been captured. The recognition algorithm can vary widely in scope. For example, in one embodiment, positional information relating to where shared images have been captured could be indicated and searched, based on derived GPS coordinates and/or other positional information. In one embodiment, those shared images that the current shared image device (or any particular shared image device) has captured can be highlighted in some manner along the bottom, side, top, etc. of the viewfinder 900.

In certain embodiments, pictures can be sorted based on color schemes, or color map queries. An example might be considering N shared images that appear most similar to M shared images (where M and N identify particular shared images) from a computational perspective. In those instances, images that have been stored in memory can be quickly accessed and returned to one or more of shared image devices. This type of task can be configured to, for example, view images chronologically, based on their subject, based on their location, or based on their value, etc. can be achieved using commercially available pattern recognition programs that are configured to recognize such patterns. Instead of viewing the shared images based on their time sequences, the images are sorted based at least partially on composition in certain embodiments of shared image devices. Image processing or signal processing techniques can be applied to the shared image devices to determine certain characteristics of the shared images.

As technology improves, more memory storing-capabilities will likely be provided to many individual shared image devices such as digital cameras, camcorders, printers, and other such capturing and peripheral devices. The cost of individual digital shared images will likely continue to decrease as the associated technology improves. The sharing or copying of a considerable number of shared images from one capturing shared image device to another will become more affordable, especially as memory storage cost drops.

Other types of shared image sorting, shared image querying, or shared image storing techniques may be provided by a computer after the shared images could have been obtained or retained from a digital camera, camcorder, or web site. However, this feature will also likely be useful for the sharing mechanism between multiple shared image devices.

In one embodiment, the most recently input information (e.g., one or few shared images) of the sessions shared image devices 101, such as digital cameras, can also be shown on the viewfinder 900 such as shown with respect to FIG. 11 or 13-18. For example, display the last five or ten shared images captured in one embodiment. In another embodiment, thumbnails of the images as described with respect to FIG. 14 can be provided (e.g., the last four thumbnails that provide an image having a greatly reduced resolution and dimension from the original image). Alternatively, the metadata can also indicate the time that each image has been captured by the member shared image devices that have been participating in the session (e.g., organize by the latest captured images). These figures are intended to be illustrative in nature, not limiting in scope.

In certain above-described embodiments of the viewfinders 900 as described for example with respect to FIG. 11, or 13-18 the remote capturing portion 910 can be inserted as a distinctive window or text that is layered above a separate local capturing portion 908. This viewfinder configuration enhances use of the local viewfinder while monitoring shared images that might have originated from remote devices.

Figure 16:
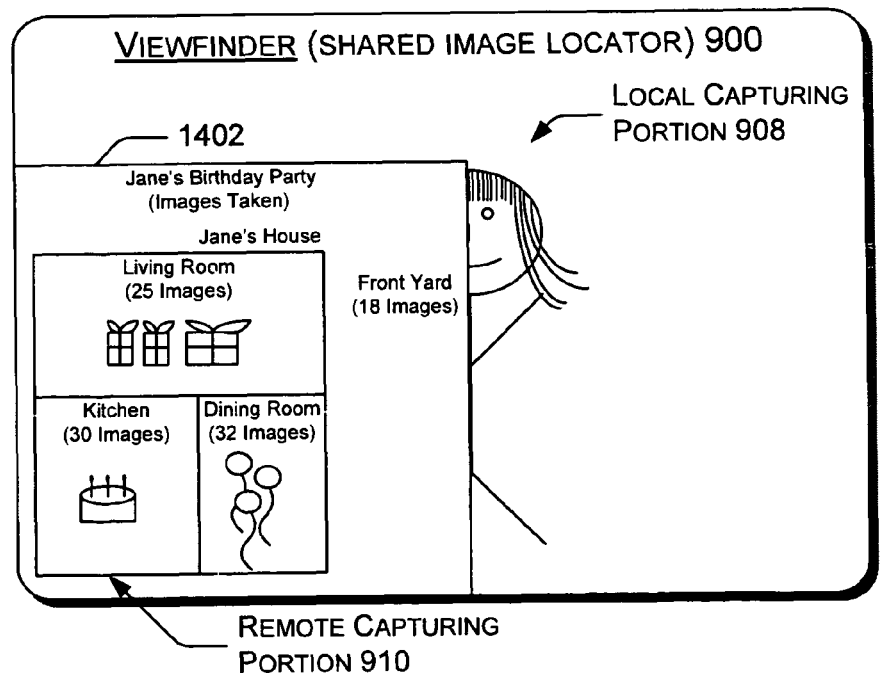
FIG. 16 shows a front view of still another embodiment of the viewfinder as described with respect to FIG. 11.
Figure 17:
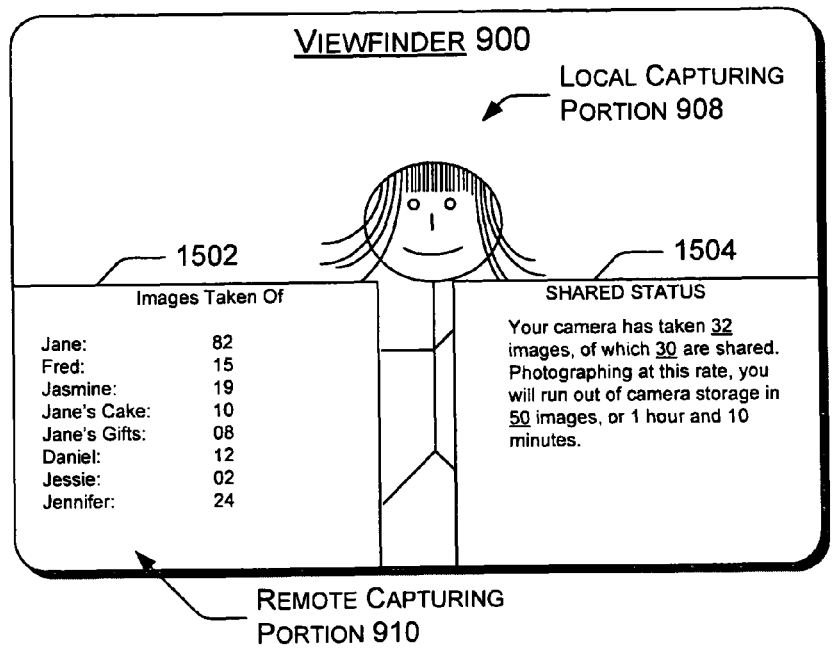
FIG. 17 shows a front view of yet another embodiment of the viewfinder as described with respect to FIG. 1.

A variety of viewfinder displays can be provided, such as illustrated in FIG. 16 or 17. The embodiment of the viewfinder 900 as described with respect to FIG. 16 contains an inset portion 1402 that indicates how many images have been taken at a particular session in each of a variety of geographic locations. For example, the number of photographs taken in a living room, kitchen area, dining room, or outside is indicated. The number of images that have been captured can further be segmented according to the configuration of the particular shared image devices (e.g., the total captured images that have been captured in the living room include three from shared image device 1, five from shared image device 2, etc.). The geographic positioning of the shared images can further be displayed in any desired manner. Such description of the number of images taken within portions of houses can be indicated by a user inputting, for example, the general layout and positioning of the rooms within the house using, for example, software that the user can use to draw the various rooms.

The user of each shared image device might thereupon be prompted as to the specific room, region, or other locational area in which a particular shared image can be captured. Alternately, additional positioning equipment such as a GPS unit can be installed in each shared image device, and the locations of the photographs and thereupon be applied to the particular rooms depending upon the derived GPS positions (e.g., as described by metadata).

Another embodiment of the viewfinder 900 is described with respect to the inset 1502 of FIG. 17, in which the view finder indicates the number of images taken of each subject within the session. Certain embodiments of the viewfinder 900 can indicate the number of images taken of each subject by each respective shared image device. The inset 1502 indicates, for example, that only two images have been captured of Jessie, and as such, she might be a prime candidate to be the subject of more images. Such indications of the number of images taken of each particular subject can be either manual (e.g., each user of a shared image device indicates the name of the subject for each image) or substantially automatic (e.g., the shared image device contains some recognition device that recognizes the identity of each subject for the shared images captured during the session, and thereby determines the identity of the subject for each image). There can be a number of different embodiments or versions of recognition software that can be utilized in different embodiments of the shared image devices, as described within this disclosure.

Certain embodiments of a status insert 1504, as included in the viewfinder 900 as described with respect to FIG. 17, can indicate the percentage of the resources for the shared image device that have been utilized. The used resources as indicated in the status insert 1504 can include, for example, the number of images taken, the number of images remaining, the percentage of storage memory remaining, the amount of battery life remaining, etc. Certain embodiments of the viewfinder as described with respect to FIG. 17 can be configurable to obtain or retain shared images. The rate of obtaining or retaining by that shared image device as well as the memory storage size of that shared image device largely determines how much time will remain until some prescribed duration is reached for capturing shared images.

As such, metadata can be associated with a particular shared image. For example, metadata can indicate a camera in a sharing session that took the shared image, the owner of the camera that took the shared image, the geographic location that the shared image was captured, the identity of an individual being imaged, subject of the shared image, the identity of the particular sharing session, etc.

Figure 18:
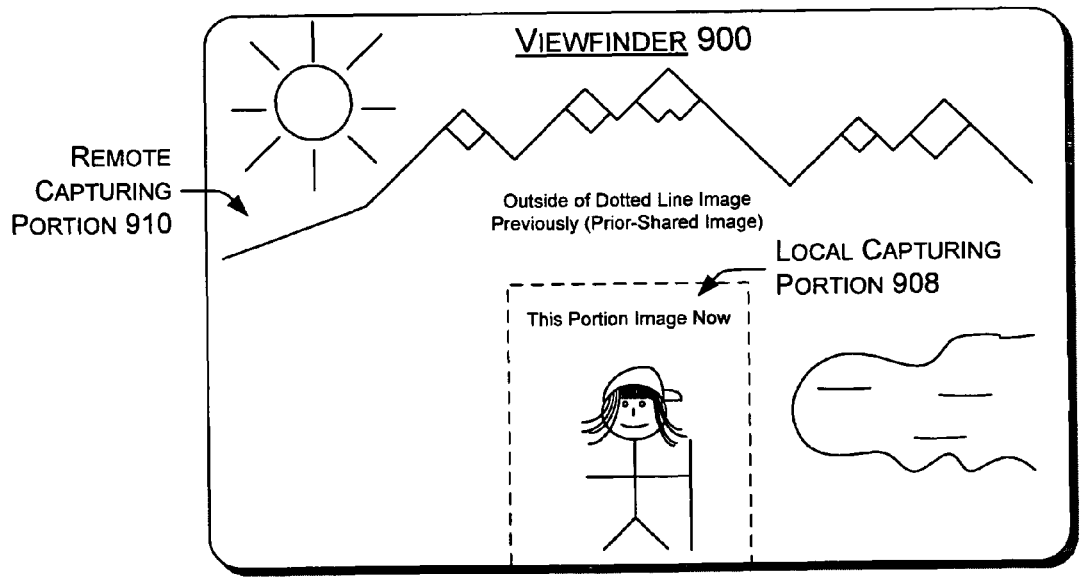
FIG. 18 shows a front view of yet another embodiment of viewfinder where an image that is being currently captured is being integrated into a number of previously-captured images.

Another embodiment of the viewfinder 900 displays the local capturing portion 908 within the remote capturing portion 910 as described with respect to FIG. 18. These embodiments of viewfinders can be used to provide a view of a combined image that can be captured. For example, the combined image that is captured by the shared image device largely reflects that provided within the viewfinder, in which a local subject contained within the local capturing portion 908, can be inserted into a remote capturing portion that may have been previously or remotely imaged. The combined image that is imaged can thereby, for example, be formed by combining at least a portion of a first image captured at a local capturing portion 908 (e.g., captured by a local shared image device) with at least a portion of a second image captured at a remote capturing portion 910 (e.g., captured either by the local or by a remote shared image device). For example, the viewfinder 900 as shown in FIG. 18 can illustrate the appearance of the combined image to a user over the viewfinder 900.

In one embodiment, the local shared image device can be provided with a panoramic vision. The panoramic view formed partially by including other shared images can be configured to appear in the viewfinder 900 as a ghosted feature as displayed in FIG. 18. For example, the area outside of the dotted lines in FIG. 18 might represent those images taken previously, such as a picture of Mt. Rushmore, Yosemite, portions of New York, etc., typically on a sunny day, at sunset, or at some other particularly photogenic period. The currently-imaged portion that is shown within the dotted lines can include the local capturing portion 908, which in many cases includes the immediate subject (e.g., wife, family, etc.). It is to be understood that certain embodiments of the shared image devices may not only share substantially-simultaneously captured images, but they may also share multiple images that have been captured at different times, different days, and even at different locations compared to when one or more portions of the images have been taken.

A variety of graphical user interface (GUI) techniques can be applied where the local capturing portion 908 is integrated within the remote capturing portion 910, as described with respect to FIG. 18. Such varying techniques of overlaying GUI windows, for example, are familiar to many users and designers of windows-based operating systems such as Windows or Mac.

It might be desirable in certain applications, for example, to combine multiple ones of these shared images using a similar ghosted feature to provide a single shared image. Similarly, embodiment involves providing a three-dimensional shared image using multiple photographs (e.g., two, three, or more) of the same shared object from different angles. A variety of imaging applications, such as providing a driving or aircraft simulator, may be accomplished in which a variety of shared images are overlaying other shared images, at which certain of the overlaying shared images can include motion images to our present, for example, motion of instruments associated with such simulators. Such interlaying of images may provide a particularly realistic image.

From another aspect, such overlaying of static and/or motion images as associated with many embodiments of a share mechanism described within this disclosure relative to some description of where to place a particular shared room image device to achieve some multi-image effect with other shared image devices utilizing windowing or similar GUI techniques. Some software can be utilized to achieve the panoramic/3-dimensional/or other effects as desired. Certain embodiments of viewfinders for shared image devices involves using other people's shared image devices such as cameras, to insert old bookmarks at locations in where their cameras could have been located.

One viewfinder 900 embodiment involves using other people's shared image devices such as cameras, and put old bookmarks at locations in where their cameras could have been located.

In yet another embodiment, the viewfinder 900 of the shared image device can be provided with an indicator that provides positional information as to where the images have been taken. Such positional information can range from, but not be limited to, metadata that contains the latitude/longitude, GPS waypoint, within a known commercial location (e.g., at Sears®), at some residential location (within the living room at the Jones'), etc.

Examples of Variable Resolution

Different embodiments of the shared image devices can provide images with different resolutions. In fact, certain shared image devices can alter the resolution of their images. Certain embodiments of shared image devices can increase the number of images that can be shared or imaged by adjusting the resolution of one or more of the images. In certain embodiments of shared image devices, the entirety of, portions of, or information relating to, the images captured during a sharing session can be viewed on the viewfinder of the shared image device. Conceivably, the ones that a user has captured, or that satisfy some other criteria, will be accepted at the highest resolution. Varying the image resolution therefore partially pertains to the capacity of the shared image device, as described above. Other images will be accepted at low resolutions. In certain embodiments, the lower resolution images can be kept, rejected, or selected having a corresponding higher resolution image obtained or retained in the future.

Commercially available technology can provide always-on video, for certain embodiments of shared image devices. Such always-on technology can likely be applied to shared image devices. As such, actuating the sharing mechanism may be one technique for determining interest of a particular shared image, wherein another user of a shared image device can provide feedback via audio as to how a shared image can be altered (e.g., modify the subject, vary the resolution or zoom of the image, etc.). If the current image appears interesting, one user of a shared image device can turn on an audio microphone to communicate with another shared image device, and either capture a current image and/or a current sound. Additionally, if there is one image of particular interest, it may be desirable to obtain or retain five images chronologically on either side of that image that had been taken by that particular shared image device.

Consider a shared image device application such as a friend providing live pictures of a ski resort, a beach area, and/or a snowy pass that have been captured using a share mechanism, wherein the current weather conditions make a difference. The sharing mechanism 102 can be used to access such information on a near-real-time basis. The images that can be accessed on a near-real-time basis may have reduced highest resolution. As such, it may be desirable to reduce the resolution for certain imaging applications.

The variable resolution control represents another embodiment of a capacity-control device. Consider that lower-resolution images (e.g., thumbnails and/or metadata) generally require less memory storage than higher-resolution images. As such, for a given memory, a larger number of lower-resolution images can be stored than higher-resolution images. In addition, capturing higher-resolution images often utilizes more battery life than with lower-resolution images. All of these factor into the type of image that is to be stored.

In many embodiments of shared image devices, converting the resolution of images may utilize considerable device energy, such as battery life. As such, to reduce the drain on the energy expended by certain battery-powered devices during resolution conversion processes; it may be desired to transfer images to another shared image device(s) so that the other shared image device (that presumably has greater energy, such as a printer or computer that may be plugged in) can vary the resolution of the images.

Further consider those instances where a user of a shared image device has filled their device with high-resolution images. This user will be able to utilize capacity control by storing further images as thumbnails and/or metadata that in certain embodiments can be accessed later when the user obtains or retains their current image, or otherwise obtains more memory. In certain embodiments, the user will be able to access the high-resolution versions of all of the desired images from home, or some other location, via a network.

Naming Aspects

Other embodiments of shared image devices 101 involve "naming". A unique name for a particular session can be associated with each of the shared image devices that captured at least one shared image such as a digital camera or camcorder. Another simpler sharing embodiment involves shared image devices 101 that can be pre-configurable when being built or distributed. For example, multiple cameras can be associated with each other such that at least some of those cameras will be able to share and/or copy images. For example, the metadata contained in the embodiment of the local capturing portion 908, as described with respect to FIG. 15, indicates whose camera captured the image as well as the subject of each captured shared image. In another embodiment, multiple cameras may not even require an express actuation of the sharing mechanism 102, but the sharing mechanism can be actuated by turning on at least some of the cameras concurrently. In another embodiment, the owner of the entire set of shared image devices 101 can be, for example, people getting married or the parents of the birthday party child.

In one embodiment, the shared image device 101 identifies where a particular shared image was captured or imaged, the subject of the particular shared image, and/or when the shared image was captured. In one embodiment, these types of shared image information can be contained as metadata relative to the shared image device 101. As such, the metadata can be used to answer queries that may be applied to the shared images in the sharing session.

Naming allows a shared image device 101 to be identified to its owner, or with its user. In one embodiment, a name stored as metadata or other information can include a filename and a timestamp, and an identification of the individual shared image device (e.g., the identity name can be added as the filename). The metadata can therefore be provided within the desired format on the shared images.

Certain new embodiments involve providing multiple shared image devices 101 at a given session being provided with a synchronized timestamp. As such, the shared images that pertain to a particular event such as a wedding can be sorted depending upon the chronology of when they occurred. For example, shared images that are associated with a wedding can be chronologically categorized and separated as shared images that occurred prior to the wedding, during the wedding, after the wedding, during the reception, or at the bar afterwards, etc. This therefore can allow the sharing mechanism to provide an offset time, for the distinct shared image devices 101. This can act similarly to synchronizing watches between multiple photographers, and indicating the time of each photograph that can be sequentially arranged.

CONCLUSION

This disclosure provides a number of embodiments of the sharing mechanisms that can allow images that are located on one device to be transferred to another device. Different configurations of peripheral shared image devices and/or capturing shared image devices may be combined using networking techniques. Different embodiments of the sharing mechanisms can be included in such embodiments of the communication system 100 as telecommunication systems, computer systems, audio systems, video systems, teleconferencing systems, and/or hybrid combinations of certain ones of these systems. The embodiments of the shared image devices as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method, comprising:
sending a query from a first image capture device to an at least one other image capture device within a proximity of the first image capture device requesting status information about status of one or more aspects associated with one or more images acquired, acquirable, or a combination thereof by the at least one other image capture device;
receiving at the first image capture device the status information from the at least one other image capture device in response to the query;
sending from the first image capture device an indication to the at least one other image capture device that the first image capture device is at least available to participate in a sharing session between the first image capture device and the at least one other image capture device if the status as described in the status information of the one or more aspects associated with the one or more images acquired, acquirable, or a combination thereof by the at least one other image capture device satisfies one or more criteria; and
transmitting during the sharing session between the first image capture device and the at least one other image capture device at least one portion of at least one image representation from the first image capture device to the at least one other image capture device in a manner at least partially relying on the proximity of the first image capture device and the at least one other image capture device if the sharing session between the first image capture device and the at least one other image capture device occurs due at least in part to the sending from the first image capture device the indication to the at least one other image capture device that the first image capture device is at least available to participate in a sharing session between the first image capture device and the at least one other image capture device.

2. The method of claim 1, wherein the method further comprises:
establishing a permission for the first image capture device to join a sharing session.

3. The method of claim 1, wherein the method further comprises:
providing an ability for the first image capture device to join a sharing session.

4. The method of claim 1, wherein the method further comprises:
providing ancillary information pertaining to at least one image at least partially using the first image capture device to form at least one ancillary-based image.

5. The method of claim 1, wherein the method further comprises:
providing ancillary information pertaining to an image at least partially using the first image capture device to form an ancillary-based image, wherein the ancillary information includes at least one from a group of format-shared information, associated information, textual information, audio, annotation information, image map information, executable code, data overlay information, or transmitted license.

6. The method of claim 1, wherein the method further comprises:
watermark-transforming at least one image at least partially using the first image capture device to form at least one watermark-transformed image.

7. The method of claim 1, wherein the method further comprises:
combining at least one image with at least another image at least partially using the first image capture device to form at least one combined transformed image.

8. The method of claim 1, wherein the transmitting at least one portion of at least one image representation from a first image capture device further comprises:
pushing the at least one portion of the at least one image representation from the first shared image capture device at least partially based on the proximity of the first image capture device and the at least one other image capture device.

9. The method of claim 1, further comprising:
receiving a request at the first image capture device to share the at least one portion of the at least one image representation.

10. The method of claim 1, further comprising:
establishing a communication link between the first image capture device and the at least one other shared image capture device.

11. The method of claim 1, further comprising:
storing and forwarding of the at least one portion of the at least one image representation from the first image capture device.

12. The method of claim 1, further comprising:
user-controllably deleting the at least one image representation.

13. The method of claim 1, further comprising:
capturing the at least one image representation at least partially using the first image capture device.

14. The method of claim 1, further comprising:
capturing the at least one image representation at least partially using the at least one other image capture device.

15. The method of claim 1, further comprising:
publishing the at least one portion of the at least one image representation.

16. The method of claim 1, further comprising:
selectively sharing the at least one portion of the at least one image representation with the at least one other image capture device, but not with at least another image capture device.

17. The method of claim 1, further comprising:
sharing the at least one portion of the at least one image representation with the at least one other image capture device, wherein the sharing includes actuating at least one from a group of a user-actuated button, a menu, or at least some audio information.

18. The method of claim 1, further comprising:
automatically deleting the at least one image representation.

19. The method of claim 1, further comprising:
automatically controlling processing of the at least one image representation.

20. The method of claim 1, further comprising:
controlling processing of the at least one image representation at least partially using a user interface.

21. A method, comprising:
sending a query from a first image capture device to an at least one other image capture device within a proximity of the first image capture device requesting status information about status of one or more aspects associated with one or more images acquired, acquirable, or a combination thereof by the at least one other image capture device;
receiving at the first image capture device the status information from the at least one other image capture device in response to the query;
sending from the first image capture device an indication to the at least one other image capture device that the first image capture device is at least available to participate in a sharing session between the first image capture device and the at least one other image capture device if the status as described in the status information of the one or more aspects associated with the one or more images acquired, acquirable, or a combination thereof by the at least one other image capture device satisfies one or more criteria; and
receiving during the sharing session between the first image capture device and the at least one other image capture device at the first image capture device at least one portion of at least one image representation at least partially relying on the proximity of the first image capture device and the at least one other image capture device if the sharing session between the first image capture device and the at least one other image capture device occurs due at least in part to the sending from the first image capture device the indication to the at least one other image capture device that the first image capture device is at least available to participate in a sharing session between the first image capture device and the at least one other image capture device.

22. The method of claim 21, wherein the method further comprises:
providing an ability for the first image capture device to join a sharing session.

23. The method of claim 21, wherein the method further comprises:
transforming at least one image at least partially using the first image capture device to form at least one transformed image.

24. The method of claim 21, wherein the method further comprises:
providing ancillary information pertaining to an image at least partially using the first image capture device to form at least one ancillary-based image.

25. The method of claim 21, wherein the method further comprises:
providing ancillary information pertaining to an image at least partially using the first image capture device to form an ancillary-based image, wherein the ancillary information includes at least one from a group of format-shared information, associated information, textual information, audio, annotation information, image map information, executable code, data overlay information, or transmitted license.

26. The method of claim 21, wherein the method further comprises:
    watermark-transforming at least one image at least partially using the first image capture device to form at least one watermark-transformed image.

27. The method of claim 21, wherein the method further comprises:
    combining at least one image with at least another image at least partially using the first image capture device to form at least one combined transformed image.

28. The method of claim 21, wherein the receiving at a first image capture device at least one portion of at least one image representation at least partially in response to a proximity of the first image capture device and at least one other image capture device further comprises:
    receiving the at least one portion of the at least one image representation that has been pushed from the at least one other image capture device to the first image capture device.

29. The method of claim 21, wherein the receiving at a first image capture device at least one portion of at least one image representation at least partially in response to a proximity of the first image capture device and at least one other image capture device further comprises:
    receiving a plurality of images at the first image capture device from the at least one other image capture device.

30. The method of claim 21, further comprising:
    storing and forwarding of the at least one portion of the at least one image representation received at the first image capture device.

31. The method of claim 21, further comprising:
    user-controllably deleting the at least one image representation.

32. The method of claim 21, further comprising:
    capturing the at least one image representation at least partially using the first image capture device.

33. The method of claim 21, further comprising:
    capturing the at least one image representation at least partially using the at least one other image capture device.

34. The method of claim 21, further comprising:
    automatically deleting the at least one image representation.

35. The method of claim 21, further comprising:
    automatically controlling generation of the at least one image representation.

36. The method of claim 1 wherein the proximity of the first image capture device and the at least one other image capture device includes a wireless communication link.

37. The method of claim 1 wherein the proximity of the first image capture device and the at least one other image capture device includes a wired communication link.

38. The method of claim 1 wherein the proximity of the first image capture device and the at least one other image capture device includes a prescribed range associated with automatic actuation of sharing between devices.

39. The method of claim 21 wherein the proximity of the first image capture device and the at least one other image capture device includes a wireless communication link.

40. The method of claim 21 wherein the proximity of the first image capture device and the at least one other image capture device includes a prescribed range associated with automatic actuation of sharing between devices.

* * * * *

UNITED STATES PATENT AND TRADEMARK OFFICE
CERTIFICATE OF CORRECTION

PATENT NO. : 7,920,169 B2  Page 1 of 1
APPLICATION NO. : 11/115078
DATED : April 5, 2011
INVENTOR(S) : Edward K. Y. Jung et al.

It is certified that error appears in the above-identified patent and that said Letters Patent is hereby corrected as shown below:

Column 51, line 25; Claim 8

"from the first shared image capture" should read --from the first image capture--

Column 51, line 35; Claim 10

"and the at least one other shared image" should read --and the at least one other image--

Signed and Sealed this
Thirty-first Day of May, 2011

David J. Kappos
*Director of the United States Patent and Trademark Office*